(12) United States Patent
Dillon

(10) Patent No.: US 11,663,173 B2
(45) Date of Patent: May 30, 2023

(54) DATA MAP CONNECTIVITY INTERFACE

(71) Applicant: Dillon Software Services, LLC, Parker, CO (US)

(72) Inventor: David M. Dillon, Parker, CO (US)

(73) Assignee: Dillon Software Services, LLC, Parker, CO (US)

( * ) Notice: Subject to any disclaimer, the term of this patent is extended or adjusted under 35 U.S.C. 154(b) by 156 days.

(21) Appl. No.: 17/161,540

(22) Filed: Jan. 28, 2021

(65) Prior Publication Data
US 2021/0240672 A1 Aug. 5, 2021

Related U.S. Application Data

(60) Provisional application No. 62/968,982, filed on Jan. 31, 2020.

(51) Int. Cl.
| | | |
|---|---|---|
| *G06F 12/00* | (2006.01) | |
| *G06F 16/185* | (2019.01) | |
| *G06F 16/14* | (2019.01) | |
| *G06F 16/182* | (2019.01) | |

(52) U.S. Cl.
CPC .......... *G06F 16/185* (2019.01); *G06F 16/148* (2019.01); *G06F 16/156* (2019.01); *G06F 16/1824* (2019.01)

(58) Field of Classification Search
CPC .... G06F 16/185; G06F 16/148; G06F 16/156; G06F 16/1824; G06F 16/25; G06F 16/972; G06F 9/547; G06F 9/451; G06F 9/4451; G06F 9/541
See application file for complete search history.

(56) References Cited

U.S. PATENT DOCUMENTS

| | | | | |
|---|---|---|---|---|
| 2013/0304799 A1* | 11/2013 | Lutter | ................. | G06F 16/2455 709/203 |
| 2015/0319229 A1* | 11/2015 | Dillon | ................... | G06F 16/951 709/203 |
| 2016/0034530 A1* | 2/2016 | Nguyen | ............. | G06F 16/24542 707/719 |
| 2016/0140184 A1* | 5/2016 | Deissner | ........... | G06F 16/24526 707/780 |

\* cited by examiner

*Primary Examiner* — Mohammad A Sana
(74) *Attorney, Agent, or Firm* — Jaffery Watson Mendonsa & Hamilton LLP

(57) ABSTRACT

Methods and systems for redirection of requests received by a service or an API are provided. According to one embodiment, a request, relating to a domain or a focal point of related data (e.g., an OData entity), is received from a client by a service (e.g., an OData service) operable to serve data from a data source or an in-memory cache. When the request involves manipulation of a portion of the data, automatic updating of values of the data that are dependent thereon is facilitated by directing fulfilment of the request to the cache; otherwise: it is determined whether to fulfill the request based on the in-memory cache. When the determination is affirmative, then the portion of the data is retrieved from the in-memory cache. When the determination is negative, then the portion of the data is retrieved from the data source.

15 Claims, 48 Drawing Sheets

```xml
<edmx:Edmx xmlns:edmx="http://docs.oasis-open.org/odata/ns/edmx" Version="4.0">
    <edmx:DataServices>
        <Schema xmlns="http://docs.oasis-open.org/odata/ns/edm" Namespace="DemoOpp">
            <EntityType Name="DEMOOPP">  1600
                <Key>
                    <PropertyRef Name="ID"/>
                </Key>
                <Property Name="XREFERENCE" Type="Edm.String"/>
                <Property Name="ID" Type="Edm.Int32"/>
            </EntityType>
            <EntityType Name="DEMOQUOTE">  1601
                <Key>
                    <PropertyRef Name="ID"/>
                </Key>
                <Property Name="XREFERENCE" Type="Edm.String"/>
                <Property Name="PARENT" Type="Edm.Int32"/> 1602
                <Property Name="ID" Type="Edm.Int32"/>
                <NavigationProperty Name="DEMOOPP" Type="DemoOpp.DEMOOPP" Nullable="false"/> 1603
                <NavigationProperty Name="DEMOITEMSd" Type="Collection(DemoOpp.DEMOITEM)"/> 1604
            </EntityType>
            <EntityType Name="DEMOITEM"> 1605
                <Key>
                    <PropertyRef Name="ID"/>
                </Key>
                <Property Name="XREFERENCE" Type="Edm.String"/>
                <Property Name="PARENT" Type="Edm.Int32"/> 1606
                <Property Name="ID" Type="Edm.Int32"/>
1608    <NavigationProperty Name="DEMOQUOTE" Type="DemoOpp.DEMOQUOTE" Nullable="false"/> 1607
            </EntityType>
            <EntitySet Name="DEMOQUOTESd" EntityType="DemoOpp.DEMOQUOTE">
1609        <NavigationPropertyBinding Path="DEMOOPP" Target="DEMOOPPSd"/>
                <NavigationPropertyBinding Path="DEMOITEMSd" Target="DEMOITEMSd"/>
            </EntitySet>
            <EntitySet Name="DEMOITEMSd" EntityType="DemoOpp.DEMOITEM">
                <NavigationPropertyBinding Path="DEMOQUOTE" Target="DEMOQUOTESd"/>
            </EntitySet>
        </Schema>
    </edmx:DataServices>
</edmx:Edmx>
```

FIG. 1

```
...
<EntityType Name="DEMOITEM">   1700
    ...
    <NavigationProperty Name="DEMOQUOTE" Type="DemoOpp.DEMOQUOTE" Nullable="false">   1701
        <ForeignKey property="PARENT" key="ID" />1702
    </NavigationProperty>
</EntityType>
...
```

FIG. 2

```
1300      1301      1302      1303
<datamap (0)  name=""  order=""  source="">

1304         1305      1306
    <parameter (0)  key=""  value="">
    </parameter>
    <parameter (1) .../>
    ...
    <parameter (n) .../>

1307       1308     1309    1310      1311        1312        1313        1318
    <datapoint (0)  field=""  type=""  format=""  default=""  disabled=""  formula=""  parameters="">

1314         1315      1316
        <attribute (0)  key=""  value="">
        </attribute>
        <attribute (1) .../>
        ...
        <attribute (n) .../>
    </datapoint>
    <datapoint (1) .../>
    ...
    <datapoint (n) .../>

1317          1319
    <datamap (0.0)  name="">
        <parameter .../>
        <datapoint .../>
        <datamap (0.0.0-n) .../>
    </datamap>
    <datamap (0.1) .../>
    ...
    <datamap (0.n) .../>
</datamap>
```

FIG. 4

```
1400   1401       1402      1403
<root  mapname="" agent=""  scheme="">
       1404          1405        1406
       <credentials  username=""  password="">

1407      1408
       <metamap  storableroot="">
               1409      1410     1411         1412
               <node (0) path=""  storable=""   loader="">
                       1413       1414     1415         1416
                       <storage   name=""   usecache=""  postfix="">
                               1417      1418         1419         1420
                               <storage  storage=""   installer=""  creator="">
                                       1467      1468         1469           1470             1471
                                       <creator  creator=""   parentkey=""   grandparent=""   entityproperty="">
                                       1421         1422
                                       <classfilter  class="">
                                               1423      1424      1425
                                               <parm (0) name=""   value=""/>
                                               <parm (n) name=""   value=""/>
                                       </classfilter>
                               </storage>
                               1426           1427    1428      1429        1465
                               <navigation (0) key=""  target=""  class=""   partner=""/>
                               <navigation (n) key=""  target=""  class=""   partner=""/>
                               1430         1431     1432
                               <references  field=""  entity=""/>
                       </storage>
                       1433    1434     1435         1436       1463
                       <cache  name=""   usecache=""  postfix=""  parent="">
                               1437      1438         1439         1440
                               <storage  storage=""   installer=""  creator="/>
                               1441           1442    1443      1444       1466
                               <navigation (0) key=""  target=""  class=""   partner=""/>
                               <navigation (n) key=""  target=""  class=""   partner=""/>
                               1445         1446     1447
                               <references  field=""  entity=""/>
                       </cache>
                       1448      1449    1450      1451       1464
                       <data (0) key=""   cache=""  storage=""  subpath=""/>
                       <data (n) key=""   cache=""  storage=""  subpath=""/>
                       1452      1453     1454     1455       1456      1457      1458     1459
                       <join (0) name=""  type=""  owner=""   other=""  field=""  link=""  class="">
                               1460     1461
                               <storage class=""/>
                       </join>

<join (n) name=""... />
               </node>
               <node (1) path="" ... />
               ...
               <node (n) path="" ... />
       </metamap>
</root>
```

FIG. 5

```
<root>  1500       1501         1502        1503        1504          1505
  <entity (0)  setname=""  deleted=""  customtab=""  tabvisible=""  applicationtab=""
              1506         1507          1508        1509
              locked=""   description=""  label=""   plurallabel="">
              1510        1511         1512        1513         1514         1515
              <property (0)  name=""  deleted=""  listview=""  searchlist=""  locked=""
                          1516            1517              1518         1519         1520
                          lookup=""   reverselookup=""  typecode=""  readonly=""  reference=""
                          1521            1522         1523        1524
                          description=""  helptext=""  label=""   relationlabel=""
                          1525                  1526
                          reverselabel=""   reverserelationlabel="">
              </property>
              <property (1)  name="" ... />
              ...
              <property (n)  name="" ... />
  </entity>
  <entity (1)  setname="" ... />
  ...
  <entity (n)  setname="" ... />

1527           1528         1529        1530         1531         1532
  <metaclass (0)  name=""  deleted=""  locked=""   prefetch=""  nowildcard="" >
                  1533           1534        1535        1536         1537
                  <metaobject (0)  name=""  deleted=""  locked=""  prefetch="" />
                  <metaobject (1)  name="" ... />
                  ...
                  <metaobject (n)  name="" ... />
  </metaclass>
  <metaclass (1)  setname="" ... />
  ...
  <metaclass (n)  setname="" ... />
</root>
```

FIG. 6

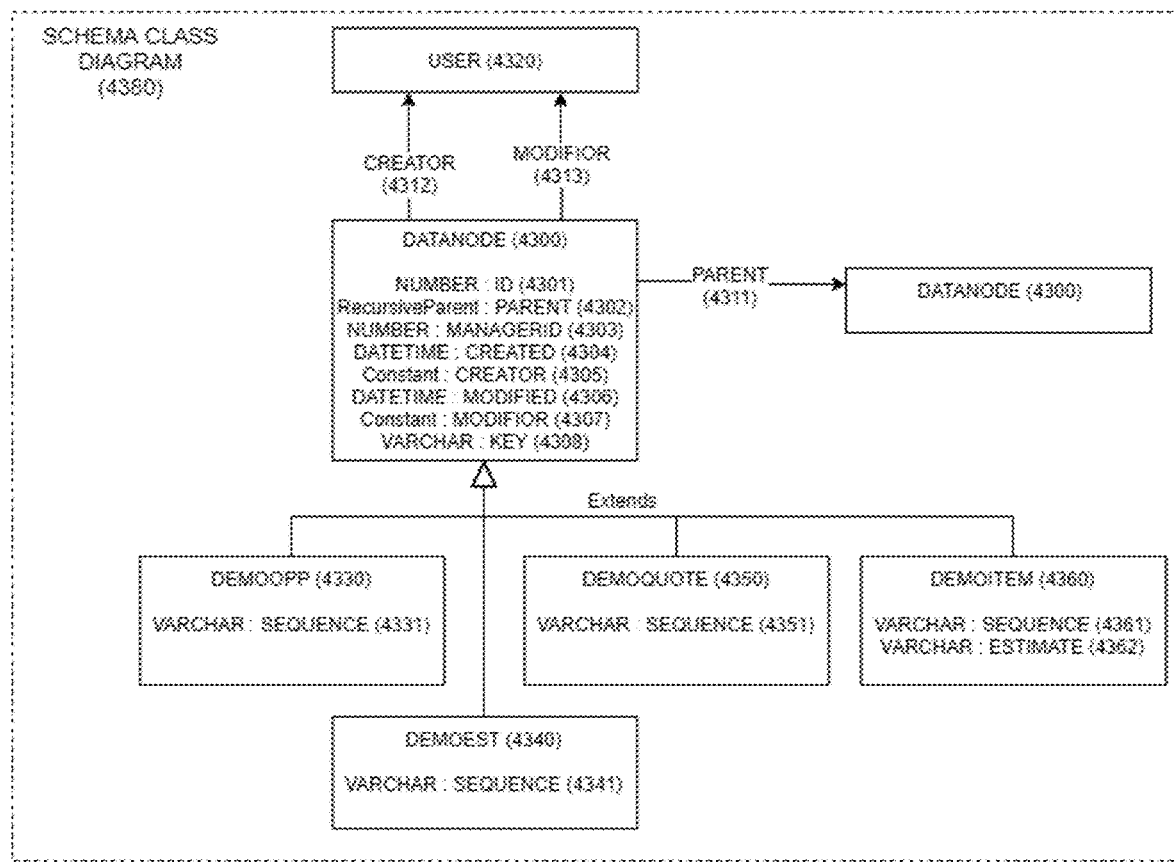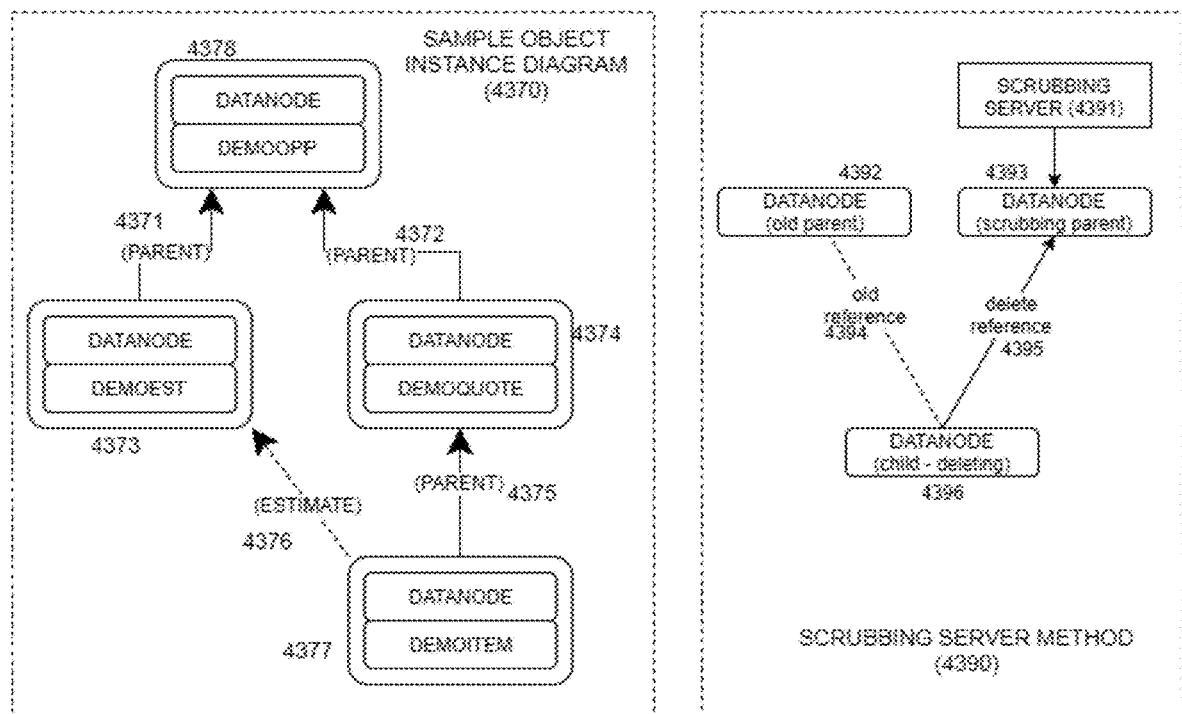
FIG. 10

| Construction of FilterClause (3612, 4403) | Resulting IStorageFilter (3611, 4419) Invocations | Resulting SQL Where clause (Incremental) |
|---|---|---|
| ClauseConjuction Cj = new ClauseConjuction(); Cj.add(new ClauseFilter(KEY,"Version")) | Filter.addEquals(KEY,"Version") | WHERE KEY = "Version" |
| ClauseConjuction Cj2 = new ClauseConjuction(AND); Cj.add(Cj2) | Filter.push(AND) | WHERE KEY="Version" AND ( |
| Cj2.add(new ClauseFilter(VALUE,"Alpha")) | Filter.addEquals(VALUE,"Alpha") | WHERE KEY="Version" AND (VALUE="Alpha" |
| Cj2.add(new ClauseFilter(VALUE,"Beta")) | Filter.addEquals(VALUE,"Beta") | WHERE KEY="Version" AND (VALUE="Alpha" OR VALUE="Beta" |
| Cj.configure (IStorageFilter) | Filter.pop(); | WHERE KEY="Version" AND (VALUE="Alpha" OR VALUE="Beta") |
| | Storage.read(Class,Filter); | |

*FIG. 47*

DATA MAP CONNECTIVITY INTERFACE

CROSS-REFERENCE TO RELATED APPLICATIONS

This application claims the benefit of priority to U.S. Provisional Application No. 62/968,982, filed on Jan. 31, 2020, which is hereby incorporated by reference in its entirety for all purposes. The present disclosure also relates to the subject matter of U.S. Pat. Nos. 8,676,808; 9,106,660, and 9,882,970, which disclose methods and utilities involving constructs, classes and objects that may be leveraged by various embodiments described herein. All of the aforementioned patents are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020-2021, Dillon Software Services, LLC.

BACKGROUND

Field

Embodiments of the present disclosure generally relate to Application Programming Interfaces (APIs) and services. More specifically, embodiments of the present disclosure provide mechanisms to facilitate redirection of Open Data Protocol (OData) requests received by an OData web service from an OData client for fulfilment by an in-memory cache or a data source as appropriate for the circumstances.

Description of the Related Art

The Open Data Protocol (OData) is a Representational State Transfer (REST)-based protocol for querying and updating data and is built on standardized technologies such as Hypertext Transfer Protocol (HTTP), Atom/Extensible Markup Language (XML), and JavaScript Object Notation (JSON). It is different from other REST-based web services in that it provides a uniform way to describe both the data and the data model. It is considered to be a flexible technology for enabling interoperability between disparate data sources, applications, services and clients. See, e.g., https://www.webopedia.com/TERM/O/odata-open-data-protocol.html.

SUMMARY

Methods and systems are described for redirection of requests received by a service or an Application Programming Interface (API) to facilitate fulfilment of the requests by an in-memory cache or a datastore as appropriate. According to one embodiment, a request, relating to a domain or a focal point of related data, is received from a client by a service that is operable to serve data from a data source to which it has been persisted or from an in-memory cache. When the request involves manipulation of a portion of the data associated with the domain or the focal point of related data, automatic updating of one or more values of the data that are dependent thereon is facilitated by directing fulfilment of the request to the in-memory cache. When the request does not involve manipulation of the portion of the data associated with the domain or the focal point of related data: it is determined whether to fulfill the request based on the in-memory cache. When the determination is affirmative, then the portion of the data associated with the domain or the focal point of related data is retrieved from the in-memory cache. When the determination is negative, then the portion of the data associated with the domain or the focal point of related data is retrieved from the data source.

Other features of embodiments of the present disclosure will be apparent from the accompanying drawings and from the detailed description that follows.

BRIEF DESCRIPTION OF THE DRAWINGS

Embodiments of the present disclosure are illustrated by way of example, and not by way of limitation, in the figures of the accompanying drawings and in which like reference numerals refer to similar elements and in which:

FIG. 1—(1600) Example WebData Configuration (DEMOOPP) in accordance with an embodiment.

FIG. 2—(1700) Excerpt WebData Configuration (ForeignKey) in accordance with an embodiment

FIG. 4 depicts a DataMap Configuration (Specification) in accordance with an embodiment.

FIG. 5 depicts a WebData Configuration (Specification) in accordance with an embodiment FIG. 6 depicts a schema of a Deployment Configuration in accordance with an embodiment.

FIG. 10 illustrates a Sample Storable Schema in accordance with an embodiment.

FIG. 47 depicts an example of a table showing how a FilterClause is configured, what the resulting IStorageFilter configuration steps look like, and given the IStorageFilter steps, what the resulting SQL where clause looks like in accordance with an embodiment.

DETAILED DESCRIPTION

Figure 3:
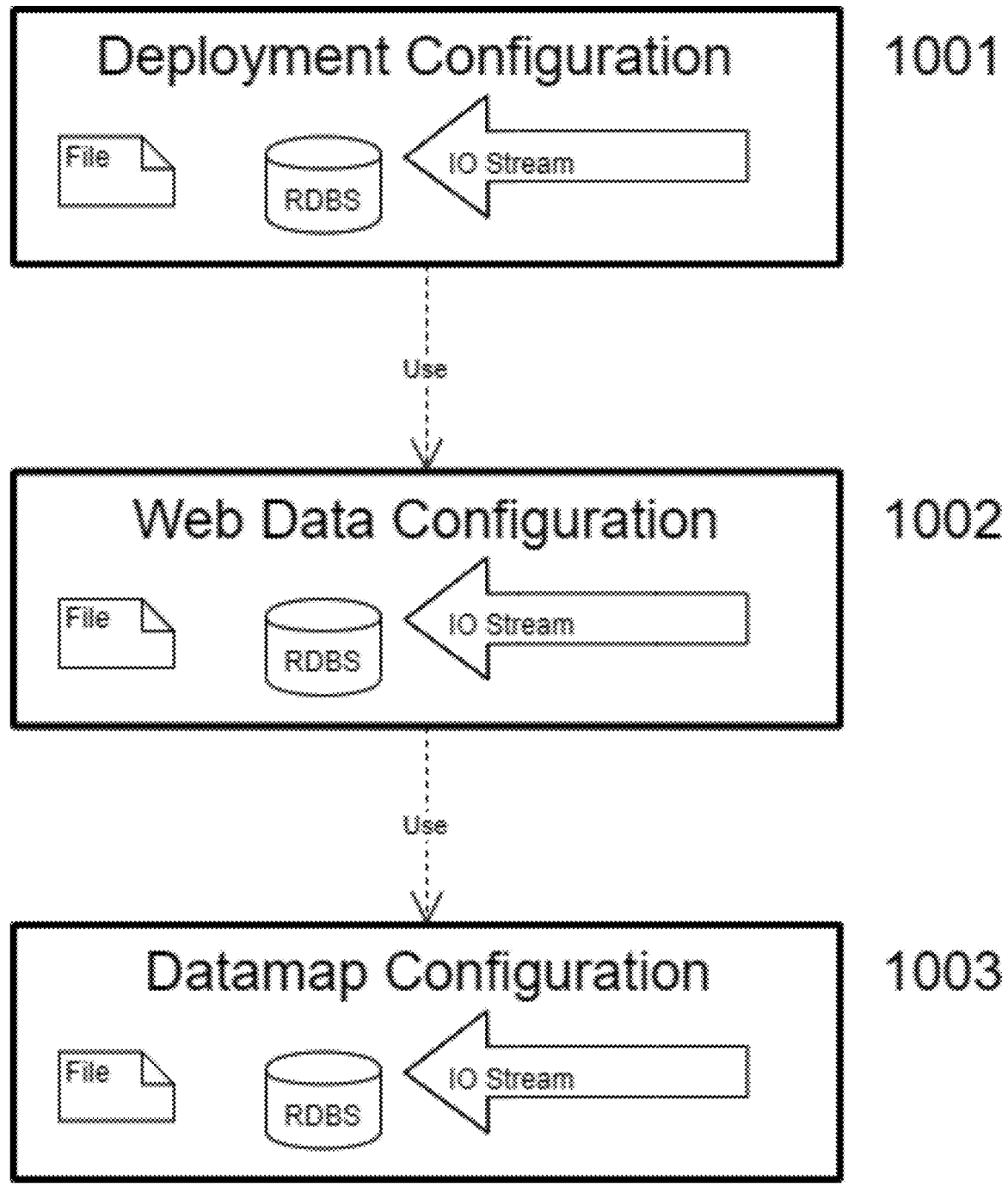
FIG. 3 is a block diagram illustrating a Configuration Architecture in accordance with an embodiment.

Methods and systems are described for redirection of requests received by a service or an Application Programming Interface (API) to facilitate fulfilment of the requests by an in-memory cache or a datastore as appropriate. A non-limiting example of a service that may embody various features described herein is an OData web service. The OData specification does not specify how a service should implement the specification, only that the implementation must conform to the specification, for the aspects of the specification that are implemented by the service. An OData web service is used to share data with an OData client; the OData specification does not specify the nature and source of the data; but is specific on the format of the client requests and service responses to the requests that convey the data.

Performance Tradeoffs

In an embodiment, an API or a service (e.g., an OData [web] service) is implemented that conditionally attempts to load a DataMap (e.g., DataMap 802 of FIG. 8) into [memory] cache, if a DataMap is not loaded, and information in the query is sufficient for the load process to know how to load the DataMap.

The source of data that is loaded into a DataMap can be quite arbitrary, but a common source of data is from a datastore, such as a relational database. A data map configuration contains information that may be used to relate data in a DataMap to its corresponding source, in one case a datastore. Assuming the OData query contains the information to reference records in the datastore, this information is used to load a DataMap into an in-memory cache.

There is no real boundary on the size of a DataMap hierarchy, breadth or depth. A DataMap could be sourced by thousands of database records, with extensive hierarchical references. The time it takes to load and manifest a DataMap could take many tens of seconds. A query for data from a DataMap could take tens of seconds to fulfill, at least when a DataMap has yet to be loaded. If the query is for data that happens to naturally exists in one or a small number of tables (e.g., the data exists within a number of tables that is less than or equal to a predetermined or configurable number of tables), then it would be advantageous to fulfill the query by reading the data directly from the datastore. On the other hand, if the query is for data that is deep within the DataMap hierarchy (e.g., the data exists within a level of the hierarchical data map that is greater than or equal to a predetermined or configurable threshold), or for data that does not exist in the database, then the query reads the data from the DataMap. Therefore, an OData web service is needed that exposes structured data in a DataMap, and in a datastore in conformance with the OData specification.

Formula Requirements

A need has been established for the ability to query data from both a cache (e.g., a cached DataMap (802)), or a corresponding datastore. There is an additional aspect of the DataMap (802) to consider, and that is the use of formulas to programmatically update any number of values in the DataMap (802). Typically, formulas are invoked on a DataMap (802) after input values are assigned into the DataMap (802); thus allowing the formula values to reflect any changes resulting from changes to input values.

The OData specification includes data manipulation directives to create and update data. This implies a need for the OData service to implement a process that upon creation or update of data in a DataMap (802), that the process invokes the formulas on the DataMap (802).

Redirect to Cache

The requirement to support formulas applies to data manipulation request (manipulation) on a datastore. For example, assume a manipulation on a datastore is received, and the value of "X" is updated. In a corresponding DataMap (802), the value of "X" is referenced by a number of formulas on other data. If "X" is updated in just the datastore, then there is no opportunity for dependent data to have their values updated. Therefore, there is a need for an OData service to detect a manipulation request on a datastore, and process the request by conditionally loading a DataMap (802) into cache, fulfilling the manipulation via the cache, invoking the formulas, and persisting the results back to the datastore.

Extended Client Configuration

An OData service is without purpose if there are no functional OData clients that use the service. Like the OData web service, an OData client implementation must conform to the OData specification, for any aspect of the specification that is implemented by the client.

OData defines a request where a client may request schema information from a service. A functional client should be capable of submitting queries and manipulations on service data after requesting metadata (schema) information from the service, and processing the schema information. Without this capability, the client would require some other process for gaining knowledge of the service schema. Yet, even with this capability, the client may still lack information that could make its interactions with the service sufficiently useful and efficient.

As will be discussed later, data in a record returned by a service may be used to navigate from one record to another, but knowledge of this property is not included in the schema information.

Therefore, there is a need for an OData service to provide additional information that may be used by the client for more efficient interactions with a service. Additionally, an OData web service is needed that exposes structured data in a DataMap in conformance with the OData specification.

The OData service (or an agent process on behalf of the OData service) may provide additional information to the client according to the systems and processes provided by the client. The additional information may be presented in the form of a report whereby a human resource may input the information manually into a client; or if the client provides a web service Application Programming Interface (API), the additional information may be input into the client using the web service API.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

Notably, while embodiments of the present disclosure may be described using modular programming terminology, the code implementing various embodiments of the present disclosure is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Overview and Relevant Terms, Definitions and Trademarks

In various embodiments described herein, a request received by an API or a service may include information regarding a domain or a focal point of related data. A non-limiting example of such information is an OData entity. An entity [class] is a collection of related data fields, identified as properties, where instances of entities are processed in an OData service.

Apache Olingo is a Java library that implements the Open Data Protocol (OData). Apache Olingo serves client and server aspects of OData.

Salesforce "assets" are the XML files embedded in a metadata ZIP file; where the ZIP file was fetched from Salesforce. An existing asset is any ZIP file that was fetched just prior to, or at the start of, a process.

"Dillon" is a collection of patents relating to DataMap, including U.S. Pat. Nos. 8,676,808; 9,106,660, and 9,882,970, that disclose methods and utilities involving constructs, classes and objects that may be leveraged by various embodiments described herein. All of the aforementioned patents are hereby incorporated by reference in their entirety for all purposes.

A non-limiting example of a source of data (which may be referred to herein as a "data source" or a "datastore") includes instances of DataMaps that have been loaded into a memory cache.

In one embodiment, a Deployment Management User Interface (DMUI) is a web browser that connects to a web server, which in turn hosts an application to manage the deployment configuration. It is the interface through which a deployment administrator can initiate algorithms such as those noted in FIGS. 39, 41, 44, and others.

A Deployment Administrator generally refers to a human resource who is authorized and trained to use the DMUI.

In the context of a description of a program algorithm, "expect" or "insist" implies a condition is met, or an exception is thrown, abruptly ending the program flow of the algorithm. For example, given "The value of X is expected to be 10", the reader assumes the algorithm will continue and X=10, or the program flow ends.

In the context of a DataMap (802), an "index path" generally refers to an ordered collection of keys and optional field name; where the keys are used to navigate from a DataMap (802) to a subordinate DataMap (802); and if an optional field is defined it can be used to reference a DataPoint (804) on the most subordinate DataMap (802) corresponding to the collection of keys. An index path may also be expressed as a string, where the key names are separated by a dot, ".", and the optional field name is separated by the last key with a colon, ":". For example: "order.customer.name:last".

In the context of a DataMap (802), a "node" (e.g., node (801)) is an alias term for DataNode (see "Dillon Classes").

A data value is considered "obscure" if the value is null, or if the data is an empty string.

Salesforce® Is a registered trademark of Salesforce.

Service is an alias for DataMapService (800) in immediate context.

In an embodiment, a datastore table corresponds to a Java class, and the name of the table corresponds to the simple (class) name of the Java class.

"Pool" is an alias for MapServicePool in immediate context.

An "Agent USER" is the servlet application USER that is associated with the processes that fulfill OData requests.

In one embodiment, to avoid problems with thread concurrency, only one OData request per servlet is processed at any one time.

Synchronization semaphores based on USER may be used to serialized OData requests.

In an embodiment, a USER is configured for each OData service.

In an alternate embodiment, if there is a need to serialize OData requests for multiple OData services, then a single USER is configured for the related OData services.

A "request user" is the user associated with any HTTP request to the OData service. The application is responsible for identifying the user. The request user is also associated with a unique of record in a participating datastore. OData records may contain foreign key references to the [request user] that created and/or modified the OData records. The following list suggests methods for identifying the request user:

The request user is anonymous
The request user is statically configured
The request user is derived from the HTTP authorization credentials
The request user is derived from custom HTTP headers
Other For the purpose of understanding various embodiments described herein, OData metadata or a schema is generally represented as a structured collection of type definitions that include entity types, property [types] and navigational relationships between entity types. An OData schema has: a plurality of entity types; where an entity type has a plurality of properties, and a plurality of navigational relationships with other entity types.

The OData schema specification defining the entire set of participating entity types, their properties, and relationships may be provided in the form of an XML, document; and is generally received from a web service that is also responsible for responding to queries and manipulation of the data corresponding to the entity types.

An instance of an entity type, called an "entity", is a collection of "property values" corresponding to the properties of the entity type. This document strives to use the terms "entity", "entity type", "property" and "property value" according to their purpose, but the reader is reminded to keep in mind the context of any paragraph, and that depending on the context the term entity could mean "entity type" or an instance of an entity; and the term property could mean an attribute of an "entity type" or a "property value" of an entity.

Although there is no strict dependency between ODATA and relational databases, an entity type is analogous to a table in a relational data base, and a property is analogous to a column in a relational database table. Furthermore, an entity, is analogous to a record in a relational data base table, and an entity's property values are analogous to column field values in a record.

ODATA includes a provision for declaring navigational properties between entity types; and a syntax for querying entity data via other related entity types. There are different types of navigational properties, including the following:

One-to-One
One-to-Many
Many-to-Many
Many-to-One

The definition of the navigational properties includes elements sufficient to define the existence of the property and the cardinality of the relationship, but the definition of a navigational property does not include any information regarding how other properties can be used to facilitate navigation.

An entity type does have a reference property, the values of which uniquely identify an entity (record/instance); and while this property may be referenced to achieve navigation between entity types, it is not part of the definition of a navigational property. This is generally true for most other properties—they may be referenced in the process of navigation between entity types, but they are not part of the definition of the navigation properties.

For example, consider the non-limiting ODATA definition (snippet) depicted in FIG. 1. In the context of the present example, the definition of the entity type DEMOQUOTE (1601) has a one-to-one relationship (1603) to DEMOOPP (1600) and a one-to-many relationship (1604) to DEMOITEM (1605); and DEMOITEM (1605) has a one-to-one relationship (1607) to DEMOQUOTE (1601).

And further note that the navigational properties (i.e., NavigationProperty (1608), NavigationPropertyBinding (1609)) do not contain any information on how the service may support the navigation, or how other properties may or may not be used to support navigation. From the definition, the service is only declaring that navigation between the entity types is supported. With an ODATA service, navigation is achieved through the formation of a URI that specifies the proper sequence of entity type names and property parameters. The software that implements an ODATA service may have many layers of responsibility. At one layer, the software may check for the proper sequence of entity type names, independent of property parameters, and verify the navigation between entity types is supported by the navigational properties; and if it is, passed control to a different layer which takes into account the property parameters in the URI.

So far, the discussion has focused primarily on the service side of an ODATA solution, but there is also the client side of the solution. From the ODATA service, a client may query the service for the data model (the XML document that defines the entity types and properties of the ODATA service), may query the service for data, and may submit a request to manipulate the data.

When the client requires information involving navigation from one entity (the source) to another entity (the target), it must somehow obtain information that will enable the client to construct an ODATA request to retrieve target entity data. With ODATA, there multiple ways to request target entity data—it all depends on what data is available at the time of the request, and what is the most viable preferred method. For example, with reference to the data model above, the following URLs are two examples of retrieving the same target entity data:

http://dillonss.com/simpleapp/DemoOpp.svc/DEMO-QUOTESd(8951513)/DEMOOPP http://dillonss.com/simpleapp/DemoOpp.svc/DEMOOPPSd(8951410)

Both requests result in the retrieval of information for DEMOOPP (1600) where ID equals 8951410. This discussion assumes the preferred method is the latter. Note the PARENT property (1602) on DEMOQUOTE (1601). This property just happens to be a reference id to the DEMOOPP (1600) entity type. Thus, if a client has an instance of DEMOQUOTE (1601), then it also has the reference id to the DEMOOPP (1600), and the client may use the latter request to retrieve the target DEMOOPP (1600).

When a client imports an ODATA data model, only the information from the data model is available. For example, the only thing the client can infer from the configuration of DEMOQUOTE.PARENT (1602) is that it is a property, of type integer 32 bit. Based on ODATA, the client does not know that PARENT( ) is a reference id to DEMOOPP (1600). Conversely, the ODATA service may very well use PARENT (1602) to implement the navigation property between DEMOQUOTE (1601) and DEMOOPP (1600), but the ODATA client has no knowledge of this relationship.

If the client is to leverage the true nature of PARENT, then the client should be informed of such outside the scope of the ODATA schema. Typically, the ODATA service is aware of the nature of PARENT, so architecturally, the service is well suited to provide the additional information. And naturally, it is beneficial for clients to provide a web service (API) where the service can provide the additional information.

Note: The OData specification could be amended, or a new specification could be introduced where a client may request [extended] metadata from the OData service, and the service would respond with schema information that specifies whether a property may be used as a reference value to an entity type. For example, a navigation element might contain an inner element, ForeignKey (1702), as illustrated in FIG. 2. In FIG. 2, the ForeignKey element (1702) can be interpreted as follows: Since it is nested in an EntityType element (1700), property, PARENT, is DEMOITEM.PARENT; and since it is nested in a NavigationProperty (1701), key ID is DEMOQUOTE.ID; which is to say DEMOITEM.PARENT is a foreign key to DEMOQUOTE via DEMOQUOTE.ID.

The following technical description is divided into the following sections
    Configuration architecture
    Lentiles Classes
    Dillon Classes
    Sample Storage Schema
    Web Data Classes
    Deployment Classes
    Algorithms and Procedures
    Web Data Development Lifecycle
Configuration Architecture FIG. 3 is a block diagram illustrating a Configuration Architecture in accordance with an embodiment. Various embodiments described herein utilize multiple configurations loosely termed as a configuration stack, where each level of the stack corresponds to the following:

DataMap (1003): A configuration used to load and manifest instances of a DataMap Web Data (1002): A configuration used to identify what data from a DataMap is exposed through an OData service.

Deployment (1001): A configuration used to configure an OData client that includes additional information to enable the client to more efficiently interact with the OData service.

In the context of the present example, the configurations have limited encapsulation, meaning a configuration may only contain references to elements in a configuration lower in the stack, and may not contain references to elements in a configuration higher in the stack. In this way, a DataMap application may be deployed without regard to a Web Data service; and a DataMap application bundled with a Web Data service may be deployed without regard to a OData client implementation.

All of the configurations may be persisted in the form of JSON, XML, or any structured language; or in a hierarchy of records in a datastore. The configuration data may be delivered via a file system, communication stream, datastore query, or any vehicle that can deliver structured data.

In the tables (below) that describe the configuration structures, the name space notation '::' denotes a level of hierarchy. A name space notation of '::' alone implies the root of the hierarchy. The notation of '::family[0,n]' implies a collection of 'family'; if an attribute is defined, then the attribute is the key used to uniquely identify an element in the 'family' collection; otherwise the collection is key-less. A notation that starts with . . . :: denotes a relative location in the hierarchy; the reader should use the figure annotation number to view the figure showing the absolute location in the hierarchy.

DataMap Configuration

FIG. 4 depicts a DataMap Configuration (Specification) in accordance with an embodiment. In various embodiments, a data map configuration may be represented as a structured collection of data, as defined in FIG. 4, that provides directives and recipes that are used to load and manifest instances of a DataMap (802) into computer memory. An instance of a DataMap (802) may be stored in a location of computer memory (in-memory) called a cache. Table 1 (below) is an example definition of elements that may be used to define a DataMap configuration. Depending upon the particular implementation the definition of elements may be provided via structured content (e.g., an XML document or a datastore).

TABLE 1

Definition of Elements for a DataMap Configuration

| Name Space | Attribute | Value/Sample | Comments |
|---|---|---|---|
| ::datamap (1300) | | | The definition of a DataMap is found in the following inner elements. The first datamap name space is the root (1300). |
| ::datamap | Name (1301) | [name] * | The name of the DataMap. Inner node collections are designated with an asterisk (*) key value. |
| ::datamap | Order (1302) | [integer] | Optionally specifies the order in which a node is loaded |
| ::datamap | Source (1303) | [classname] | The fully qualified classname that is used to load this node, or collection |
| ::datamap::parameter [0,n] (1304) | [key] (1305) | [value] (1306) | A collection of data source parameters, each parameter is a key-value pair. |
| ::datamap::datapoint [0,n] (1307) | Field (1308) | [value] | A collection of DataPoint definitions. The name of the field may need to match some external influence. For example, if the node corresponds to a Relational Database System (RDBS) table, then this field may need to match a column name. |
| ::datamap::datapoint | Type (1309) | General Integer Double Currency Percent Date Time (more. . .) | The [primitive] type of the data associated with the field. |
| ::datamap::datapoint | Format (1310) | | An optional string expression used to format the data, generally on assignment |
| ::datamap::datapoint | Default (1311) | | An optional value to assign on load, if the load value is obscure. |
| ::datamap::datapoint | Formula (1313) | | An optional formula, associated with this DataPoint, is typically used to calculate and assign the value of the DataPoint; but may be used for any purpose during a calculation cycle. |
| ::datamap::datapoint | Disabled (1312) | true false | true: The definition & DataPoint are ignored, as if the definition does not exist. |
| ::datamap::datapoint | Parameters (1318) | [value] | An optional field to configure a parameter for arbitrary reasons. |
| ::datamap::datapoint::attribute [0,n] (1314) | [key] (1315) | [value] (1316) | A collection of DataPoint attributes, each attribute is a key-value pair. |
| ::datamap::datamap [0,n] (1317) | Name (1319 = 1301) | [name] | A collection of inner DataMap definitions, that are subordinate to the DataMap definition defined in this table; where this pattern may nest unbounded. |

Web Data Configuration

According to one embodiment, A web data configuration is a structured collection of data, as defined in FIG. 5, that describes what data from an instance of a DataMap (802) is exposed through the odata service; where attributes (data) in a web data configuration 1002 reference attributes in the data map configuration 1003. Table 2 (below) is an example definition of elements that may be used to define a Web Data configuration. Depending upon the particular implementation the definition of elements may be provided via structured content (e.g., an XML document or a datastore).

TABLE 2

Definition of Elements for a Web Data Configuration

| Name Space | Attribute | Value/Sample | Comments |
|---|---|---|---|
| :: | agent (1402) | | Username of the agent that will be processing requests |
| :: | mapname (1401) | | The name of the DataMap definition that will be accessed by this OData service. |
| :: | scheme (1403) | Anonymous Basic | The authorization scheme |
| ::credentials (1404) | [username] (1405) | password (1406) | When basic authentication is used |
| ::metamap (1407) | | | A set of inner elements that define the relationship between OData schema elements and DataMap schema elements. |
| ::metamap (1407) | storableroot (1408) | [name] | Simple class name of root storable class |
| ...::node[0,n] (1409) | | | A key-less set of inner elements |
| ...::node (1409) | path (1410) | [index path] | The index path of the DataMap node |
| ...::node (1409) | storable (14H) | [name] | Simple class name of the storable class associated with the node corresponding to the class |
| ...::node (1409) | loader (1412) | [classname] | Fully qualified class name of class that implements MapServiceEntityLoader A "loader" is used to load an data map into a cache. MapServiceEntityStorage uses a loader on getEntity. StorableEntityStorage uses a loader on updateEntityDataCache. EntityStorage provides the ID of an arbitrary hierarchical record to the loader. The loader is designed/knowing where in the hierarchy the record belongs. The loader uses the ID to configure a filter that is used to read the "storableroot". Then, the ID of the "storableroot" is given to MapserviceConnector to load the map into cache. |
| ...::node:: storage (1413) | | | An element that contains configuration that relates the node to a datastore |
| ...::storage (1413) | name (1414) | [entity] | The name of the [olingo] entity type corresponding to the storage manifestation of the node. |
| ...::storage (1413) | usecache (1415) | true false | When true, causes response logic to re-direct request fulfillment through the cache. |

TABLE 2-continued

Definition of Elements for a Web Data Configuration

| Name Space | Attribute | Value/Sample | Comments |
|---|---|---|---|
| ...::storage (1413) | postfix (1416) | | Optional, what to append to entity type name, for plural sense of the entity type, or name of the entity type set |
| ...::storage:: storage (1417) | | | An element that contains class names; instances of are used to perform some datastore function. |
| ...::storage (1417) | storage (1418) | [classname] | Fully qualified class name of class that implements WebDataEntity Storageinf. |
| ...::storage (1417) | installer (1419) | [classname] | Fully qualified class name of class that implements InstallEntityDataCache. "installer" is the class name of the installer used by this storage. The installer is responsible for referencing a cached DataMap, finding an appropriate location in the DataMap to install a new instance of an entity, and installing it. The installer is called upon by storage just after storage created a new instance of entity. NOTE: Though not shown in FIG. 5, whereas creator can be specified by (1420) or (1467), by the same technique, installer (1419) has an alternate form that permits the inclusion of additional configuration parameters. |
| ...::storage (1417) | creator (1420) | [classname] | Fully qualified class name of class that implements Create StorableEntity "creator" is the class name of the creator used by this storage. The creator essentially creates a new instance of "storable", initializing the new instance, persisting the new instance, and then returning the new instance to storage where it is updated with odata data. NOTE: creator (1467) is an alternate form for specifying the creator. If creator (1467) is used, then (1420) should not be use - they are exclusive of each other. Use creator (1467) if creator requires additional configuration. |
| ...::storage:: classfilter (1421) | | | An element that contains classnames and simple parameter configurations that are used to qualify a sub-set of records from a larger set. For example, in the case of a hierarchy of records, where records in a common table are linked into different locations in a hierarchy. The different locations can be exposed as different entities in OData. |
| ...::classfilter (1421) | class (1422) | [classname] | Fully qualified class name of class that implements StorableCollectionFilter For entity types that expose storage data, "classfilter" is used to "add" additional clauses to an IStorageFilter. |
| ...::classfilter:: parm[0,n] (1423) | [name] (1424) | [value] (1425) | An arbitrary set of parameters, that is name/value pairs, as appropriate for the proper application of the "classfilter" on the query of storage data. |
| ...::storage:: navigation [0,n] (1426) | key (1427) | [entity set] | The name of the target entity type set, that is navigable from 'this' entity type. |
| ...::navigation (1426) | target (1428) | [entity] | The name of the target entity type, that is navigable from 'this' entity type. |
| ...::navigation (1426) | class (1429) | [classname] | The fully qualified class name of the class that implements navigation logic |
| ...::navigation (1426) | partner (1465) | [entity] | The name of the target entity type, if the navigation is bi-directional. |
| ...::storage:: references (1430) | [field] (1431) | [entity] (1432) | The field name of the DataPoint associated with the node, that references a target entity type. Typically, the storage references the cache and visa-versa. |
| ...::node:: cache (1433) | | | An element that contains configuration that relates the node to a DataMap cache |
| ...::cache (1433) | parent (1463) | [entity] | The name of the target entity type that is a parent to 'this' entity type. This attribute configuration is optional. When included, both entity types are linked to each other as child or parent, according to their role. Navigational properties are allocated when linked, and query filters of ParentsFilter and ChildrenFilter are used, according to their role. |
| ...::cache (1433) | name (1434) | [entity] | See comments in ::metamap::node::storage section. These configurations relate the node to a DataMap cache. |
| ...::cache (1433) | usecache (1435) | true\|false | |
| ...::cache (1433) | postfix (1436) | | |
| ...::cache:: storage (1437) | | | |
| ...::storage (1437) | storage (1438) | [classname] | |
| ...::storage (1437) | installer (1439) | [classname] | |
| ...::storage (1437) | creator (1440) | [classname] | |
| ...::cache:: navigation [0,n] (1441) | key (1442) | [entity set] | |

TABLE 2-continued

Definition of Elements for a Web Data Configuration

| Name Space | Attribute | Value/ Sample | Comments |
|---|---|---|---|
| ...::navigation (1441) | target (1443) | [entity] | |
| ...::navigation (1441) | class (1444) | [classname] | |
| ...::navigation (1441) | partner (1466) | [entity] | |
| ...::cache:: references (1445) | [field] (1446) | [entity] (1447) | |
| ...::node:: data [0,n] (1448) | key (1449) | [property name] | A collection of elements that define the relationship of DataPoints to the node's storage and cache configurations. The property name of a property belonging to the entity types of this node. If "subpath" (1464) is not included, then the property name is also the field name of the DataPoint associated with the node; or a relative index path, including the field, relative to the node. |
| ...::data (1448) | cache (1450) | true reference | true: Expose this field as a property on the cache entity type corresponding to this node. reference: Expose this field as a property on the cache entity type corresponding to this node; and use this field as the entity type's reference property |
| ...::data (1448) | storage (1451) | true reference | Same as cache, except it applies to the storage entity corresponding to this node. |
| ...::data (1448) | subpath (1464) | [index path] | An optional attribute that explicitly defines a relative index path, relative to the node path (1410), that identifies the DataPoint schema that will be used with this property. When "subpath" (1464) is included, "key" (1449) is only used as the property name, and as such may be used as an alias to the field name of the underlying DataPoint. |
| ...::node:: join [0,n] (1452) | name (1453) | [entity] | The name by which this (join) entity type is known. |
| ...::join (1452) | type (1454) | storage| cache | An indication of whether this (join) entity type references data in persisted storage or memory cache |
| ...::join (1452) | owner (1455) | [entity] | The name of the entity type that fills the role of "owner" in the join relationship |
| ...::join (1452) | other (1456) | [entity] | The name of the entity type that fills the role of "other" in the join relationship |
| ...::join (1452) | field (1457) | | The index path, relative to the path of the "other", that references the primary identifier of the "other" |
| ...::join (1452) | link (1458) | | The index path, relative to the path of the "owner" that references the data of the "owner" that contains the value that references the "other". |
| ...::join (1452) | class (1459) | [classname] | The classname that extends WebDataEntityType, and implements WebDataEntityJoin |
| ...::join:: storage (1460) | | | A storage configuration of the following elements |
| ...::storage (1460) | class (1461) | [classname] | The classname that implements WebDataEntityStorageinf |

Deployment Configuration

A deployment configuration 1001 is used to configure an OData client; and includes additional information to enable the client to more efficiently interact with the OData service. In one embodiment, the purpose of the deployment configuration 1001 is to automatically configure an OData client to a minimal state of usefulness and efficiency, and thus avoid tedious and time consuming ancillary clicks and data entry to achieve a minimal state of usefulness and efficiency.

The deployment context is established de facto by a deployment process. In one embodiment, the deployment process is based solely on an implementation of the OData specification. When this process is used with Salesforce as a client, in order to make practical use of the OData service, additional configurations are typically applied in Salesforce, after the deployment.

As set out in the beginning of this document, embodiments include the ability to programmatically configure an OData client using data that is naturally available from the data map and web data configurations (1003, 1002), and a deployment configuration 1001; where the deployment configuration 1001 includes anything that is germane to achieving a minimal state of usefulness and efficiency.

In other embodiments, a deployment configuration 1001 could include anything that is germane to multiple deployment processes, or context; and not all processes use the same configuration data, or all processes may only use a portion of the same configuration data.

In yet another embodiment, as will be described in detail herein, a deployment configuration 1001 is outlined that may be used by a process to configure Salesforce as a client, with one or more of the following features:

An external data source is created as an OData service referencing the service that is deploying to Salesforce The creation of external objects in Salesforce corresponding to the entity types defined in a web data configuration.

The creation of custom fields on external objects in Salesforce; where the fields correspond to properties defined in a web data configuration and are associated with entity types that correspond to external objects.

The creation of external lookup field on an external object, if the deployment configuration of the property indicates as such.

The creation of standard lookup field on an external object, if the deployment configuration of the property indicates as such.

The creation of an external lookup field on a standard object, that references an external object, if the deployment configuration of the property corresponding to the external object indicates as such.

Configure a basic page layout for each external object.

Include custom fields on a basic external object page layout, for all custom fields associated with the external object.

Provide view, read, edit, create and delete permissions to page layouts and custom fields for selected profiles as determined by the deployment configuration.

Include and/or exclude custom fields in search lists and list views as determined by the deployment configuration.

Assign content to an external object's labels and description as determined by the deployment configuration.

Assign content to a custom field's labels, description and help text as determined by the deployment configuration.

In one embodiment, the above features result in minimal usefulness and efficiency of OData in Salesforce. The process of deployment sets the context and uses deployment configuration 1001 data to achieve the features. Over time, the requirements for minimal usefulness may change, and/or the conditions of Salesforce that support this embodiment may change. When these changes occur, the process that sets the context, and the deployment configuration can change with it, or can be retired.

FIG. 6 shows a schema of the deployment configuration 1001 in the form of XML notation in accordance with an embodiment. Table 3 (below) is an example definition of elements that may be used to define a Salesforce deployment configuration. Depending upon the particular implementation the definition of elements may be provided via structured content (e.g., an XML document or a datastore).

TABLE 3

Definition of Elements for a Salesforce Deployment Configuration

| Name Space | Attribute | Value/ Sample | Comments |
|---|---|---|---|
| ::entity [0,n] (1500) | setname (1501) | | A collection of deployment entity type definitions. In one embodiment, the collection is initially allocated by auditing the web data configuration. In the context of deployment to Salesforce, an entity type corresponds to an external object in Salesforce. The name of the entity type set from the web data configuration. In the context of Salesforce, the set name is used to construct the Salesforce API name of the external object. |
| ::entity (1500) | deleted (1502) | Boolean | A status to treat this entity type as deleted or not. Processes related to entity types in this collection will ignore and/or skip over entity types with a status of deleted. |

TABLE 3-continued

Definition of Elements for a Salesforce Deployment Configuration

| Name Space | Attribute | Value/ Sample | Comments |
|---|---|---|---|
| ::entity (1500) | custom tab (1503) | Boolean | If true, the deployment process configure a custom tab for the external object corresponding to the entity type. |
| ::entity (1500) | tabvisible (1504) | Boolean | If true, the deployment process configures visibility for this entity type's custom tab to "on" for all pre-fetched profiles. |
| ::entity (1500) | application tab (1505) | Boolean | If true, the deployment process adds this entity type's custom tab to the menu of all pre-fetched applications. |
| ::entity (1500) | locked (1506) | Boolean | A status used by the web data configuration audit process to skip over default assignment of deployment entity type attributes. |
| ::entity (1500) | description (1507) | | In the context of Salesforce, this description is assigned to the description of the Salesforce external object. |
| ::entity (1500) | label (1508) | | A term that refers to a single entity instance. In the context of Salesforce, this content is assigned to the label of the Salesforce external object. |
| ::entity (1500) | plurallabel (1509) | | A term that refers to a plurality of entity instances. In the context of Salesforce, this description is assigned to the plural label of the Salesforce external object. |
| ::entity:: property (1510) | name (15H) | [entity collection name] | A collection of deployment properties; that are inner elements of an deployment entity type definition. In one embodiment, the collection is initially allocated as part of the web data configuration audit. In the context of Salesforce, a property corresponds to a custom field on a Salesforce external object. The property name from the web data configuration. In the context of Salesforce, the property name is used to construct the Salesforce API name of the custom field. |
| ::entity:: property (1510) | deleted (1512) | Boolean | A status to treat this property as deleted or not. Processes related to properties in this collection will ignore and/or skip over properties with a status of deleted. |
| ::entity:: property (1510) | listview (1513) | Boolean | A status used to determine if a property should be included in the configuration of a list view, and thus be displayed on a list view. |
| ::entity:: property (1510) | searchlist (1514) | Boolean | A status used to determine if a property should be included in the configuration of a search list, and thus be displayed in a search results list. |

TABLE 3-continued

Definition of Elements for a Salesforce Deployment Configuration

| Name Space | Attribute | Value/ Sample | Comments |
|---|---|---|---|
| ::entity:: property (1510) | locked (1515) | Boolean | A status used by the web data configuration audit process to skip over default assignment of deployment property attributes. |
| ::entity:: property (1510) | lookup (1516) | [object type name] | If not obscure, in the context of Salesforce, the name of the entity type, or Salesforce standard object this property references. |
| ::entity:: property (1510) | reverselookup (1517) | Boolean | If true, in the context of Salesforce, provision a custom field, an external lookup, on the standard object, referenced by the lookup of this property. |
| ::entity:: property (1510) | typecode (1518) |  | The code corresponding to the type code of the web data configuration property, which is based on the data point type code from the data map configuration. In one embodiment, this attribute is read-only. In the context of Salesforce, this type code is used to configure the type of the corresponding custom field. |
| ::entity:: property (1510) | readonly (1519) | Boolean | In the context of Salesforce, used to configure permissions associated with the custom field. |
| ::entity:: property (1510) | reference (1520) | Boolean | If true, this property is the primary identifier. In the context of Salesforce, used to determine if the custom field should be included or excluded in ancillary configurations. |
| ::entity:: property (1510) | description (1521) |  | In the context of Salesforce, this content is assigned to the description of the Salesforce custom field. |
| ::entity:: property (1510) | helptext (1522) |  | In the context of Salesforce, this content is assigned to the help text of the Salesforce custom field. |
| ::entity:: property (1510) | label (1523) |  | In the context of Salesforce, this content is assigned to the label of the Salesforce custom field. |
| ::entity:: property (1510) | relationlabel (1524) |  | In the context of Salesforce, if property lookup is defined, this content is assigned to the relation label of the custom field. |
| ::entity:: property (1510) | reverselabel (1525) |  | In the context of Salesforce, if property reverselookup is true, this content is assigned to the label of the "other" custom field, added to the standard object. |
| ::entity:: property (1510) | reverse- relationlabel (1526) |  | In the context of Salesforce, if property reverselookup is true, this content is assigned to the relation label of the "other" custom field, added to the standard object. |
| ::metaclass [0,n] (1527) | name (1528) |  | A collection of metaclass configurations, where the metaclass name corresponds to an object type in an OData client. Metaclasses are added to the collection programmatically by algorithm or by an OData deployment configurator; an individual who is responsible for a deployment configuration. Both the deployment configurator and the algorithm know by training or oracle that a metaclass should be added to the collection. |
| ::metaclass (1527) | deleted (1529) | Boolean |  |
| ::metaclass (1527) | locked (1530) | Boolean |  |
| ::metaclass (1527) | prefetch (1531) | Boolean | If true, in the context of Salesforce, the deployment process will pre-fetch the Salesforce meta data for all instances of this type, as determined by the nowildcard status, or the collection of configured metaobjects. The deployment process uses pre-fetched metadata to determine what configurations should be deployed. |
| ::metaclass (1527) | nowildcard (1532) | Boolean | If true, in the context of Salesforce, used to determine if all Salesforce meta data can be retrieved using a wild card notation, or if individual instances are to be requested. |
| ...::metaobject [0,n] (1533) | name (1534) |  | Metaobjects contain deployment configuration data to be applied to Salesforce objects that are instances of corresponding Salesforce metaclasses. The primary parameter is "prefetch" - a directive to pre-fetch the Salesforce metadata for this metaobject. The name of the metaobject uniquely identifies a metaobject in a collection; and the name also corresponds to the filename of the metadata XML file in a metadata ZIP file. See Audit Salesforce MetaObjects; |
| ...::metaobject (1533) | deleted (1535) | Boolean |  |
| ...::metaobject (1533) | locked (1536) | Boolean |  |

TABLE 3-continued

Definition of Elements for a Salesforce Deployment Configuration

| Name Space | Attribute | Value/Sample | Comments |
|---|---|---|---|
| ...::metaobject (1533) | prefetch (1537) | Boolean | If true, in the context of Salesforce, the deployment process will pre-fetch the Salesforce meta data for this instance. The deployment process uses pre-fetched metadata to determine what configurations should be deployed. |

Lentiles Classes

Figure 7:
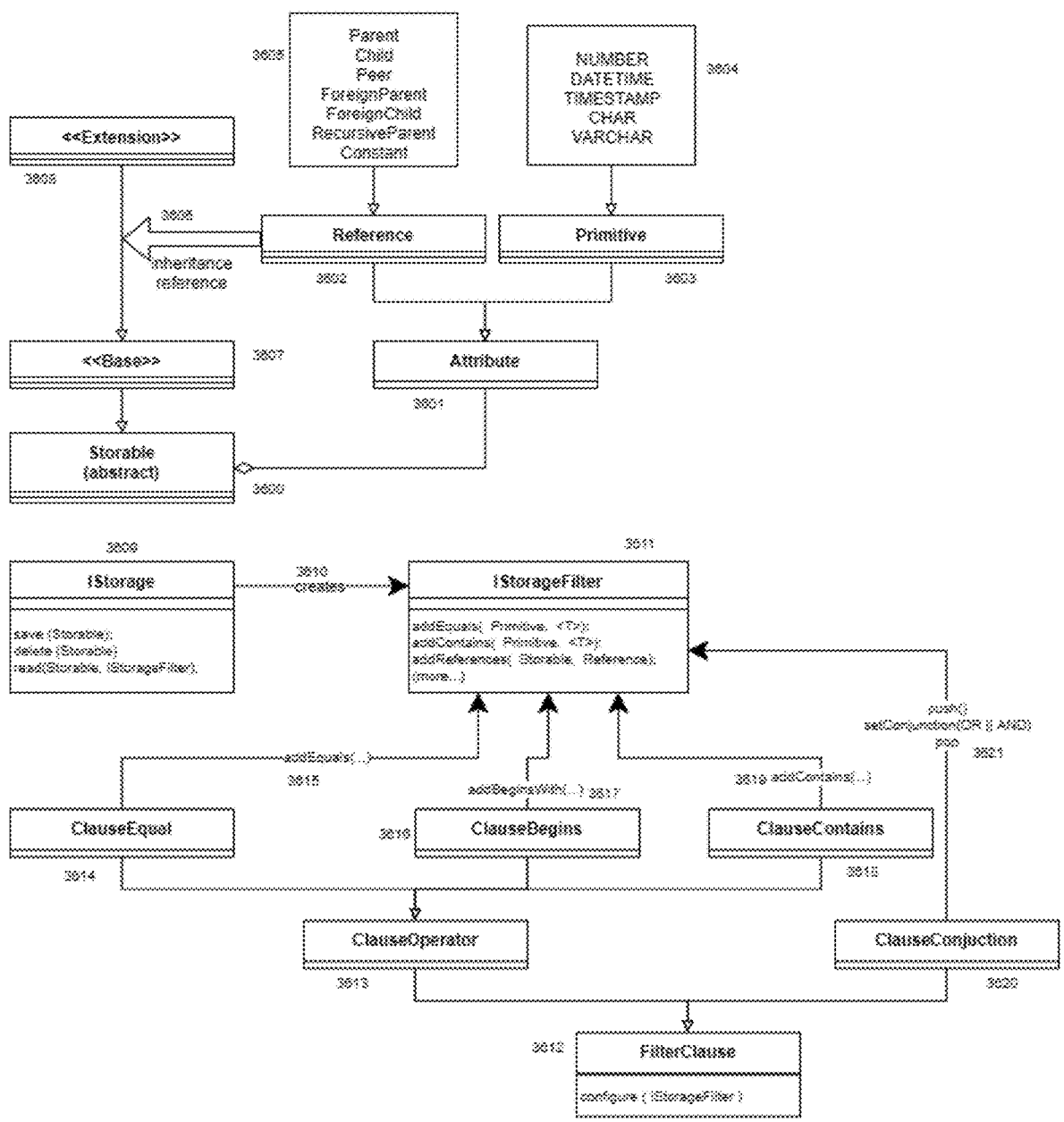
FIG. 7 illustrates examples of Lentiles Classes in accordance with an embodiment.

FIG. 7 illustrates examples of Lentiles Classes in accordance with an embodiment. In the context of the present example, the Lentiles (FIG. 7) framework is a reflective run-time object-relational mapping framework that allows DataMap to discover schema structure, and query and manipulate data using simple Storable (3600) classes, IStorage 3609 and IStorageFilter 3611.

Web Data configuration audit process can automatically infer certain OData object and schema attributes by inspecting the DataMap configuration and Lentiles schema.

Classes that implement Storable 3600 may have the following relationship with a relational database:
  1. The simple name of the Storable (3600) class corresponds to a table in the database
  2. A Storable (3600) class has static members that are Attributes 3601.
  3. The member name of the Attributes corresponds to a column in a table
  4. An instance of a Storable (3600) corresponds to a record
  5. The column values in a record may be referenced by their Attribute 3601.

There may be different types of Attributes 3601, including primitive 3603 and reference 3602. Primitive 3603 may identify values as being of one of the following types:
  1. CHAR
  2. VARCHAR
  3. NUMBER
  4. DATETIME
  5. TIMESTAMP Reference 3602 may be used to facilitate definition of relationships including:
  1. Parent
  2. Child
  3. Peer
  4. ForeignParent
  5. ForeignChild
  6. RecursiveParent
  7. Constant The Lentiles (FIG. 7) framework supports the notion of inheritance 3606. For example, if Storable (3600) B extends Storable (3600) A, then the Lentiles (FIG. 7) framework provisions foreign key references between B and A.

In the context of the present example, the primary methods provided by IStorage 3609 include:
  1. Read (Storable (3600) class, IStorageFilter (3611, 4419))
  2. Save (Storable (3600) [1,n] objects)
  3. Delete (Storable (3600) [1,n] objects)

In one embodiment, IStorageFilter 3611 provides numerous methods that may be used to create a network of objects, that may be rendered as a SQL where clause. The following examples describe how the filter can be used to generate SLQ where clauses. Consider the following Storable (3600) class:

Class DATANODE extends Storable
{
Static NUMBER ID=new NUMBER(Primary);
Static VARCHAR KEY=new VARCHAR(128);
Static VARCHAR VALUE=new VARCHAR(128);
Static RecursiveParent PARENT=new RecursiveParent (DATANODE.class);
}

In Lentiles (FIG. 7), this class corresponds to a database table, DATANODE, with 4 columns: ID, KEY, VALUE and ID_PARENT; where ID is the primary key, and ID_PARENT has a foreign key relationship to column ID in table DATANODE. The class is the basis of a hierarchical data structure that can be persisted in a relational database. The following table contain just a few examples that shows how methods on IStorage (3609) yield SQL where clauses

TABLE 4

IStorage Methods and Corresponding SQL Clauses

| Method on IStorage (3609) | SQL Clause |
|---|---|
| addEquals (DATANODE.KEY,"Widget"); | [DATANODE].[KEY]='Widget' |
| addEquals (DATANODE.PARENT,25); | [DATANODE].[ID_PARENT]=25 AND |
| addNotEquals (DATANODE.ID,25); | [DATANODE].[ID]<>25 |

Some observations from IStorageStorage in relationship to OData include the following:
  1. OData [clients] submits URLs with qualifiers that reference properties values on entities
  2. The web data configuration 1002 maps properties to DataPoints 804 in a DataMap 802; therefore by extension, the URLs reference DataPoints (804).
  3. There is a type of DataPoint 804 implementation that corresponds to an Attribute 3601 on a Storable (3600) class; therefore by extension, the URLs reference Attributes on Storable (3600) classes.
  4. The visitor patterns used by the OLingo libraries allow an embodiment to map: (i) a URI qualifier constructs to methods on IStorageFilter (3611, 4419), (ii) and properties to Attributes; and provide Attributes and values to the methods on IStorageFilter (3611, 4419); that yield the proper SQL; so that the data processed by the SQL statement properly reflects the intention of the URI qualifiers.

In the context of the present example, FilterClause (3612, 4403) 3612 is used to configure an IStorageFilter (3611, 4419) 3611. The basic hierarchy of classes that implement FilterClause (3612, 4403) includes:
  1. ClauseConjunction 3620
  2. ClauseOperator 3613
     a. ClauseBegins 3616
     b. ClauseContains 3618
     c. ClauseEqual 3614

In one embodiment, the ClauseOperators all have left and right parameter objects. During configuration of IStorageFilter (3611, 4419), ClauseOperator tests the types of both parameter, and correlates parameter types to the appropriate method on IStorageFilter (3611, 4419). On method invocation, the parameters are cast to the appropriate type.

ClauseConjunction contains a FilterClause (3612, 4403) list and conjunction type (or, and). During configuration of IStorageFilter (3611, 4419), ClauseConjuction iterates linearly through its list and delegates to ClauseOperator in sequence. If a nested ClauseConjunction is found in the list, IStorageFilter (3611, 4419) is pushed with the nested conjunction type, and process is given to the nested ClauseConjunction to continue the configuration of IStorageFilter (3611, 4419). When process is returned from the nested ClauseConjunction, IStorageFilter (3611, 4419) is popped, and configuration continues until the list has been fully iterated.

FIG. 47 depicts an example of a table showing how a FilterClause (3612, 4403) is configured, what the resulting IStorageFilter (3611, 4419) configuration steps look like, and given the IStorageFilter (3611, 4419) steps, what the resulting SQL where clause looks like in accordance with an embodiment.

Dillon Classes

Figure 8:
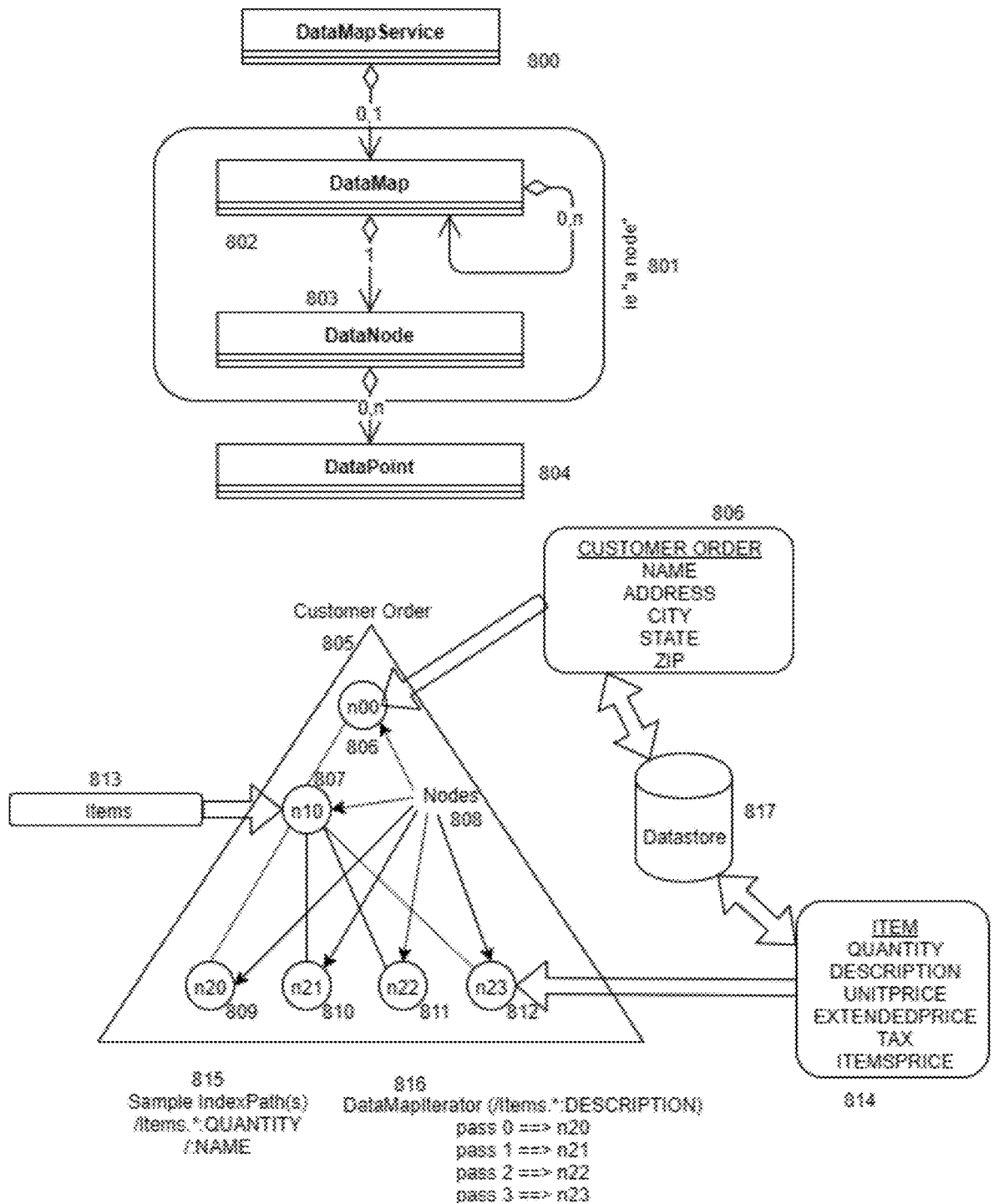
FIG. 8 illustrates DataMapService Composition in accordance with an embodiment.

FIG. 8 illustrates DataMapService Composition in accordance with an embodiment. Dillon teach a b-tree hierarchy of DataMaps, where a DataMap 802 has:
1. A DataNode 803 object
2. A plurality of DataPoint 804 objects, via the DataNode
3. A collection of subordinate DataMaps.

The DataNode (803) and DataPoints (804) may have an ephemeral identifier (id) which may be used to uniquely identify all DataNodes (803) and DataPoints (804). The DataNode (803) shares its ephemeral id with its host DataMap (802), so the DataNode ephemeral id is used to uniquely identify all DataMaps.

Dillon teach, among other things, a DataNode (e.g., DataNode 803) that provides access to a plurality of DataPoints (804). The implementation of a DataNode may be arbitrary but should implement management of, and access to DataPoints (804) in accordance with the DataNode interface specification. Non-limiting examples of DataNodes include the following:
1. A record from a database query, where the node (801) is the record, and the column field values are the DataPoints (804).
2. A standard b-tree map with subordinate values, where the node (801) is the map and the subordinate values are the DataPoints (804).
3. A complex object with logic to query and manipulate remote data, where the node (801) is the complex object, and the logic results in the behavior of DataPoints (804).

DataPoint 804 is an object that has multiple inherent properties and functionality including one or more of the following:
1. A value that can be read and written.
2. A data type such as integer, string, date, generic, etc.
3. An optional default value
4. An optional format (currency, percent, date/time, etc.)
5. An optional formula (used in conjunction with DataMapService (800) and a calculation cycle).

Dillon teaches the use of an index path as a means of referencing any DataMap (802) (DataNode) and DataPoint (804) in an instance of a DataMap (802) hierarchy. An index path can be expressed as an ASCII string using a syntax defined in Dillon. An index path may be
1. Absolute: Referencing from the root of the DataMap (802) hierarchy; or
2. Relative: Referencing from some intermediate location in the DataMap (802) hierarchy Dillon also teach a DataMapService 800 is an object that provides an API for management, operations, query and manipulation access to an instance of a DataMap (802) hierarchy. In addition, the DataMapService (800) provides the API to initiate the loading of an instance of a DataMap (802) hierarchy. Some of the methods on DataMapService (800) provide the following:
1. Install a DataMap (802) in the hierarchy at a location according to an index path
2. Remove a DataMap (802) from the hierarchy at a location according to an index path
3. Read the value of a DataPoint (804) in the hierarchy at a location according to an index path
4. Write the value of a DataPoint (804) in the hierarchy at a location according to an index path
5. Invoke all enabled formulas on all DataPoints (804) in the hierarchy
6. Collect all DataNodes having DataPoint (804) values that have changed, that belong to a common storage system, and persist the change values in the storage system.

Dillon further teaches the concept of an iterator, for example, a node key in an index path designated by an asterisk, '*'. DataMapIterator is introduced, and leverages this concept, by providing a method where given a dominant (DataMap (802)) node (801) in a hierarchy, and an iterator index path referencing subordinate (DataMap (802)) nodes (801), the DataMapIterator provides a means of iterating across all the subordinate nodes (801); and an option for the iterator index path, and DataMapIterator, to reference a DataPoint (804) on each of the subordinate nodes (801). For example, given (i) a dominant node (801), 'n00', and (ii) an iterator index path "/Items.*:DESCRIPTION", and (iii) a corresponding set of subordinate nodes (801), 'n20', 'n21', 'n22', 'n23'; by constructing a DataMapIterator, 'iterator' using 'n00' and "/Items.*:DESCRIPTION", successive calls to 'iterator.next( )', will result in references to subordinate (DataMap (802)) nodes (801), 'n20', 'n21', 'n22', and 'n23'.

In one embodiment, DataMapIterator is used in the process of querying and manipulating DataMap (802) nodes (801), and associated DataPoints (804) on behalf of OData requests. FIG. 5, item 1410 is an index path to a host node (801), and more often than not contains 1400; and item 1449 (or 1464) is a relative index path that identifies a DataPoint (804). Together, item 1410 and 1449 (or 1464) are used to create an absolute index path that DataMapIterator can be used to reference all nodes (801) and DataPoints (804) that are relevant to entity types and properties of an OData request.

Figure 9:
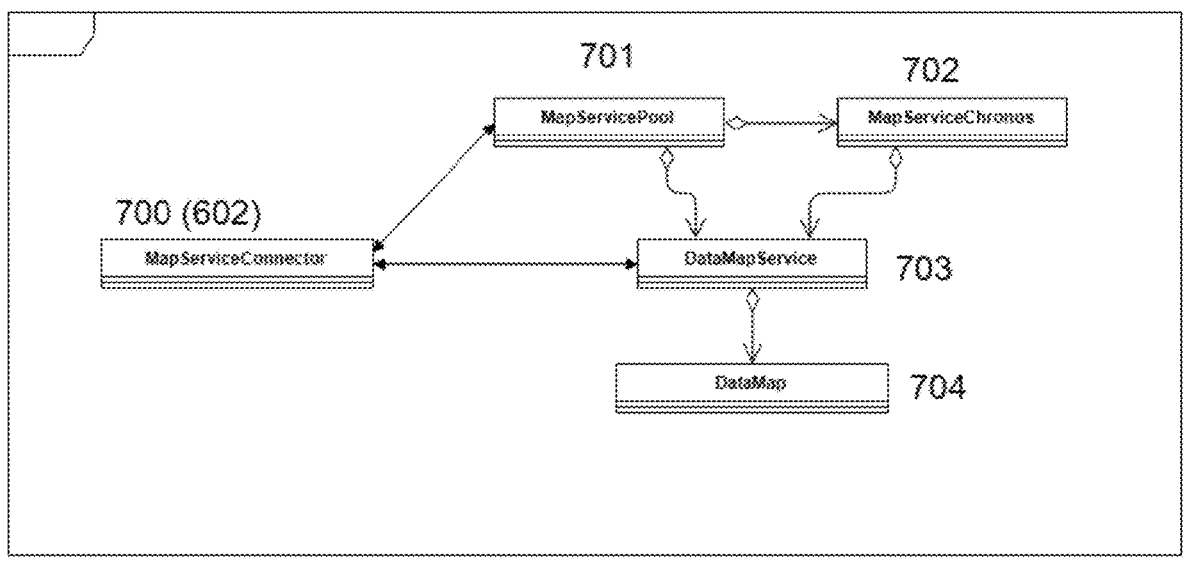
FIG. 9 illustrates a MapServiceConnector and a MapServicePool (MapServiceChronos), in accordance with an embodiment

FIG. 9 illustrates a MapServiceConnector and a MapServicePool (e.g., MapServiceChronos 702), in accordance with an embodiment. In the context of the present example, MapServicePool 701 is used to provide references to DataMapService (800, 703) to a client (application) on behalf of a user (such as a request USER (920)). MapServicePool (701) maintains an internal cache of instances of DataMapService (800, 703) organized by (1) the name of the map, (2) the object identifier of the instance of DataMapService (800, 703) and (3) a collection of users that have requested a reference to the instance of DataMapService (800).

When a client requests a reference, the client provides the name of the map, object identifier and user associated with the request. If an instance of DataMapService (800, 703) is not in the cache, MapServicePool (701) attempts to restore reclaim a matching instance from MapServiceChronos 702. If an instance is reclaimed, the instance is removed from the MapServiceChronos internal cache, and added to the MapServicePool (701) internal cache. If an instance is not reclaimed, a new instance is loaded (see Dillon), and added to the MapServicePool (701) internal cache.

The client, is responsible for releasing its reference to an instance of DataMapService (800, 703) on behalf of the user. A client releases a reference by providing the name of the map, the object identifier and the user. Client or a delegate may release:
  Immediately after applying some operation on a DataMapService (800)
  When a user references a different instance of DataMapService (800)
  When a session associated with a user expires
  When a user logs out and ends a session.

When a client releases a reference and there are no longer any users referencing an instance of a DataMapService (800), the DataMapService (800, 703) is removed from the MapServicePool (701) internal cache and given to MapServiceChronos and added to the MapServiceChronos internal cache.

MapServicePool (701) provides a set of API that delegate directly to MapServiceChronos. MapServiceChronos is intended to be a private extension of MapServicePool (701). See MapServiceChronos regarding:
  Register and un-register query thread.
  Touch MapServiceChronos 702 is responsible for retaining unreferenced instances of DataMapService (800) (and therefore the corresponding DataMap 704) that have been discarded from MapServicePool (701), for a period of time, before completely releasing the DataMapService (800, 703) to program garbage collection. MapServiceChronos maintains an internal cache used to retain references to the DataMapService(s). MapServiceChronos (702) has one or more of the following features:
  1. MapServiceChronos is intended to be a private extension of MapServicePool (701); and MapServicePool (701) provides a number of API that delegate directly to Map ServiceChronos.
  2. The MapServiceChronos cache has a maximum capacity; the oldest DataMapService(s) in the cache are removed when new DataMapService(s) are added, if the maximum is exceeded.
  3. MapServiceChronos monitors the age of the DataMapService(s) in the cache; DataMapService(s) that have been in the cache long enough are removed from the cache.
  4. MapServiceChronos provides an API that allows a client to register a query thread. According to one embodiment, if MapServiceChronos has any registered query threads, then MapServiceChronos will not remove any DataMapService(s) from its internal cache. For the sake of convenience, MapServicePool (701) provides an API that delegates registration to MapServiceChronos. Typically, a client will register a query thread via the MapServicePool (701), fetch a reference to a DataMapService (800, 703), lock access to the DataMapService (800, 703), operate on the DataMapService (800, 703), release the lock on the DataMapService (800, 703), and un-register the query thread. In this way, the client is guaranteed that the DataMapService (800, 703) will remain referenced by either the MapServicePool (701) or MapServiceChronos while it operates on the DataMapService (800, 703).
  5. In one embodiment, MapServiceChronos provides an API that allows a client to "touch" the age of a DataMapService (800, 703), so that at the time of "touch", the DataMapService (800, 703) becomes the youngest member of the MapServicePool (701).
    a. For example, embodiments described herein anticipate a scenario in which a user via the OData client is interactively manipulating and querying DataMapService (800, 703) data via the OData web service proposed herein. In one embodiment, there is no requirement for using a session, and under these circumstances, the OData request is the session. Some embodiments use "touch" to retain the DataMapService (800, 703) in cache long enough so that when the OData user submits a subsequent request, if it is for the cached DataMapService (800, 703), it is less likely that the DataMapService (800, 703) will be reloaded.

In the context of the present example, MapServiceConnector 700 serves as a storage interface to cached data; where the data is grouped by DataMapService(s); and the DataMapService(s) are managed by MapServicePool (701). Many of the MapServiceConnector (700, 602, 1204) API delegate directly to MapServicePool (701) API, and semantically, invoking (methods on) MapServiceConnector (700, 602, 1204) is equivalent to invoking (methods on) MapServicePool (701). MapServiceConnector (700, 602, 1204) has one or more of the following features:
  1. Provides an API that is used to query for instances of DataMapService (800, 703)
    a. All maps of a given name
    b. All maps of a given name and containing a datamap with a matching node (801) identifier
  2. Provides an API to invoke DataMapServiceCommandInf on instances of DataMapService (800, 703)
  3. MapServiceConnector (700, 602, 1204) fetches instances of DataMapService (800, 703) having a given name from MapServicePool (701).
    a. MapServicePool (701) fetches matching instances of DataMapService (800, 703) from its own internal cache; and any matching instances from Map ServiceChronos.
  4. Provides an API to "touch" a cached DataMapService (800, 703). MapServiceConnector (700, 602, 1204) delegate "touch" to MapServicePool (701).

FIG. 10 illustrates a Sample Storable Schema in accordance with an embodiment. Throughout this document, there are code and configuration snippets that include things like DATANODE, DEMOOPP and more. This section describes FIG. 10, Sample Storable Schema. DATANODE 4300 is a Storable (3600) class, that serves as a convenient, fundamental, building block of DataMaps. DATANODE is not required to build DataMaps, but it has features that make it easier to design DataMaps. DATANODE has a RecursiveParent attribute, PARENT 4302, that references DATANODE; and enables an unbounded hierarchical structure.

The Lentiles (FIG. 7) storage framework supports Storable (3600) inheritance, so all classes that extend DATANODE will also inherit the features of DATANODE; in the context of FIG. 10, this includes DEMOOPP 4330, DEMOEST 4340, DEMOQUOTE 4350 and DEMOITEM 4360. Because DEMOOPP, et al., inherit RecursiveParent: PARENT, the diagram 4370 is valid; showing DEMOOPP as parent (4371 and 4372) to DEMOEST and DEMOQUOTE, and DEMOQUOTE as parent (4375) to DEMOEST. The relationship between DEMOITEM and DEMOEST (4376) is managed by formulas of the DataMap (802) and a DEMO application user interface. When a DATANODE is deleted via Lentiles (FIG. 7), all subordinate DATANODEs are also deleted; and any records for classes that extend DATANODE that are keyed to the deleted DATANODEs are also deleted. Records may be deleted immediately, or optionally in the case of DATANODE records can be deleted when certain conditions are met, such as application sessions; the is done by delegating the delete process to ScrubbingServer 4391.

In the context of the present example, when program logic gives ScrubbingServer a DATANODE to delete, ScrubbingServer inserts a scrubbing DATANODE 4393, and re-assigns the parent 4394 of the DATANODE 4396 being deleted to the scrubbing DATANODE 4395. After the passing of time, when conditions are met, the scrubbing DATANODE is deleted; and in doing so the child DATANODE is deleted. The use of ScrubbingServer helps with applications where many records are deleted, and users experience time delays while records are being deleted. By moving to a scrubbing DATANODE, the system can do things like wait for user sessions to drop to ZERO or some small number, and then start deleting.

Web Data Classes

Figure 11:
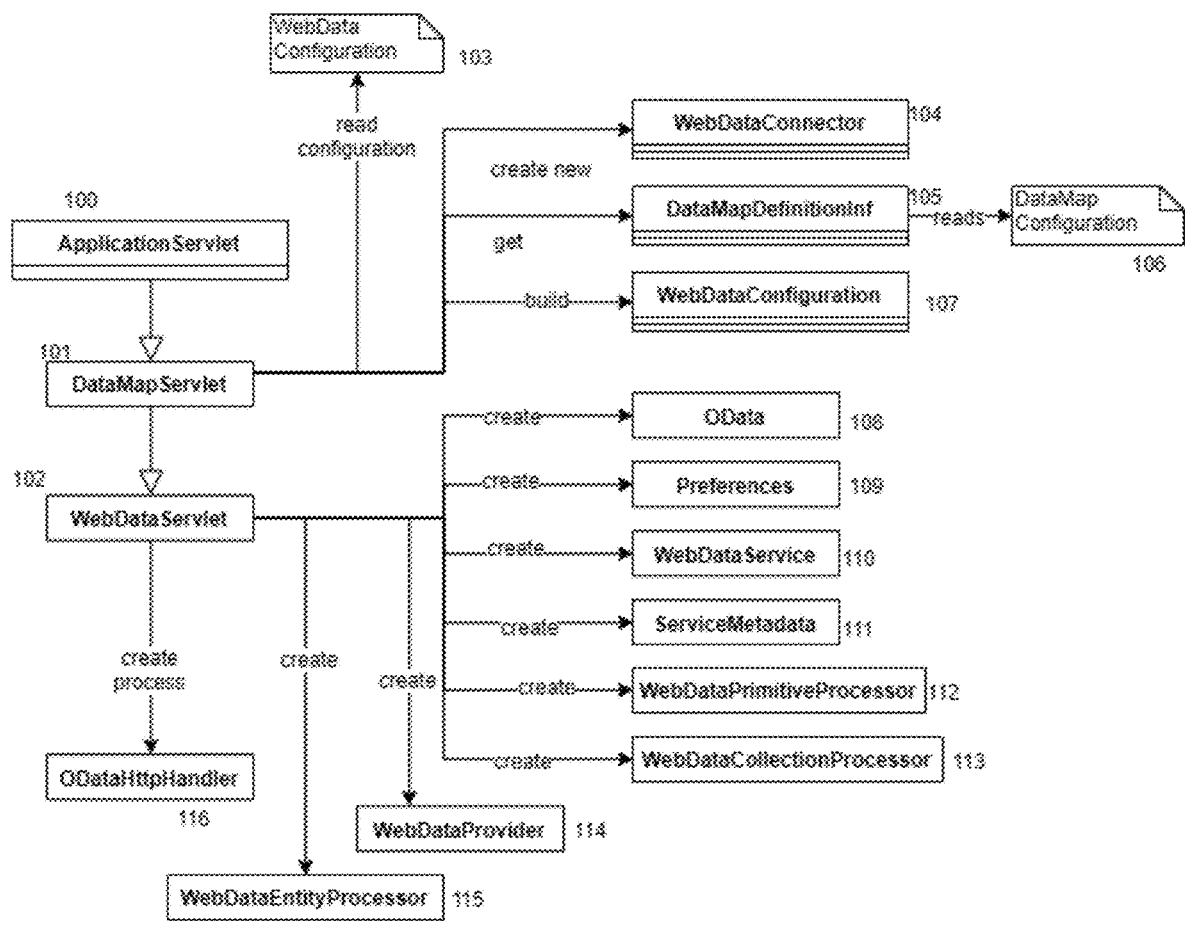
FIG. 11 illustrates a WebDataServlet Hierarchy in accordance with an embodiment.

FIG. 11 illustrates a WebDataServlet Hierarchy in accordance with an embodiment. In the context of the present example, Application Servlet 100 extends DataMapServlet 101. The webdata XML configuration filename and location correspond to application class name and package, respectively. This is a matter of convenience; other protocols or rules may be used to determine filename and location of webdata configuration.

DataMapServlet 101 extends WebDataServlet 102. Overrides service method to ensure a WebDataConnector 104 is created and registered with the name of the datamap definition. If a WebDataConnector is not registered, a new WebDataConnector is created and configured by streaming webdata xml configuration 103 into a WebDataConfiguration 107, which processes the xml into objects that are retained by WebDataConnector.

WebDataServlet 102 extends HttpServlet and:
1. Implements main body of service method
2. Semaphore lock on web service user agent
3. Obtains reference to WebDataConnector 104
4. Authenticates request user
5. Loads OLingo library with following handlers
   a. WebDataProvider 114
   b. WebDataCollectionProcessor (113, 202, 912, 2801)
   c. WebDataEntityProcessor (115, 201, 911, 2103, 2203, 3903)
   d. WebDataPrimitiveProcessor (112, 203, 911)
   e. WebDataProvider 114
6. Invokes the OLingo main process method In the context of the present example, WebDataConnector 104 contains a collection of webdata objects that correspond to the exposed DataPoints (804) of a DataMap (802) through an OData schema. The collection of webdata objects were created by streaming the web data configuration (103) into a WebDataConfiguration (107); where the stream is parsed, and objects are created and retained in WebDataConnector (104).

The collection includes a keyed collection of WebDataEntityType (406); and each instance of WebDataEntityType contains a keyed collections of WebDataEntityProperty (412) and WebDataNavigationPropertyInf (3800), and references to children and parent as they are implied by the web data configuration (103).

WebDataConnector also provides a number of methods that return Olingo objects (by converting WebDataEntityType objects, et al), that in turn are used internally by Olingo to respond to requests for schema information.

In the context of the present example, WebDataConfiguration (107) contains references to (2) configurations and is used to build the OData object models into WebDataConnector. The (2) configurations include:
1. DataMapDefinitionInf (105) (data map configuration (106))
2. Web data configuration (103).

Based on the configurations, WebDataConfiguration creates various types of DataMapEntityType, WebDataEntityProperty and WebDataNavigationProperty (3801); and installs them into WebDataConnector such that WebDataConnector contains the objects that model the OData schema provided by this OData web data service. The details of the DataMapDefinitionInf (105) (data map configuration (106)) are described in further detail in Dillon, but suffice to say that WebDataConfiguration has access to DataMap's (802) DataNode(s) (803) and DataMapPoint(s) (804), and their attributes.

In one embodiment, the form of the web data configuration (103) use by WebDataConfiguration (107) is a collection of objects, specifically maps, sets and vectors and strings that are organized in accordance with the specification (see, e.g., FIG. 5) of the web data configuration (1400). For example, if the entire configuration is provided as a single map[string,object] M, then according to the specification, the metadata can be referenced via: map [string, object] METADATA=M.get("metadata").

Based on the specification (see, e.g., FIG. 5) for the web data configuration (1400), WebDataConfiguration (107) builds OData object models by iterating through the web data configuration (1400), creating various types of DataMapEntityType (407), WebDataEntityProperty (412) and WebDataNavigationProperty (3801); and installing them into WebDataConnector (104).

Figure 25:
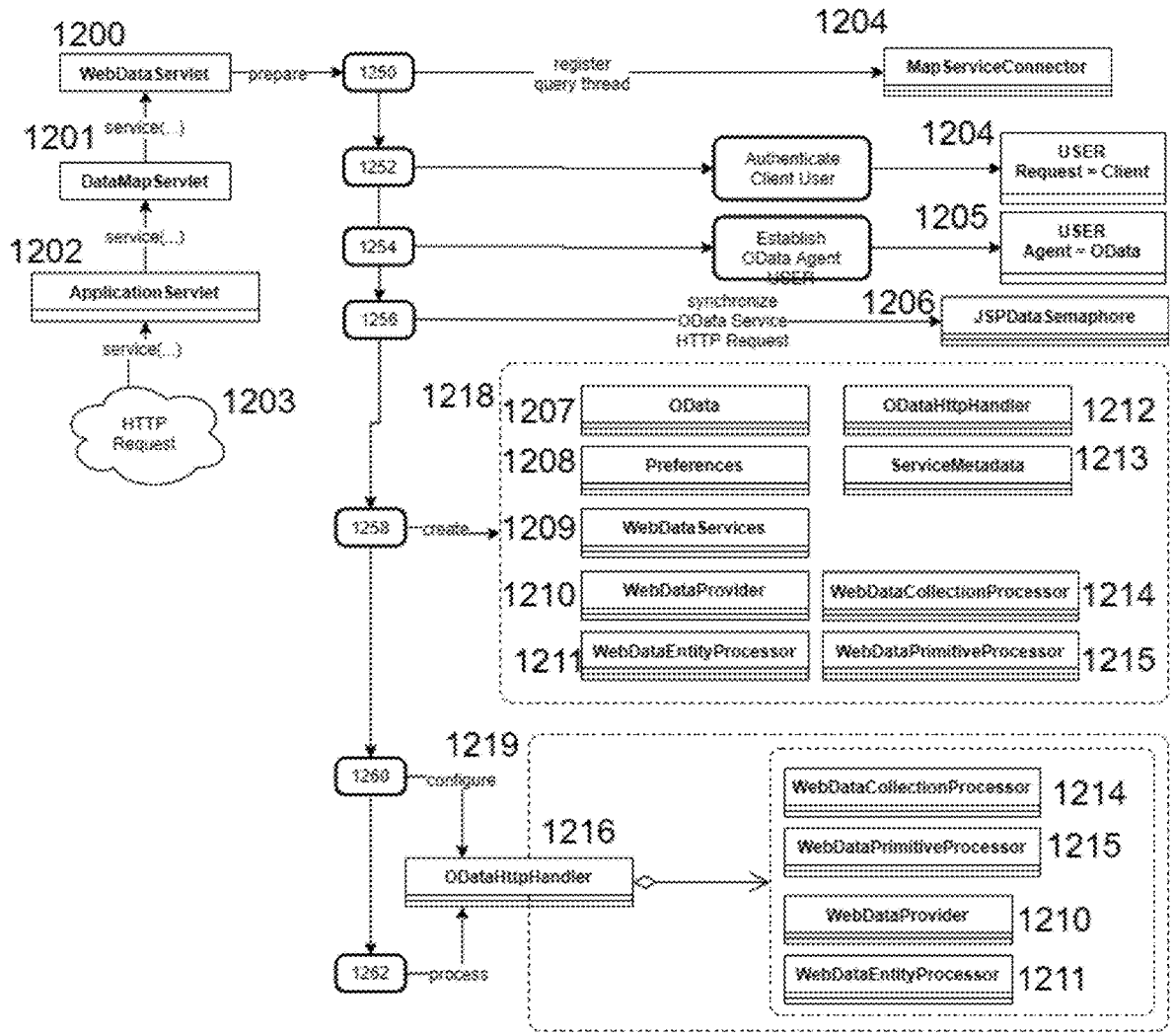
FIG. 25 illustrates ODataHttpHandler Preparation in accordance with an embodiment.

WebDataService (1209) contains references to objects established in the service method of an odata Request (see, e.g., FIG. 25). WebDataService provides API to access the request USER, agent USER, OLingo request data and preferences, and the HttpServletRequest and HttpServletResponse associated with the request.

WebDataEntityStorage (301) has a reference to WebDataService (1209), that is established when a duplicate instance of WebDataEntityStorage (301) is created. The method used to duplicate WebDataEntityStorage (301) has a parameter that references the WebDataService (1209) associated with the request. For all OData requests, the instance(s) of WebDataEntityStorage (301) provided to the algorithms are created by duplicating the initial instance of WebDataEntityStorage (301) that was created via WebDataConfiguration (107). As such, the creator (1420, 1440), installer (1419, 1439), loader (1412) and similar objects associated with WebDataEntityStorage (301) have access to the instance of WebDataService (1209) associated with the odata request.

Figure 12:
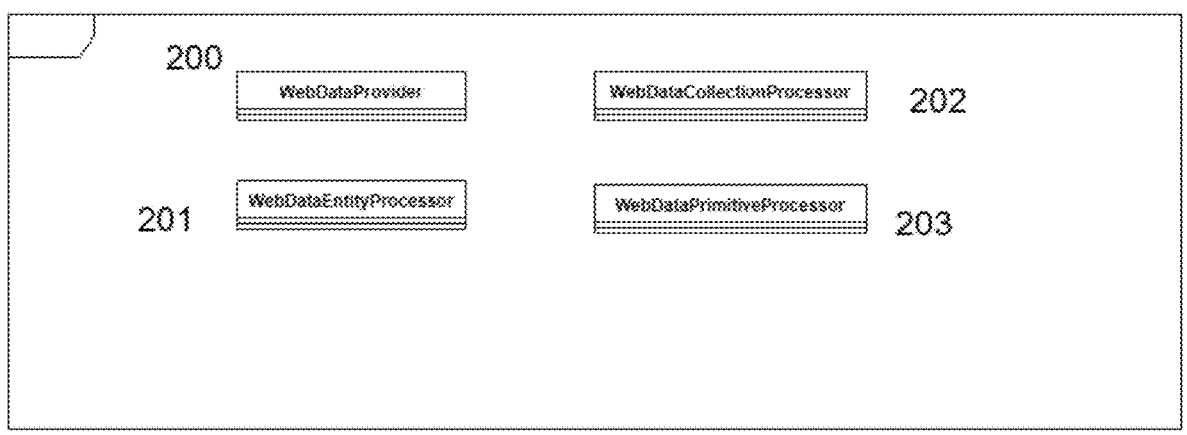
FIG. 12 illustrates WebData OLingo Processors in accordance with an embodiment.

FIG. 12 illustrates WebData OLingo Processors in accordance with an embodiment. In the context of the present example, WebDataProvider 200 is used primarily to respond to requests from client regarding schema structure.

WebDataCollectionProcessor (113, 202, 912, 2801) has the following features:
1. Responds to client queries that may include navigation (e.g., joins) and multiple record result set
2. Applies $orderby directives on result set
3. Applies $count, $skip and $top directives on result set 4. Delegates actual query implementation to WebDataEntityStorageInf (300, 1904, 2004, 2104, 2204, 3904) interface
   a. The webdata xml configuration (see, e.g., FIG. 5) defines the implementation of entity storage that is associated with an entity.

WebDataEntityProcessor (115, 201, 911, 2103, 2203, 3903) has the following features:
1. Responds to client queries that may include navigation (e.g., joins) and single record result set
2. Responds to client request to create an entity (e.g., a record)
3. Responds to client request to update an entity (e.g., a record)
4. Responds to client request to delete an entity (e.g., a record)
5. Delegates actual query and manipulation implementation to WebDataEntityStorageInf (300, 1904, 2004, 2104, 2204, 3904) interface
   a. The webdata xml configuration (see, e.g., FIG. 5) defines the implementation of entity storage that is associated with an entity.

Figure 13:
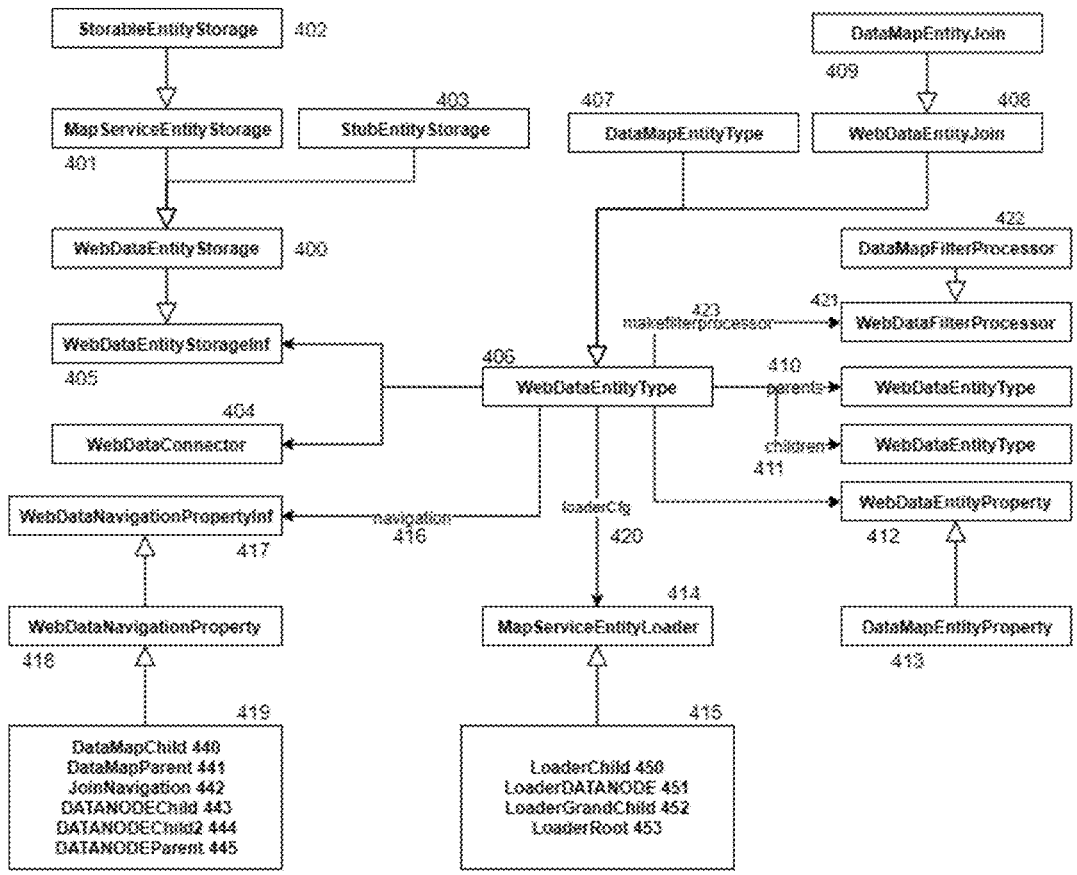
FIG. 13 illustrates WebDataEntityType Composition in accordance with an embodiment.

WebDataPrimitiveProcessor (112, 203, 911) has the following features:
1. Responds to client query for specific property data associated with an entity
   a. For example, an "Account" is an entity that has a property named "OwnerName".
2. Responds to client request to create, update and/or delete specific property data associated with an entity.
3. Delegates actual query and manipulation implementation to WebDataEntityStorageInf (300, 1904, 2004, 2104, 2204, 3904) interface WebDataEntityType FIG. 13 illustrates WebDataEntityType Composition in accordance with an embodiment. While not a strict rule, in general, classes that are prefixed with the signature "WebData" are abstractions of an implementation that are independent of a storage system; classes that are prefixed with the signature "DataMap" are implementations having to do with DataMap (802), DataPoint (804) and MapServiceConnector (700, 602, 1204) storage system; classes that are prefixed with the signature "Storable" are implementations having to do with the Lentiles (FIG. 7) storage system.

In the context of the present example, WebDataEntityType 406 contains configuration data that is used to associate a node (801) in a DataMap (802) with a corresponding entity type. Given an instance of a node (801) in a DataMap (802) and WebDataEntityType (406), and entity can be constructed; or, given an entity and WebDataEntityType (406), a node (801) can be found in a DataMap (802).

If a request URI contains an entity type name, the name can be used to look up a WebDataEntityType (406) using WebDataConnector (404).

WebDataEntityType configuration includes an index path (1410), which is used to locate all nodes (801) in a DataMap (802) having a hierarchical schema position in the DataMap (802).

WebDataEntityType (406) contains a keyed collections of WebDataEntityProperty (412) and WebDataNavigationPropertyInf (417), and serves as the host to the WebDataNavigationPropertyInf (417).

WebDataEntityType (406) has references to children (411) and parent (410) WebDataEntityType, as they are configured in the web data configuration (1463); navigational properties are provided accordingly.

WebDataEntityType (406) provides a method, makefilterprocessor, that returns an WebDataFilterProcessor (421). WebDataFilterProcessor (421) is used by WebDataCollectionProcessor (113, 202, 912, 2801) to navigate the URI. The base WebDataFilterProcessor (421) provides URI parameters and a WebDataExpressionVisitor (4513) to an OLingo Expression, whereby entities in an input collection are evaluated for inclusion in the returned collection.

In the context of the present example, DataMapEntityType (407) extends WebDataEntityType (406) and expectsproperties that are associated with a DataMapEntityType (407) and must be of the type DataMapEntityProperty (413); where DataMapEntityProperty (413) is an extension of WebDataEntityProperty (412). Properties are associated an DataMapEntityType (407) via a method that overrides WebDataEntityType (406) and requires properties to be an implementation of DataMapEntityProperty 413.

DataMapEntityType (407) provides lookup methods so that given a property name or a relative DataPoint (804) index path (1410), a corresponding DataMapEntityProperty 413 is returned. DataMapEntityType (407) overrides makefilterprocessor 423 to return DataMapFilterProcessor 422, an extension WebDataFilterProcessor 421. DataMapFilterProcessor 422 overrides the process of WebDataFilterProcessor 421, by first calling into the process of WebDataFilterProcessor 421; and then if the output collection is empty, and the DataMapEntityType (407) has a loader (1412), and the URI parameters contain a reference property (primary key), then an attempt is made to load the DataMap (802) into cached. Once the DataMap (802) is loaded, the process of WebDataFilterProcessor (421) is again invoked, but now that the DataMap (802) is loaded, the returned output collection contains a result.

In the context of the present example, WebDataEntityJoin 408 extends WebDataEntityType 406, and is used to model relationships between two WebDataEntityType. WebDataEntityJoin (408) is a type definition and does not hold values. WebDataEntityJoin has an "owner" (1455) WebDataEntityType, and an "other" (1456) WebDataEntityType 406.

WebDataEntityJoin 406 attributes support integration with OLingo, but do not contain information relating to a DataMap (802) or datastore. DataMapEntityJoin 409 extends WebDataEntityJoin 406, and DataMapEntityJoin 409 contains attributes that describe the relationship between a property and a DataMap (802) (and therefore a datastore).

OData navigation is implied with WebDataEntityJoin (408). The process of initialization includes the manifestation of OLingo navigation references for each instance of WebDataEntityJoin (408).

DataMapEntityJoin 409 extends WebDataEntityJoin 406, and has an "owner" (1455) link (1458) index path and an "other" (1456) index path (1457).

The link (1458) index path is a relative index path to an owner (1455) data that locates the piece of data that uniquely identifies the other (1456). The absolute index path would be the owner DataMapEntityType group index (1410)+the owner link index (1458):

Examples of owner fields:
":VALUE"—typically the link index would be ":SEQUENCE"
":LINK"—typically the link index would be ":ID"

In one embodiment, the "other" index path is the field on the other, that contains the data that must match the data referenced using linkIndex.

Examples of other fields:
":SEQUENCE"—typically the link index would be ":VALUE"
":ID"—typically the link index would be ":LINK"

DataMapEntityJoin (409) has a collection of DataMapEntityProperties (413) that are based on the properties of the (2) entities that are joined All the properties from the owner (1455) and other (1456) entities are cloned, except the reference properties.

A property named "OwnerId" is added in lieu of the owner reference property, and a property named "OtherId" is added in lieu of the other reference property.

For all other properties, the property names of the clones are prefixed with a unique designator; in one embodiment the prefix designator for cloned owner properties is "L"; and the prefix designator for cloned other properties is "R".

DataMapEntityJoin (409) has (2) intrinsic navigational properties: one for the relationship to the owner (1455) entity, and one for the relationship to the other (1456) entity.

The (2) navigational properties are implemented using a JoinNavigation (442), which is described in its own section.

WebDataEntityProperty (412) contains attributes that describe an [entity] property; it is a type definition of a property, and does not directly hold property values. WebDataEntityProperty (412) are added to WebDataEntityType (406) by WebDataConfiguration (107) as part of the initialization process. In the initialization process DataMapServlet (101) builds a WebDataConnector (104); WebDataConnector (104) is initialized with a WebDataConfiguration (107), and WebDataConfiguration (107) uses web data configuration (1400) and DataMap configuration (1300) to create [extensions of] WebDataEntityType (406) and WebDataEntityProperty (412). WebDataEntityProperty (412) attributes support integration with OLingo, but do not contain information relating to a DataMap (802) or datastore. DataMapEntityProperty (413) extends WebDataEntityProperty (412), and DataMapEntityProperty (413) contains attributes and API that are appropriate for relationship between a property and a DataMap (802) and datastore. Additional extensions of WebDataEntityProperty (412) could be introduce and designed to support a property and the type of storage system the extension operates with.

DataMapEntityProperty (413) extends WebDataEntityProperty (412), and contains attributes that relate a property to DataPoints (804) in a DataMap (802). DataMapEntityProperty (413) has a relative DataMap (802) index path, and is a property of DataMapEntityType (407). Taken together, there is sufficient data to reference DataPoints (804) in a DataMap (802). DataMapEntityProperty (413) is also used for Lentiles (FIG. 7) datastore applications. The data (1448) key (1449) or subpath (1464) contains sufficient information to identify a corresponding attribute is a Storable (3600) class (or by extension a column and table).

WebDataNavigationProperty

Figure 14:
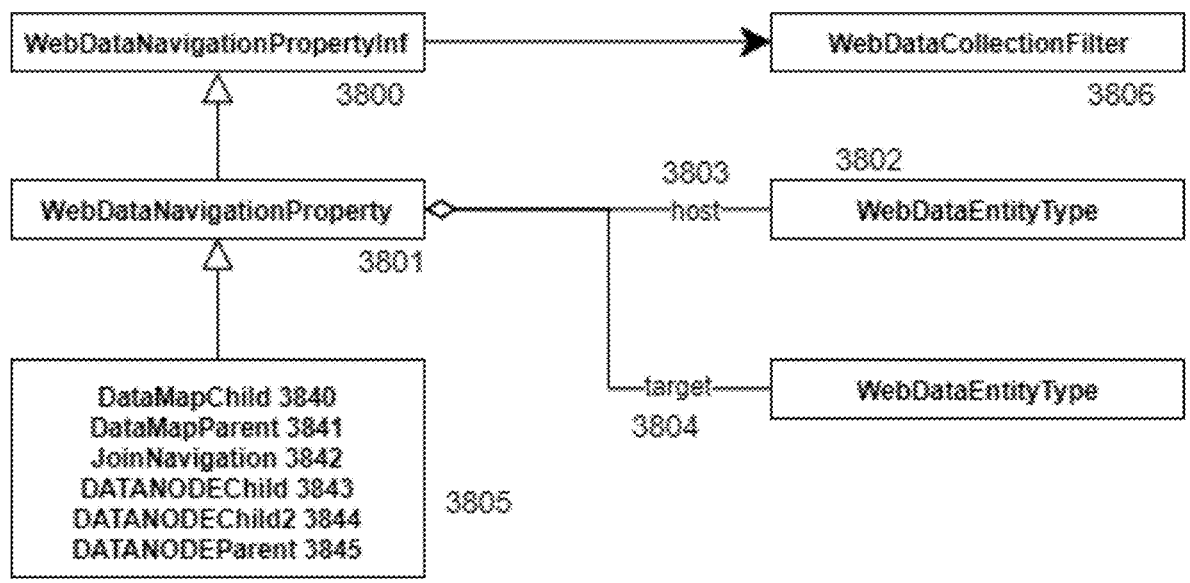
FIG. 14 illustrates a WebDataNavigationProperty in accordance with an embodiment.

FIG. 14 illustrates a WebDataNavigationProperty (3801) in accordance with an embodiment. In the context of the present example, WebDataNavigationProperty (3801):

1. Models a relationship between two DataMapEntityType (407); a host (3803) and a target (3804).
2. Is tightly bound to the host (3803), and is a navigational property of the host (3803);
3. Provides a WebDataCollectionFilter (3700) that is used to qualify entity records according to the relationship.

Web navigation properties are configured in the web data configuration (1400), or are implied based on an intrinsic relationship between (2) entity types. Navigation properties that are based on a web data configuration (1400) are specified via FIG. 5, items 1426 and 1441 Navigation properties that are implied from a relationship include join entity types specified via FIG. 5, item 1452.

DataMapChild (3840) extends WebDataNavigationProperty (3801) to model a relationship where the host is the child and the target (1428, 1443) is the parent; and provides a WebDataCollectionFilter (3700) that qualifies parent entity records. The filter (3700) "include" method (3710) compares the reference property of a candidate entity with a parent record; where the parent record is established from a given child and the configuration (1441) of DataMapChild (3840).

DataMapParent (3841, 441) extends WebDataNavigationProperty (3801) to model a relationship where the host is the parent and the target (1428, 1443) is the child; and provides a WebDataCollectionFilter (3700) that qualifies child entity records. The filter (3700) "include" method (3710) compares the reference property of a candidate entity with a child record; where the child record is established from a given parent and the configuration (1441) of DataMapParent (3841, 441).

DataMapEntityJoin (409) has (2) JoinNavigation (3842), one for each intrinsic relationship DataMapEntityJoin (409) has with the "owner" and "other" entities. JoinNavigation (3842, 442) extends WebDataNavigationProperty (3801) and provides JoinFilter that qualifies entity records according to the configuration of DataMapEntityJoin (409). DataMapEntityJoin (409) is a child entity with respect to both the owner and other entities; therefore with JoinNavigation (3842, 442), DataMapEntityJoin (409) is the host and "owner" (1455) and "other" (1456) are targets.

JoinFilter (3752) extends WebDataCollectionFilter (3700, 2707). During filter evaluation, JoinFilter (3752) is given a candidate target (parent) DataMap (802) and host entity The reference property of the host entity corresponds to the ephemeral ID of a [host] child DataMap (802). Using the ephemeral ID, a reference to a child DataMap (802) is established. If the child descends from the candidate parent, the filter includes the candidate target.

JoinNavigation (3842, 442) is interesting from the standpoint that there are no tangible instances of DataMapEntityJoin (409), but virtual instances of DataMapEntityJoin (409) can be said to exist if the include method on the filter provided by JoinNavigation (3842, 442) evaluates true for a given pair of joined entities.

DATANODEChild (3843) extends WebDataNavigationProperty (3801) and:
1. Provides a filter that extends StorableCollectionFilter (3703), that is used to configure an IStorageFilter (3611), so that given a parent record, a storage query can retrieve all child records. (See DATANODE Schema (4300))
   a. select child where child.id_parent in (select parent.id where parent.id={ID})

DATANODEChild2 (3844) extends DATANODEChild (3843) and:
1. Provides a filter that extends StorableCollectionFilter (3703), that is used to configure an IStorageFilter (3611), so that given a grandparent record, a storage query can retrieve all child records. (See DATANODE Schema (4300))
   a. select child where child.id_parent in (select parent.id where parent.id_parent in (select grandparent.id where grandparent.id={ID}))

DATANODEParent (3845) extends WebDataNavigationProperty (3801) and:
1. Provides a filter that extends StorableCollectionFilter (3703), that is used to configure an IStorageFilter (3611), so that given a child record, a storage query can retrieve a parent record. (See DATANODE Schema (4300))
   a. select parent where parent.id in (select child.id_parent where child.id={ID})

WebDataEntityStorageInf

Figure 15:
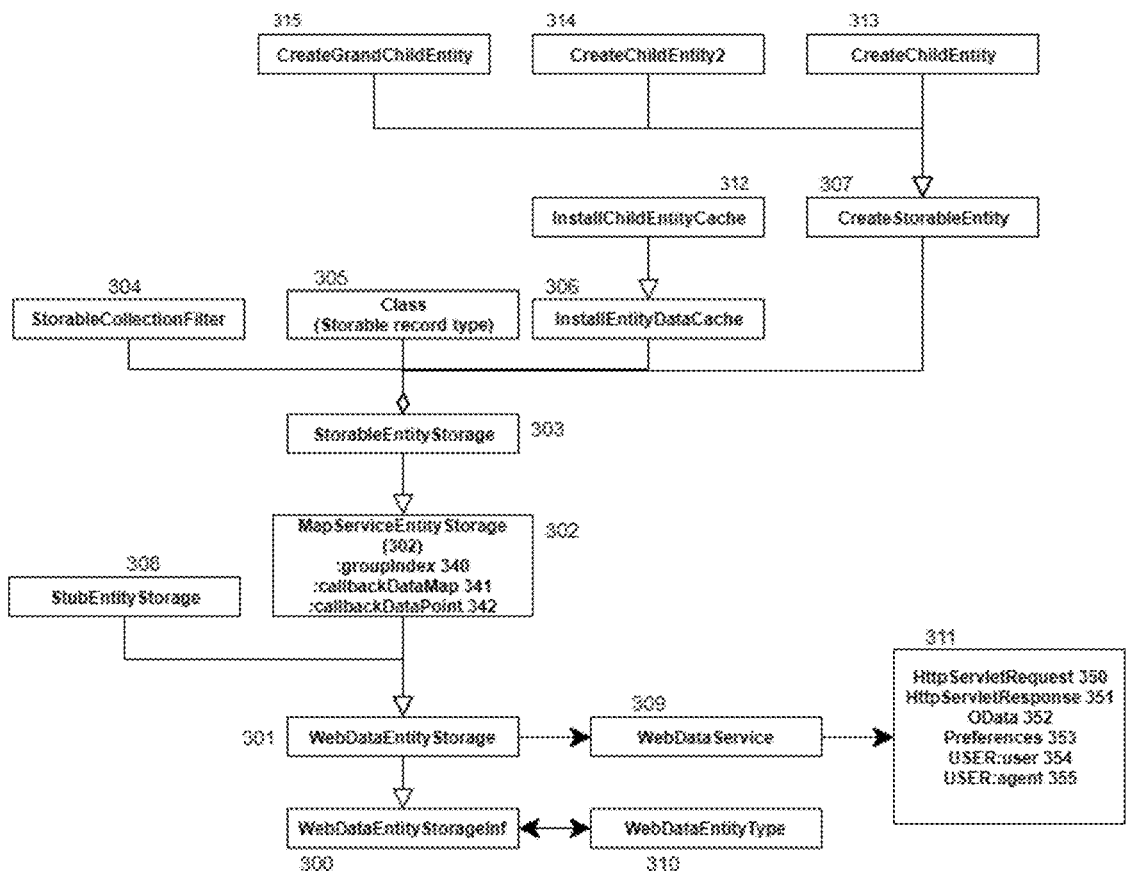
FIG. 15 illustrates a WebDataEntityStorage Hierarchy in accordance with an embodiment.

FIG. 15 illustrates a WebDataEntityStorage Hierarchy in accordance with an embodiment. In the context of the present example, WebDataEntityStorageInf (300) defines a set of APIs that are used by OData processors (see, e.g., FIG. 12) in response to OData requests. This set of methods includes:
1. readEntitySetData: This method is invoked by WebDataCollectionProcessor (113, 202, 912, 2801) when the URI contains a request for a collection of entities. OLingo parses the URI and provides parameters: URI info and the entity type. This method returns a collection of entities based on the parameters provided by OLingo.
2. getRelatedEntityCollection: This method is invoked by WebDataCollectionProcessor (113, 202, 912, 2801) when the URI contains a navigation. OLingo parses the URI and provides parameters: a host entity, a target entity type and navigational property defining the relationship between the host and target. This method returns a collection of entities based on the parameters provided by OLingo.
3. readEntityData; This method is invoked by:
   a. WebDataCollectionProcessor (113, 202, 912, 2801) and WebDataEntityProcessor (115, 201, 911, 2103, 2203, 3903) when the URI contains a navigation. OLingo parses the URI and provides parameters: a host entity type and a list of property values. This method returns an [host] entity based on the parameters provided by OLingo.
   b. WebDataEntityProcessor (115, 201, 911, 2103, 2203, 3903) when the URI contains a request for a specific entity. OLingo parses the URI and provides parameters: an entity type and a list of property values. This method returns an entity based on the parameters provided by OLingo.
   c. WebDataPrimitiveProcessor (112, 203, 911) when the URI contains a request for a specific property value of an entity. OLingo parses the URI and provides parameters: an entity type and a list of property values. This method returns an entity based on the parameters provided by OLingo. The requested property value is obtained from the entity returned by this method.
4. getRelatedEntity: This method is invoked by WebDataEntityProcessor (115, 201, 911, 2103, 2203, 3903) when the URI contains a navigation from a host entity to a specific target entity. OLingo parses the URI and provides parameters: an host entity, a target entity type and navigational property defining the relationship between the host and target. This method returns an entity based on the parameters provided by OLingo
5. getRelatedEntityPredicates: This method is invoked by WebDataEntityProcessor (115, 201, 911, 2103, 2203, 3903) when the URI contains a navigation from a host entity to a specific target entity. OLingo parses the URI and provides parameters: an host entity, a target entity type, a list of property values that qualify a target entity, and navigational property defining the relationship between the host and target. This method returns an entity based on the parameters provided by OLingo
6. updateEntityData: This method is invoked by WebDataEntityProcessor (115, 201, 911, 2103, 2203, 3903) when the URI contains a request to update an entity. OLingo parses the URI and provides parameters: the entity type, a list of property values that qualify the entity to update, and an entity with property values to apply as part of the update.
7. createEntityData: This method is invoked by WebDataEntityProcessor (115, 201, 911, 2103, 2203, 3903) when the URI contains a request to create an entity. OLingo parses the URI and provides parameters: the entity type, and an entity with property values to apply as part of the creation.
8. deleteEntityData: This method is invoked by WebDataEntityProcessor (115, 201, 911, 2103, 2203, 3903) when the URI contains a request to delete an entity. OLingo parses the URI and provides parameters: the entity type, a list of property values that qualify the entity to delete It is at the discretion of each implementations of WebDataEntityStorageInf (300, 1904, 2004, 2104, 2204, 3904) whether a particular API is actually implemented; however, if an API is implemented, it must adhere to the requirements of the OLingo request.

Figure 16:
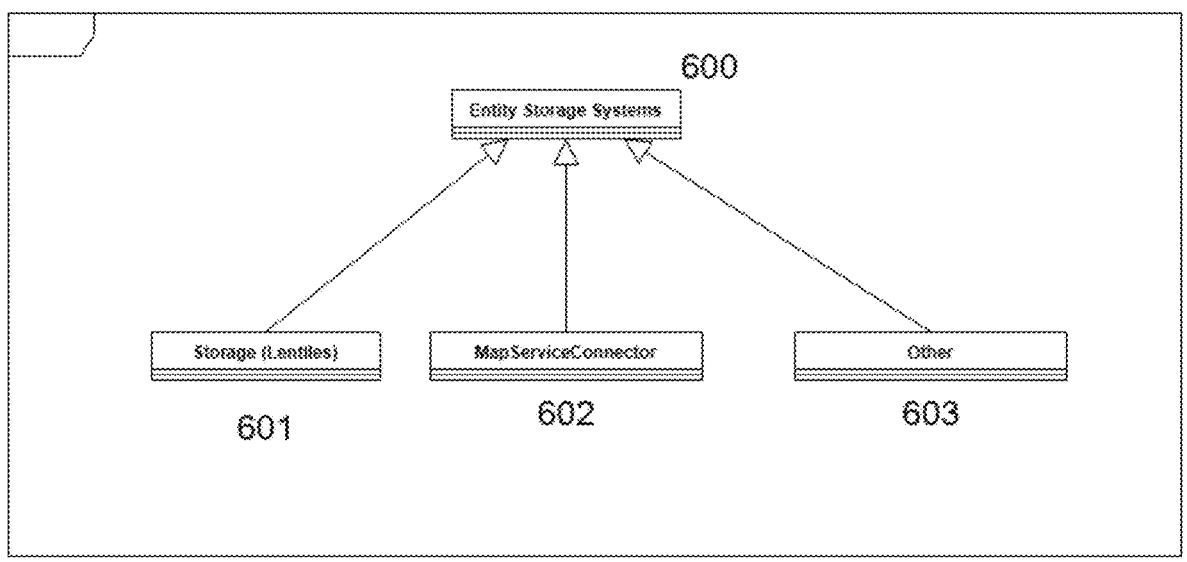
FIG. 16 illustrates Entity Storage Systems in accordance with an embodiment.

FIG. 16 illustrates Entity Storage Systems in accordance with an embodiment. In one embodiment, there are (2) concrete implementations of WebDataEntityStorageInf (300, 1904, 2004, 2104, 2204, 3904) (Lentiles (FIG. 7) and MapServiceConnector (700, 602, 1204)), and the interface may be implemented by other storage systems.

StorableEntityStorage (303, 2007, 2205, 3905) provides access to Lentiles (FIG. 7) and MapServiceEntityStorage (302) provides access to cached DataMapService (800, 703) data via MapServiceConnector (700, 602, 1204).

WebDataEntityStorage (301) is an abstract class that implements WebDataEntityStorageInf (300), and implements many of the API defined by WebDataEntityStorageInf (300); and those implementations delegate to an alternate set of API that normalize similar OLingo parameters to uniform types.

MapServiceEntityStorage (302) extends WebDataEntityStorage (301) to implement the normalized API to operate with a cache storage system.

StorableEntityStorage (303) extends MapServiceEntityStorage (302) and overrides normalized API as necessary to operate with the Lentiles (FIG. 7) storage system, but to also leverage access to the cached storage system for beneficial use as described herein. MapServiceEntityStorage (302) extends WebDataEntityStorage (301), and is used to query and operate on cached DataMapService (800) data via MapServiceConnector (700, 602).

Figure 28:
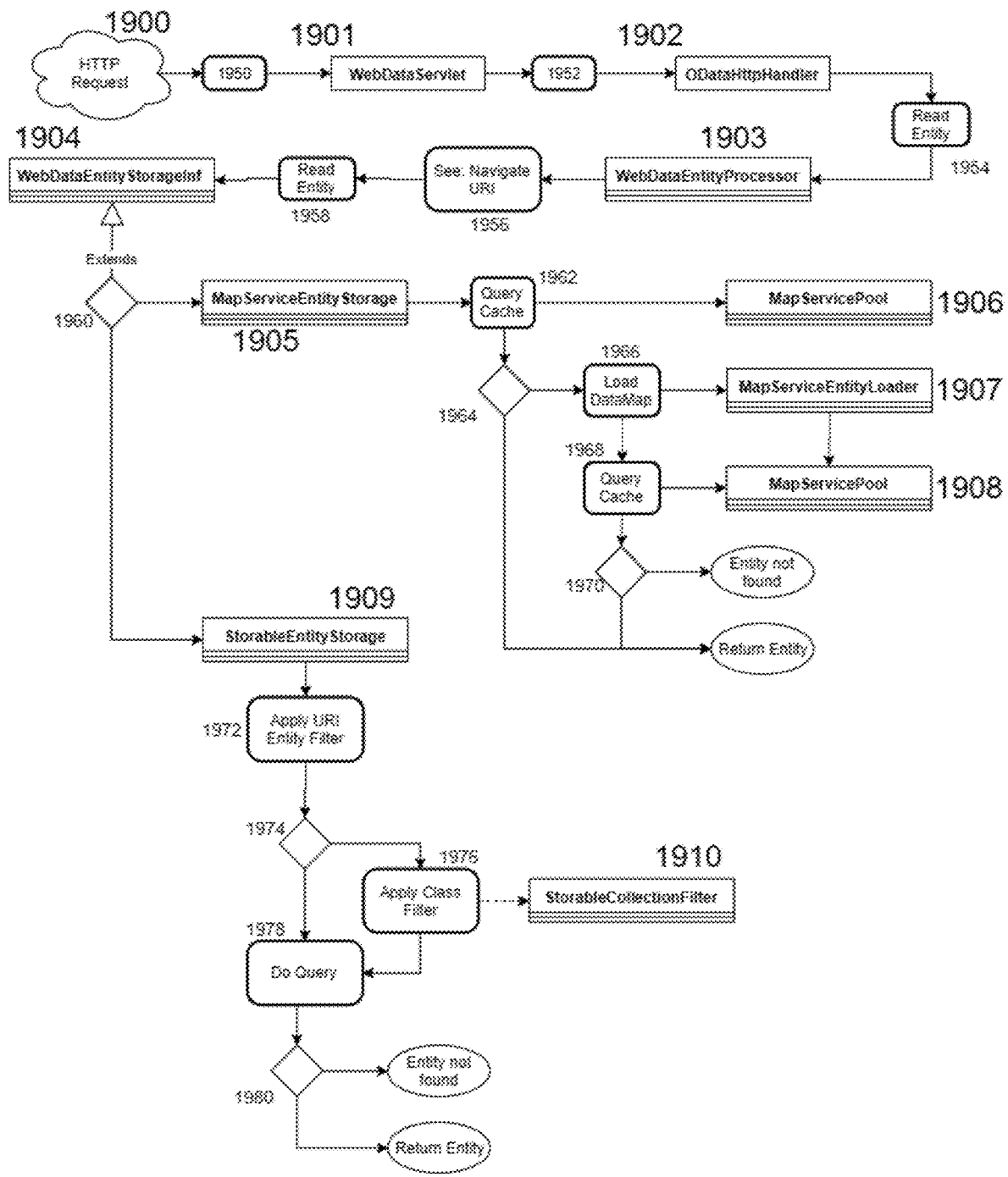
FIG. 28 illustrates a Read Single Entity process in accordance with an embodiment.
Figure 29:
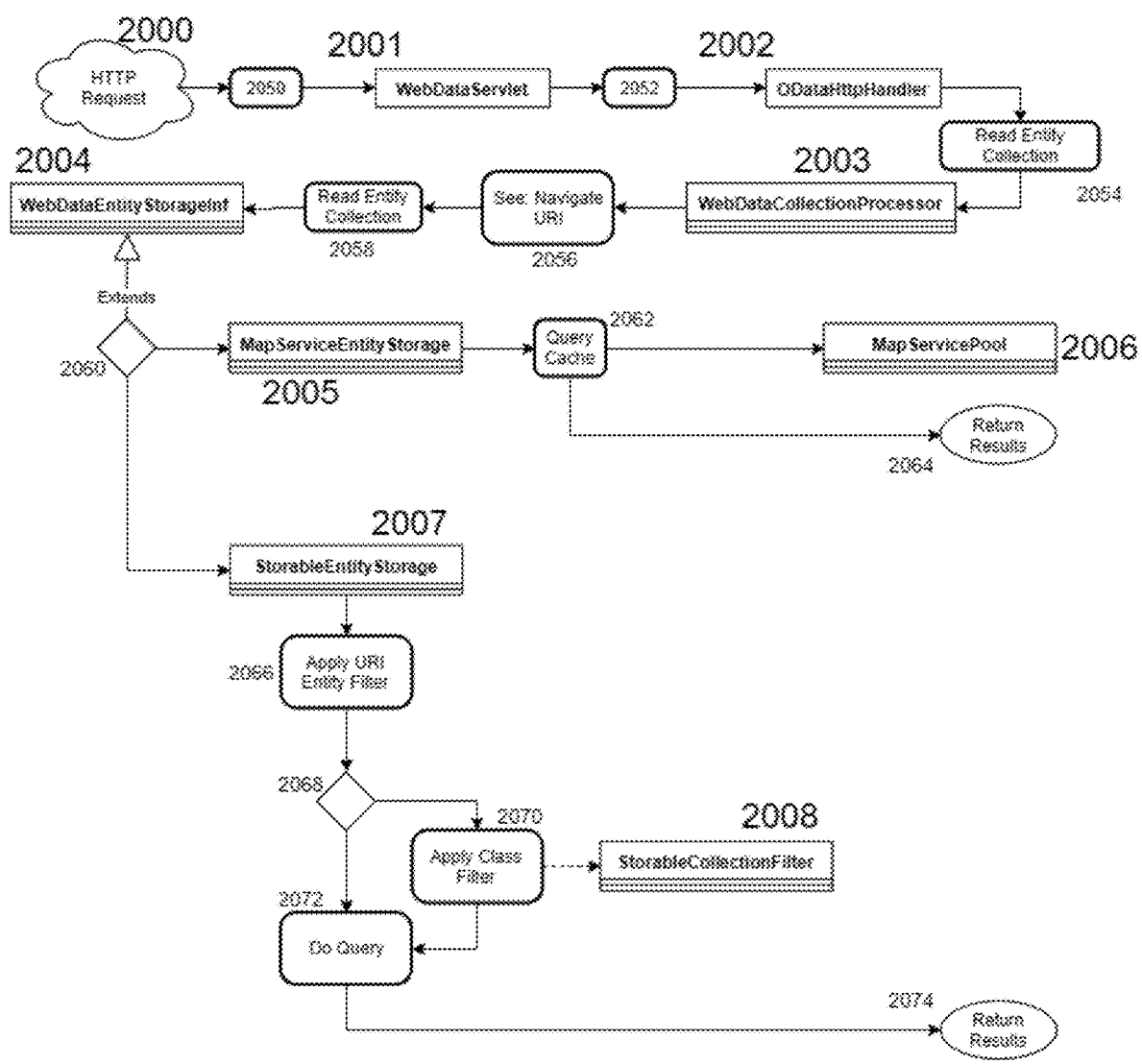
FIG. 29 illustrates a Read Entity Collection process in accordance with an embodiment.
Figure 32:
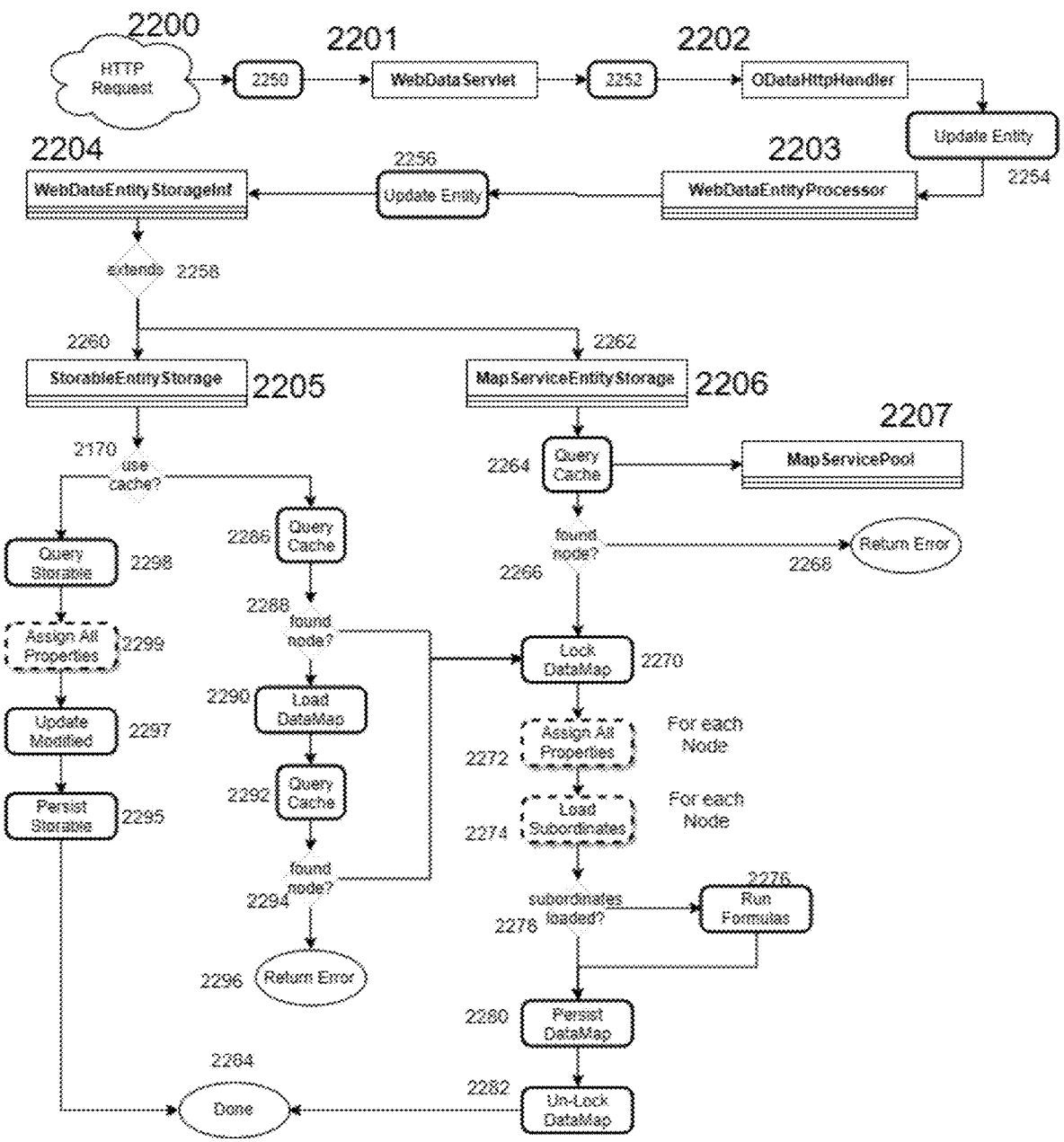
FIG. 32 illustrates an Update Entity process in accordance with an embodiment.
Figure 33:
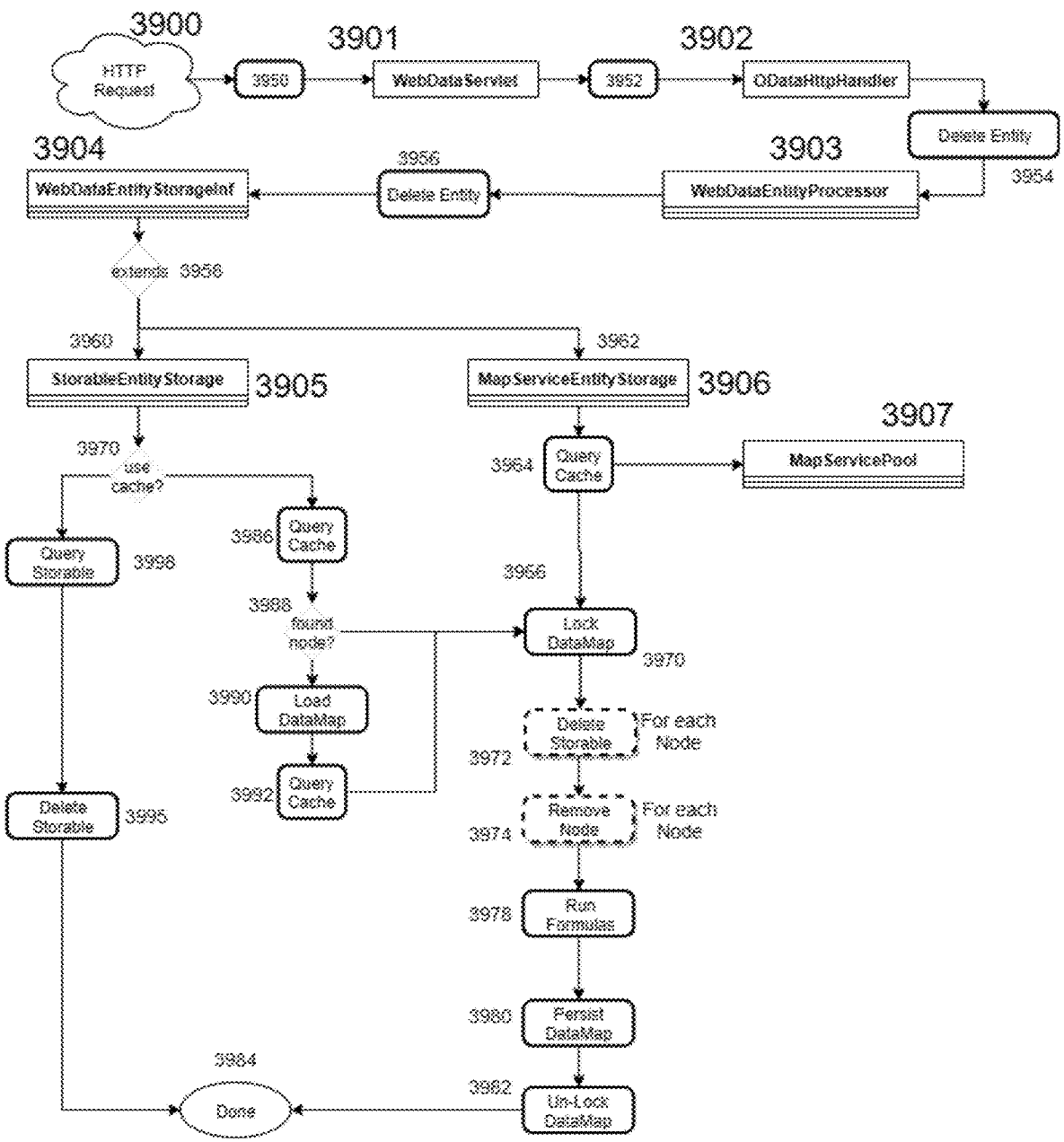
FIG. 33 illustrates a Delete Entity process in accordance with an embodiment.

Related Algorithms:
1. With respect to FIG. 34 and FIG. 30, MapServiceEntityStorage (302) provides the following filters (2707)
   a. ChildrenFilter (3753) when reading (readMapServiceChildren; readEntityChildren; getRelatedEntityCollection) a collection of related cached entities, and the source entity type is a parent to the target entity type.
   b. ParentsFilter (3754) when reading (readMapServiceParents; readEntityParents; getRelatedEntityCollection) a collection of related cached entities, and the source entity type is a child to the target entity type.

c. WebDataCollectionFilter (3700) when reading a collection of related cached entities based on a navigational property; where the filter is provided by the navigational property. This case occurs when WebDataCollectionProcessor (113, 202, 912, 2801) is processing URI navigation.
2. FIG. 28, Read Single Entity
3. FIG. 29, Read Entity Collection
4. FIG. 32, Update Entity
5. FIG. 33, Delete Entity StorableEntityStorage (303) extends MapServiceEntityStorage (302), and is used to query and operate on database data via the Lentiles (FIG. 7) framework.

Figure 31:
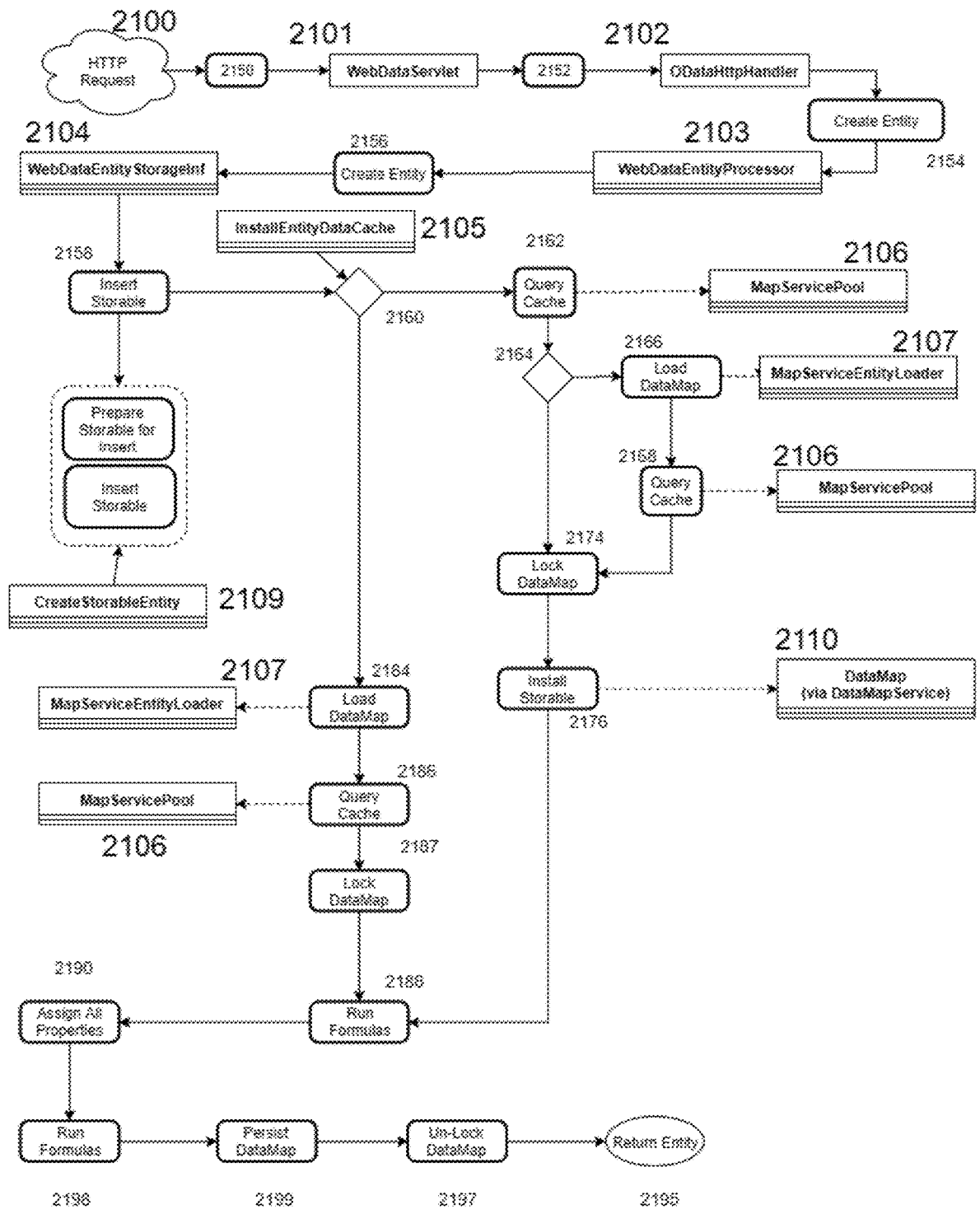
FIG. 31 illustrates a Create Entity process in accordance with an embodiment.

Related Algorithms:
1. With respect to FIG. 34, URI Navigation, StorableEntityStorage (303) may be associated with the following WebDataNavigationProperty (3801):
   a. DATANODEChild (3843)
   b. DATANODEChild2 (3844)
   c. DATANODEParent (3845)
2. FIG. 28, Read Single Entity
3. FIG. 29, Read Entity Collection
4. FIG. 31, Create Entity
5. FIG. 32, Update Entity
6. FIG. 33, Delete Entity For StorableCollectionFilter (304), see "Storage Systems and Class Filters" section.

InstallEntityDataCache (306) is an optional member of StorableEntityStorage (303), and should be configured (see, e.g., FIG. 5, item 1419) if "use cache" (1415) is configured true. InstallEntityDataCache (306) is part of the means of operating on database data indirectly via DataMapService (800) so that formulas can evaluate and operate on related data. InstallEntityDataCache (306) is an installer that is associated with an entity type configuration, such that, given an entity type and a newly created object (Storable (3600)), the installer is programmed to install the object into a cached DataMapService (800), making the object part of the corresponding DataMap (802). As the base class, InstallEntityDataCache (306) is designed to install a root record. As such, the install method verifies the cache does not contain a corresponding DataMapService (800). Once verified, the install method uses MapServiceConnector (700, 602) "touch" to load the corresponding DataMapService (800), run the formulas, and persist the results.

InstallChildEntityCache (312) extends InstallEntityDataCache (306) and overrides the install method with an implementation that assumes the newly created object (Storable (3600)) is below the root in a DataMap (802) hierarchy.

As such, on install, starting with the new object, the method queries storage for the root record; using the root record the method searches the cached for a corresponding DataMapService (800). If a DataMapService (800) is not found, the method uses MapServiceConnector (700, 602) "touch" to load the corresponding DataMapService (800), installs the new object in the corresponding DataMap (802) as a node (801), (and depending on the data map configuration, load nodes (801) that yet subordinate to the node (801) just installed), run the formulas, and persist the results.

In various examples, CreateStorableEntity (307, 2109) is a required member of StorableEntityStorage (303) and should be configured (see, e.g., FIG. 5, item 1420). A creator is associated with an entity type configuration, such that, given an entity with property values, a creator is able to create a new instance of an object of the correct type specified by FIG. 5, item 1411, assign the object's member values corresponding to the property values, and persist the object to the storage system associated with the creator. As the base class, create method of CreateStorableEntity (307, 2109) is designed to create a root object; in one embodiment the object is of type Storable (3600). The implementation transfers the entity property values to the object and persists the object. In the current embodiment, the extensions (313, 314, 315) of CreateStorableEntity (307) are sufficient for a wide range of applications that are designed around Lentiles (see, e.g., FIG. 7) and the DATANODE (4300) schema technique. Any valid (functional) schema technique that can be configured into a DataMap (802) can be supported by creating additional extensions of CreateStorableEntity (307).

CreateChildEntity (313) extends CreateStorableEntity (307) and overrides the create method to create a child object (see, e.g., FIG. 5, item 1411); where the type extends DATANODE (4300). The implementation queries the parent record using the value of entity property "PARENT" as the primary key. The parent record is then used to satisfy the foreign key relationship on the child. The balance of entity property values are transferred to the child object, and then persisted.

CreateChildEntity2 (314) extends CreateStorableEntity (307) and overrides the create method to create a child object (see, e.g., FIG. 5, item 1411); where the type extends DATANODE (4300). The implementation involves additional configuration (see, e.g., FIG. 5, items 1467):
1. A manager type, the simple name of the Lentiles Storable (3600) class of the manager record;
2. A relative index path corresponding to the DataMap (802) hierarchical relationship between the manager and child;
3. A property name in the entity that has the manager record primary key.

Given the parameters and an entity, the method starts by querying the manager record, then using the index path queries the parent record of the child. The parent record is then used to satisfy the foreign key relationship on the child. The balance of entity property values are transferred to the child object, and then persisted.

CreateGrandChildEntity extends CreateStorableEntity (307) and overrides the create method to create a child object (see, e.g., FIG. 5, item 1411); where the type extends DATANODE (3600). The implementation is similar to CreateChildEntity2 (314), and involves additional configuration (see, e.g., FIG. 5, items 1467):
1. A grandparent type, the simple name of the Lentiles Storable (3600) class of the grandparent record;
2. A relative index path corresponding to the DataMap (802) hierarchical relationship between the grand parent and child; in this case a single key in the index path;
3. A property name in the entity that has the grandparent record primary key.

Given the parameters and an entity, the method starts by querying the grandparent record, then using the index path queries the parent record of the child. The parent record is then used to satisfy the foreign key relationship on the child. The balance of entity property values are transferred to the child object, and then persisted.

MapServiceEntityLoader

Figure 17:
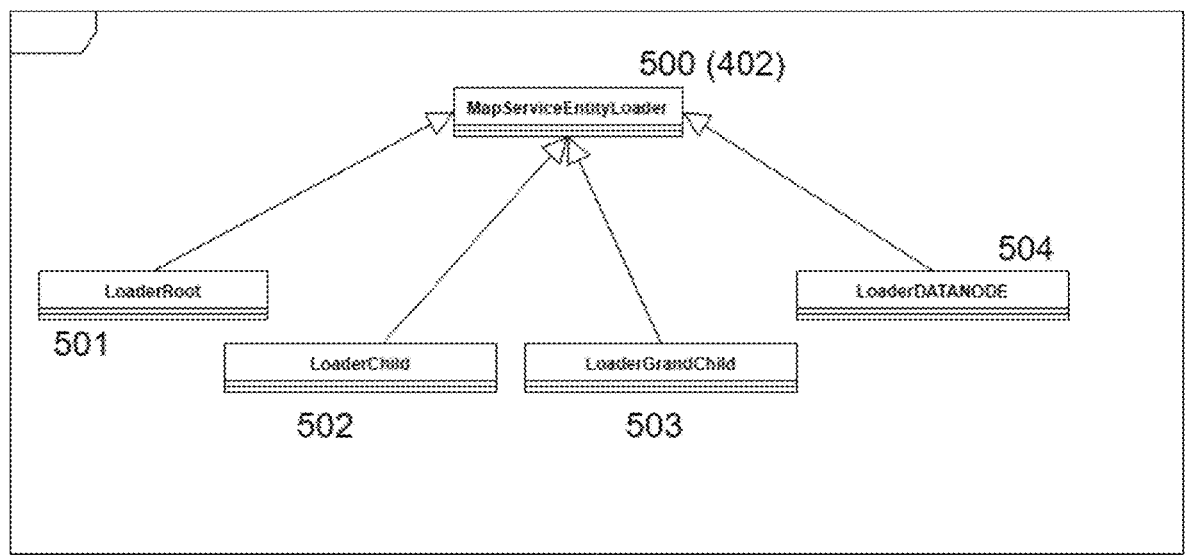
FIG. 17 illustrates a MapServiceEntityLoader Hierarchy in accordance with an embodiment.

FIG. 17 illustrates a MapServiceEntityLoader Hierarchy in accordance with an embodiment. In the context of the present example, a MapServiceEntityLoader (500, 402) is associated with an entity type configuration, such that, given an entity w/property values, a loader is able to obtain data for loading an instance of a DataMapService (800) into cache.

According to one embodiment, MapServiceEntityLoader (500, 402) is configured in accordance with FIG. 5, item 1412. For example, an entity may correspond to a RDBS record that is the grand child of a datamap's root record. In this case, the loader would be programmed to (a) obtain the child ID from the entity, (b) query the child's grandparent record to obtain the root record, (c) provide the root record to the map service loader; wherein the datamap is loaded into cache.

The given entity contains property values, including a primary identifier. The primary identifier is sufficient to locate a corresponding record in a datastore, including records in a datastore hierarchy. Therefore, the function of the MapServiceEntityLoader (500, 402) is to use the entity information to reference a subordinate record, and from the subordinate record reference the root record of the datastore hierarchy, and the load the hierarchy of records into a DataMapService (800) cache.

In one implementation, the loader is designed to search for the root record of a datastore hierarchy, and then load the corresponding DataMapService (800) into cache via the MapServiceConnector (700, 602) method "touchMapService". The search for the root record is done via the MapServiceEntityLoader (500, 402) method "readRootStorable"; which in turn uses the method, "configure" and is used to configure the query for the root record. The entity type configuration contains values that reflect a hierarchical position, including extensions of MapServiceEntityLoader (500, 402). The extended classes may override "readRootStorable" and/or "configure" as desired by the particular implementation.

LoaderChild (502) associates the entity with a record having a parent that is the root. LoaderChild (502) extends MapServiceEntityLoader (500, 402) and overrides the method "configure", and implements a simple query for a parent record based on a child record corresponding to the entity.

LoaderDATANODE (504) extends MapServiceEntityLoader (500, 402), and overrides the method readRootStorable; and implements an algorithm whereby given an arbitrary subordinate DATANODE (4300) in a hierarchy, the corresponding root DATANODE (4300) is read. The read algorithm performs multiple reads from a child to a parent, until it reads a record with a self-referencing parent.

LoaderGrandChild (503) associates the entity with a record having a grandparent that is the root. LoaderGrandChild (503) extends MapServiceEntityLoader (500, 402) and overrides the method "configure", and implements a simple query for a grandparent record based on a child record corresponding to the entity.

Figure 18:
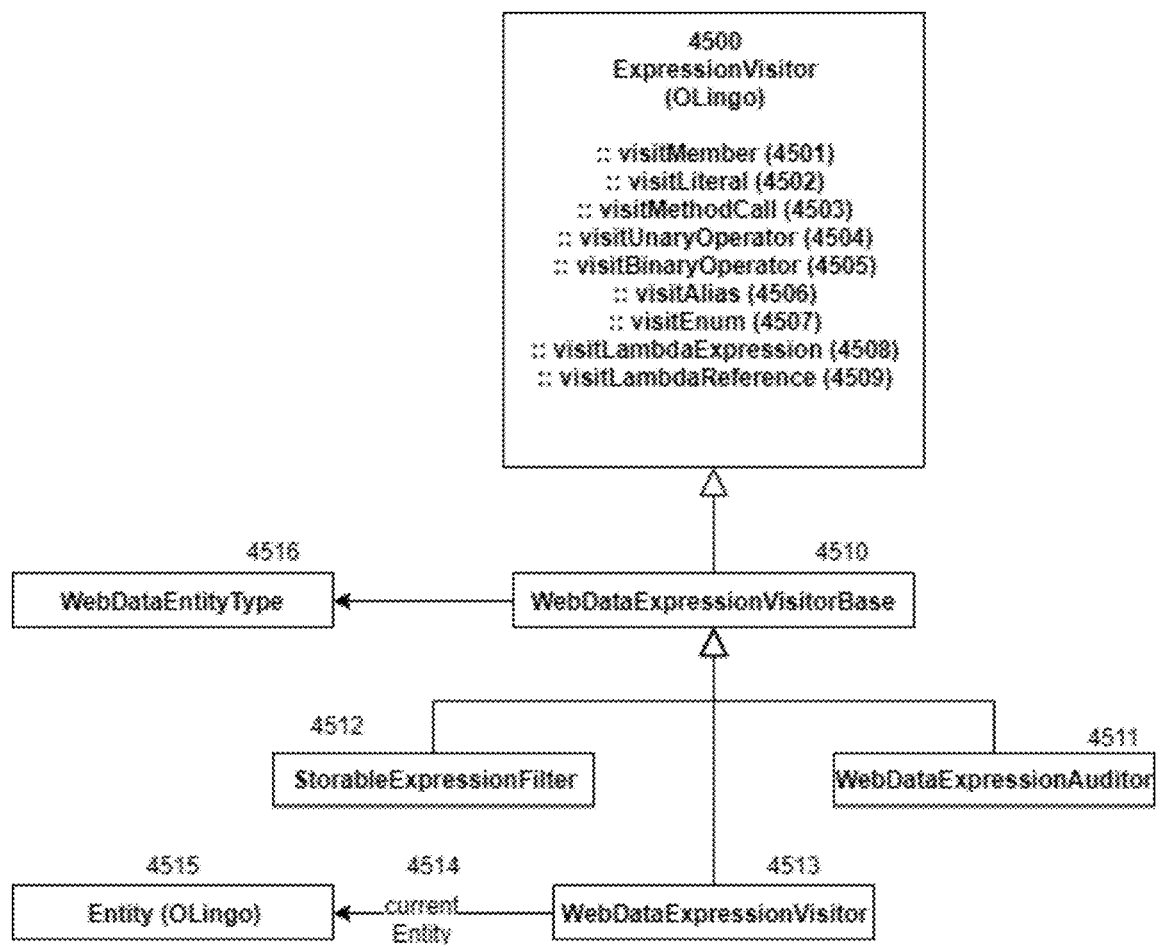
FIG. 18 illustrates WebData Expression Visitor in accordance with an embodiment.
Figure 20:
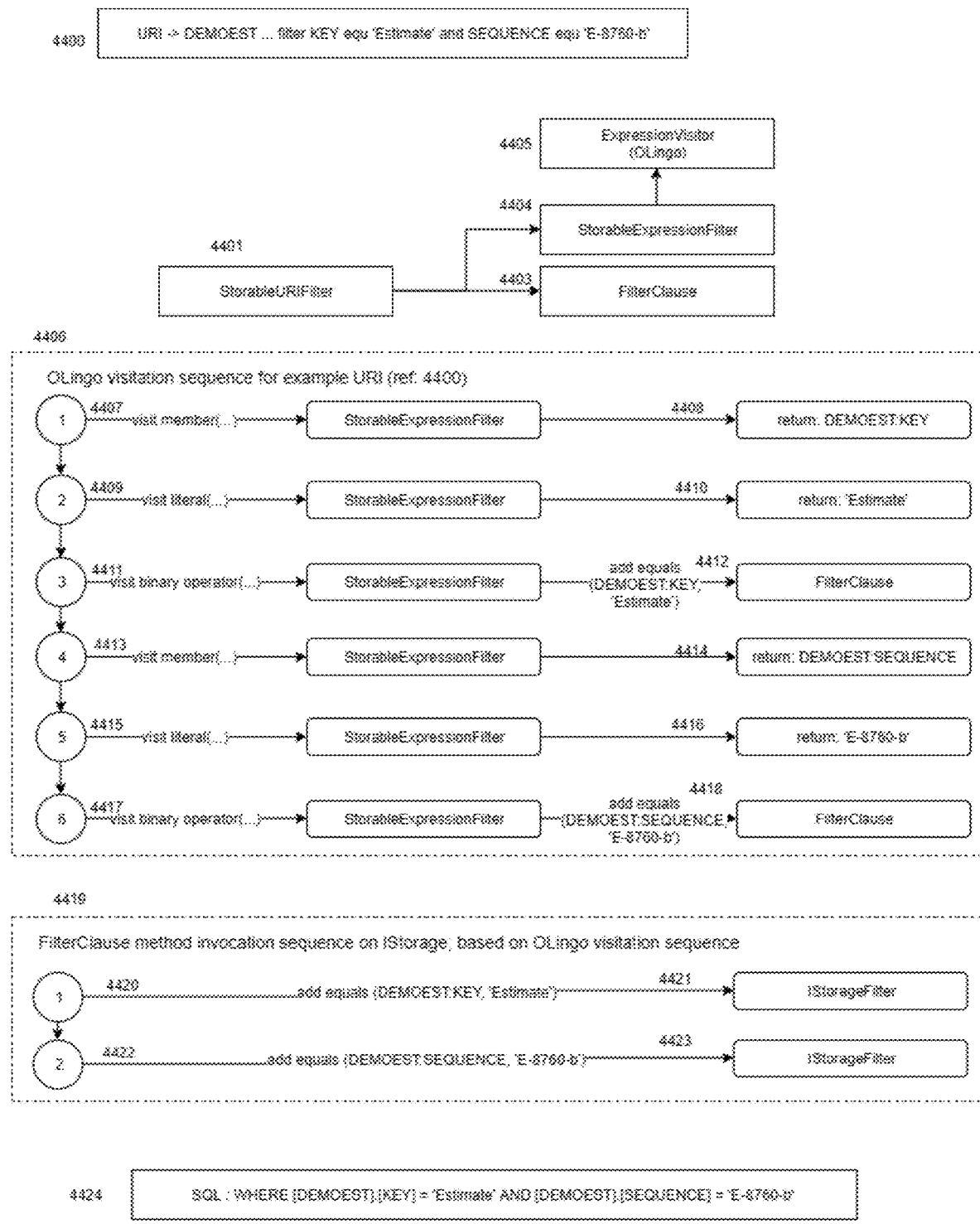
FIG. 20 illustrates Storable URI Filter in accordance with an embodiment.

LoaderRoot (501) extends MapServiceEntityLoader (500, 402), but uses the base method on MapServiceEntityLoader (500, 402), "readRootStorable" and "configure". LoaderRoot (501) assumes the entity primary identifier is the root record identifier, and configures the query correspondingly.
WebDataExpressionVisitor FIG. 18 illustrates WebData Expression Visitor in accordance with an embodiment. In the context of the present example, classes that implement ExpressionVisitor (4500) also implement methods 4501 through 4509; in anticipation of an OLingo Expression invoking the methods, as OLingo parses a $filter associated with the Expression. FIG. 20 provides an example of how OLingo operates with ExpressionVisitor.

WebDataExpressionVisitorBase (4501) implements the OLingo interface (methods 4501 through 4509) ExpressionVisitor (4500), and contains a reference to its associated WebDataEntityType (4516). Classes that extend WebDataExpressionVisitorBase (4501) override the OLingo methods 4501 through 4509 as necessary, according to their application.

WebDataExpressionAuditor (4511) extends WebDataExpressionVisitorBase (4501) and is used to determine if a $filter clause is seeking a specific entity, by auditing the properties in visitMember invocations. At the end of a visitation, if WebDataExpressionAuditor (4511) indicates that only the reference property is in the $filter, then the corresponding DataMap (802) is a candidate for loading into cache.

StorableExpressionFilter (4512, 4404) extends WebDataExpressionVisitorBase (4501) and is used to configure and IStorageFilter (3611, 4419) that is equivalent to the conditions of $filter. See FIG. 20 for more information regarding StorableExpressionFilter (4512, 4404).

WebDataExpressionVisitor (4513) extends WebDataExpressionVisitorBase (4501) and is used to include or exclude an OLingo Entity (4515) in a collection; where the collection was initially populated from nodes (801) in cached DataMaps (802).

In the current embodiment, queries on cached data is divided into (2) parts:
1. Build an entity collection by querying all nodes (801) from all qualified DataMaps, independent of a $filter clause.
2. Use WebDataExpressionVisitor to remove entities from the entity collection that do not belong as determined by the $filter clause.

Figure 19:
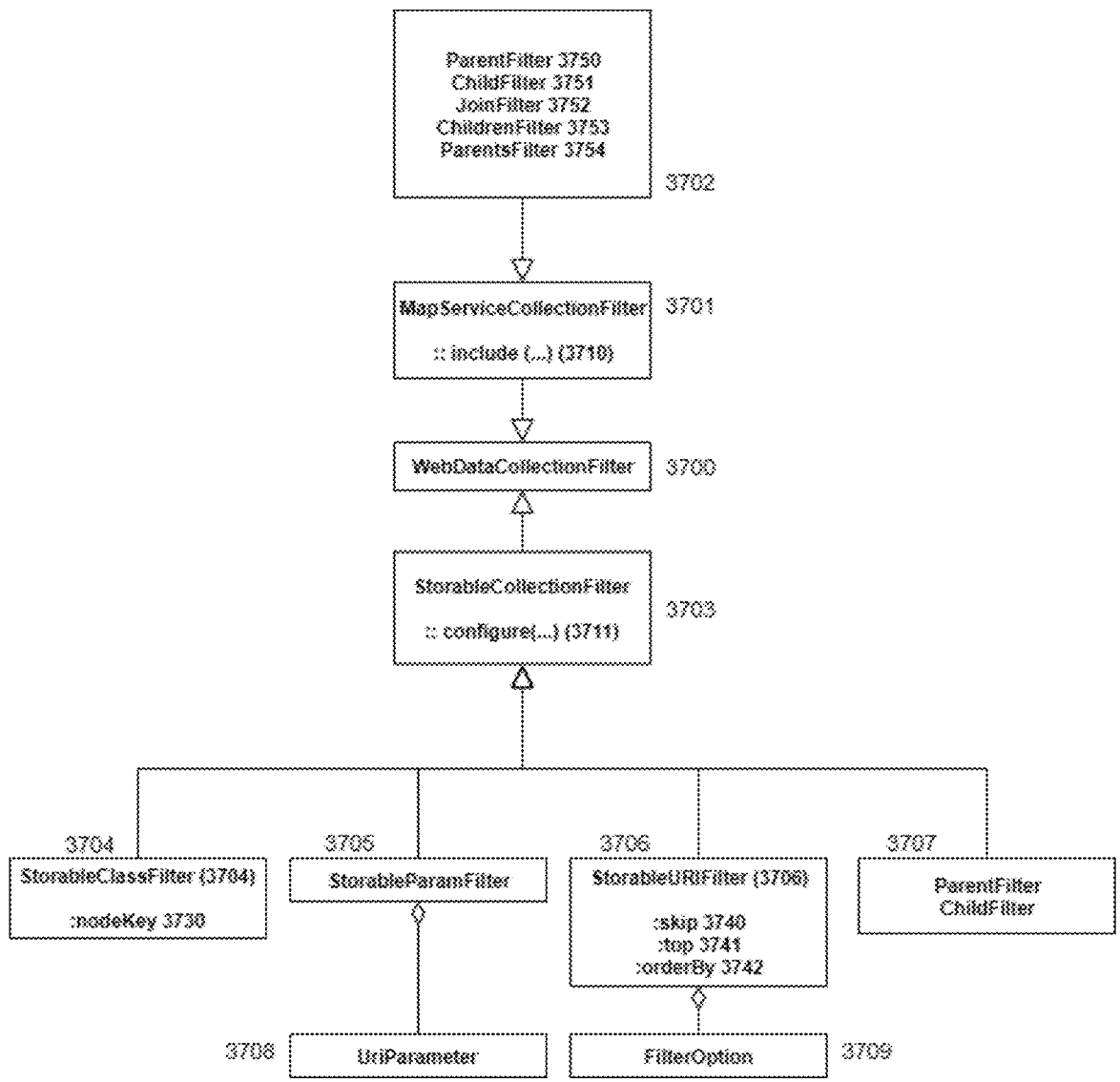
FIG. 19 illustrates WebDataCollectionFilter in accordance with an embodiment

This current embodiment is sufficient; however, if necessary, $filter could be used to qualify the inclusion of nodes (801) while the cached data is being queried.
WebDataCollectionFilter FIG. 19 illustrates WebDataCollectionFilter in accordance with an embodiment WebDataCollectionFilter (3700, 2707) is a base class for entity collection filters corresponding to different types of OData datastores. According to one embodiment, the main purpose of WebDataCollectionFilter (3700) is to facilitate the qualification of a candidate entities, with respect to a relationship between (2) entity types.

In the current embodiment, MapServiceCollectionFilter (3701) extends WebDataCollectionFilter (3700) and is used for cached DataMap (802) nodes (801); and StorableCollectionFilter (3703, 2506) extends WebDataCollectionFilter (3700) and is used for Storable (3600) records in IStorage (Lentiles (FIG. 7)).

MapServiceCollectionFilter (3701) is used by MapServiceEntityStorage (302). The principle method on MapServiceCollectionFilter (3701) is the "include" method (3710) which returns true if a candidate entity matches a criteria for inclusion in an entity collection. For filters based on MapServiceEntityStorage (302), the entities correspond to nodes (801) in a DataMap (802).

ParentFilter (3750) is used by DataMapChild (3840); and DataMapChild (3840) extends WebDataNavigationProperty (3801).

DataMapChild is specified in the web data configuration (see 1441, 1444); and the host is a child node (801) and the target is a parent node (801).

ParentFilter (3750) include method returns true if the reference id of a given entity matches the reference id of the parent node (801).

JoinFilter (3752) is used by JoinNavigation (3842, 442), which extends WebDataNavigationProperty (3801). JoinNavigation (3842) is a default navigational property of DataMapEntityJoin (409). DataMapEntityJoin (409) is specified in the web data configuration (see 1452, 1459). DataMapEntityJoin (409) has an "owner" (1455) and an "other" (1456); where "owner" (1455) has a property that references an identifier field (1457) in "other" (1456). DataMapEntityJoin (409) has (2) JoinNavigation (3842), one for "owner" (1455) and the other for "other" (1456). The JoinFilter (3752) include method returns true if a given entity corresponds to a child that descends from a parent, where the parent is an "owner" (1455) or an "other" (1456), depending on the instance of JoinNavigation (3842).

ChildFilter (3751) is used by an implementation of WebDataNavigationProperty (3801), DataMapParent (3841, 441). For this implementation, the host is a parent node (801) and the target is a child node (801). The include method returns true if the reference id of a given entity matches the reference id of any child node (801). DataMapParent (3841, 441) is specified in the web data configuration (see 1441, 1444).

ChildrenFilter (3753) extends MapServiceCollectionFilter (3701) and overrides the include method (3710) that includes a candidate child node (801), into a collection, if the child is associated with a given parent node (801). Such a filter is typically used by an OData request that is reading a collection of child nodes based on a navigational property.

ParentsFilter (3754) extends MapServiceCollectionFilter (3701) and overrides the include method (3710) that includes a candidate parent node (801), into a collection, if the parent is associated with a candidate child node (801); and the reference property of the child is equal to the reference property of a given [child] entity. Such a filter is typically used by an OData request that is reading a collection of parent nodes based on a navigational property.

StorableCollectionFilter (3703) is used by StorableEntityStorage (303). Filters that extend StorableCollectionFilter (3703) should implement the "configure" method (3711); wherein the methods configure the IStorageFilter (3611); the IStorageFilter (3611) which when used with IStorage (3609) read, generates a SQL where clause; the read results in the retrieval of a set of records; the records having field values that conform to the intended purpose of the StorableCollectionFilter (3703).

StorableEntityStorage (303) may have an optional class filter (1421 & 3704) that is used, on every read, to narrow the set of records that are associated with an entity type. The optional class filter (1421 & 3704) may be configured in accordance with FIG. 5, item 1421. Request URIs referencing entity types that correspond to StorableEntityStorage (303), may result in a read of one or many records. For all reads by StorableEntityStorage (303), an IStorageFilter (3611) is prepared in accordance with the URI; but before StorableEntityStorage (303) invokes read on IStorage (3609), if a class filter (1421 & 3704) is configured, then IStorageFilter (3611) is further configured in accordance with class filter (1421 & 3704). For example, a hierarchical set of records includes 2 different parents, P1 and P2; and each of the parents has n and m child records, respectively: C11, . . . , C1n, and C21, . . . , C2m. All the child records reside in the same table, C. The requirement is to expose C1n records as entity type A, and C2m records as entity type B. The web data configuration for entity type A would include a class filter: [where] C.Parent=P1; and for entity type B would include a class filter: [where] C.Parent=P2. Regardless of the influence of the URI, any time A entities are read, the underlying query will include a clause "C.Parent=P1"; and likewise for B entities "C.Parent=P2"

In the present example, the class filter is specified by a class name (1422); it can be any arbitrary implementation, but extends from StorableCollectionFilter (3703). As such, the class filter (1422) (i.e., StorableClassFilter (3704)) implementation has access to WebDataEntityStorageInf (300) and the collection of parameters from web data configuration (1423, 1424, 1425). In other sections of this document, there are different types of StorableCollectionFilter (3703), but the following types are interesting because they reference OLingo data directly that is derived from an OLingo request URI.

StorableParamFilter (3705) extends StorableCollectionFilter (3703) and is used to filter records based on OLingo parameter keys. It is convenient to use this filter to query a specific record by including the entity primary reference property in the parameter keys. The parameter keys are directly related to properties of the entity type; and therefore directly related to fields on a Storable (3600) class.

Configuring IStorageFilter (3611) utilizes the methods where a Storable (3600) field equals a value.

StorableParamFilter (3705) is used indirectly: by WebDataEntityProcessor (115, 201, 911, 2103, 2203, 3903) and WebDataCollectionProcessor (113, 202) as they parse URI navigation and read an entity having specific property values; and WebDataPrimitiveProcessor (112, 203) when it reads an entity, to get a specific property value.

StorableURIFilter

FIG. 20 illustrates Storable URI Filter in accordance with an embodiment. In the context of the present example, StorableURIFilter (3706, 4401, 2606) extends StorableCollectionFilter (3703) and is used to filter records based on OLingo URI filter option. The filter (4400) option includes the OLingo qualifier clauses and the directives top, skip and order by. OLingo provides an expression visitor process as a means of processing the filter clauses in the URI.

When StorableURIFilter (3706, 4401, 2606) is invoked to configure IStorageFilter (3611), it uses StorableExpressionFilter (4512, 4404) and the OLingo expression visitor process (4406 is an example). StorableExpressionFilter (4512, 4404), an OLingo expression visitor 4405, is created and provided to the OLingo expression processor; and then as OLingo processes the expression, the methods implemented by StorableExpressionFilter (4512, 4404) as an expression visitor, build a FilterClause (3612, 4403). When OLingo is finished processing the expression, the FilterClause (3612, 4403) is obtained from the StorableExpressionFilter (4512, 4404), and is used to configure IStorageFilter (3611, 4419).

FIG. 20 provides an example of how StorableURIFilter (3706, 4401) functions. Item 4400 is a snippet of content from a URI that results in the use of StorableURIFilter (3706, 4401). OLingo parses the URI and invokes the sequence inside 4406. Steps 4407, 4409, 4411, 4413, 4415 and 4417 are called in order by OLingo, in accordance with the example URI (4400). Steps 4408, 4410, 4412, 4414, 4416 and 4418 are the responses by StorableExpressionFilter (4512, 4404) in response to OLingo, respectively. By the end of steps 4417 and 4418, the FilterClause (3612, 4403) is ready to configure IStorage (3609); which is shown inside block 4419. Step 4420 is based on step 4412, and step 4422 is based on step 4418. By the end of step 4423, IStorage (3609) is ready to be used in a datastore statement, such as a query. The SQL resulting from steps 4421 and 4423 is shown in 4424. StorableURIFilter (3706, 4401) is used indirectly: by WebDataCollectionProcessor (113, 202) when it reads a collection of entities and a filter option is included in the URI.

StorableExpressionFilter (4512, 4404) is used by StorableURIFilter (3706, 4401) to create a FilterClause (3612, 4403) that is effectively equivalent to the URI filter, such that when the FilterClause (3612, 4403) configures IStorageFilter (3611, 4419), the resulting SQL that is generated retrieves a set of records that conform to the URI filter.

StorableExpressionFilter (4512, 4404) implements OLingo ExpressionVisitor (4405). An instance of StorableExpressionFilter (4512, 4404) is given to an OLingo Expression, and the OLingo (visitation) process is invoked. The OLingo process parses the URI filter clause invokes methods (visits) on this filter accordingly. The OLingo process returns the root object of the visitation process, that object being a FilterClause (3612, 4403) that was established by this filter.

The response to OLingo visitations is as follows:

If the URI filter contains a reference to a property, then this filter converts the property to an Attribute (3601), and returns it to the OLingo process. StorableExpressionFilter (4512, 4404) has a reference to IStorage (3609), and therefore IStorageSchema (See Lentiles (3600)). Given a property name, an Attribute (3601) can be found using IStorageSchema.

If the URI filter contains a reference to a literal value, then this filter converts the string form of the value to an Object of the correct type (See DataPoint (804)), and returns it to the OLingo process (types include integer, Boolean and string).

If the URI filter contains a binary operator (equals, not equals, or, and), then OLingo visits this filter, providing the operator and left and right parameter objects that were established from previous visits to this filter, and may be a literal value, Attribute (3601) or FilterClause (3612, 4403). This filter applies logic based on the operator and the parameter types and returns a FilterClause (3612, 4403) to the OLingo process.

If both parameters are FilterClause (3612, 4403) and the operator is "or" or "and", then ClauseConjunction (3620) is constructed from the parameters and returned to the OLingo process.

If the URI filter contains a method call (starts with, contains, index of, etc.), then OLingo visits this filter, providing the method and a list of parameters. This filter returns a corresponding FilterClause (3612, 4403), "starts with" returns FilterStartsWith (3616), "contains" returns FilterContains (3618), "index of" returns FilterIndexOf, etc.

Additional types of FilterClause (3612, 4403) can be implemented to translate visitations and parameters to appropriate methods IStorageFilter (3611, 4419).

There are some filters that extend StorableCollectionFilter (3703) for the purpose of supporting implementations of WebDataNavigationProperty (3801), related to navigating relationships between Storable (3600) entity types.

In web data configuration (1400), the "navigation" element (1426) includes an attribute, "class" 1429. The class implements WebDataNavigationProperty (3801), and provides a StorableCollectionFilter (3703) that is used to query target entities (1428) in relation to source entities (1427). Typically, unique implementations of WebDataNavigationProperty (3801) will most likely have unique implementations of StorableCollectionFilter (3703) that will configure the filter in accordance with the "nature" of the navigation property.

Example DATANODEChild

As an example, assume there is a Storable (3600) record type, DATANODE, having a primary identifier, id; and a hierarchical self reference to DATANODE (4300), parent. DATANODEChild (3843) implements WebDataNavigationProperty (3801) for target DATANODE (4300) records that are subordinate (children) to a source (parent) DATANODE (4300) record.

Given a parent ID=XYZ, the pseudo statement that is configured in preparation of a query is:

select * from datanode where datanode.parent in (select id from datanode where id=XYZ)

In one embodiment, the MapServiceEntity contains configuration and references to a node (801) in a data map (802), and data points (804) relative to the node (801), where the node (801) corresponds to the entity, and the data points (804) correspond to property values of an entity.

MapServiceEntity may be used to construct an olingo entity; which is the case during read requests. In addition, given an olingo entity, MapServiceEntity may be used to assign property values into data points; which is the case during create and update requests.

Deployment Classes

Figure 21:
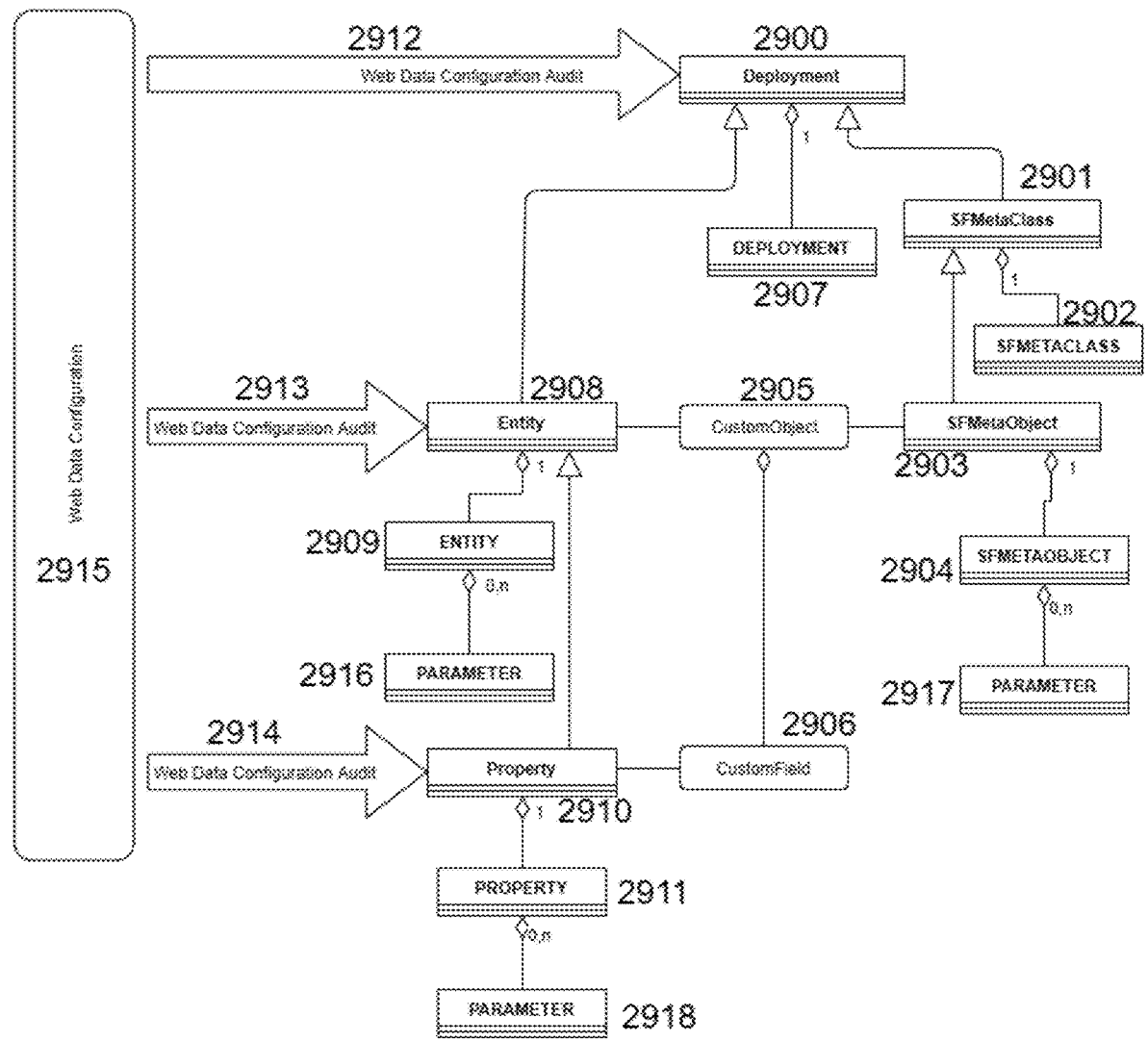
FIG. 21 illustrates Deployment Classes in accordance with an embodiment.

FIG. 21 illustrate Deployment Classes (e.g., Salesforce Configuration Classes) in accordance with an embodiment. In one embodiment, Salesforce deployment is achieved through the request and transmission of ZIP files containing metadata. With respect to Salesforce metadata, a specification describes the structure (e.g., fields) of a "metaclass" and an instance of a "metaclass" is a "metaobject"; where a metaobject contains the values of the metaclass fields. In one embodiment, Salesforce marshals metaobjects to and from a client via XML files that are bundled together in a ZIP file, and the XML files are grouped together in sub-folders by the metaclass they belong to.

As described herein, the ZIP files and inner XML files are converted to ComplexRegistryFile (3011, 3107) and ComplexFile (3007) objects, respectively, when they are prefetched; and conversely, ComplexFile (3007) and ComplexRegistryFile (3011) objects are converted to XML and ZIP files when changes are submitted to Salesforce.

In embodiments, the classes SFMetaClass (2901) and SFMetaObject (2903) contain deployment configuration parameters that influence the involvement and manipulation of Salesforce metaobjects; where SFMetaClass (2901) tends to influence all metaobjects of a metaclass, and SFMetaObject (2903) tends to influence a single metaobject.

Deployment (2900) is a DataMap (802) helper class that contains parameters that enable a process in web data [OData] service to connect to an instance of a Salesforce service, and configure the instance of Salesforce to access the OData service, its entity types and their properties. See, e.g., FIG. 6, Web Data Deployment Configuration.

In one embodiment, the following parameters are provided:

The API version to use with Salesforce
A Salesforce deployment status
The OData external data source
A custom configuration string
The OData end point
Whether OData is read-only or writable
The principal type
The authorization protocol
The service type
Credentials to access the OData service
Additional parameters may be added to support alternate requirements.

Deployment (2900) provides standard methods to access all the Entity (2908), Property (2910), SFMetaClass (2901), and SFMetaObject (2903) objects in the deployment configuration (1500)—a DataMap (802). Deployment (2900) is a facade to DEPLOYMENT (2907) (a record of a datastore table), and thus is capable of persisting state to a datastore.

SFMetaClass (2901) is a DataMap (802) helper class that extends Deployment (2900), so the API provided by Deployment (2900) is available through SFMetaClass (2901). SFMetaClass (2901) has a collection of subordinate SFMetaObject (2903). SFMetaClass (2901) is a facade to SFMETACLASS (2902) (a record of a datastore table), and thus is capable of persisting state to a datastore. SFMeta-Class (2901) contains state used to determine if a family of metaobjects belonging to the same metaclass should be pre-fetched, and how. Additional configurations can be added to SFMetaClass (2901) that can be used to apply conditional updates to a new or existing metaobjects belonging to the same metaclass.

CustomObject is the metaclass Salesforce uses to for defining External Object [metaobjects]; and External Object metaobjects correspond to OData entity types The deployment classes, Entity (2908) and Property (2910), have a tightly coupled relationship with the CustomObject metaclass, and custom fields of the CustomObject.

SFMetaObject (2903) contains deployment configuration parameters that influence the pre-fetch and update of a Salesforce metaobject. SFMetaObject (2903) is a facade to SFMETAOBJECT (2904) (a record of a datastore table), and thus is capable of persisting state to a datastore. SFMetaObject (2903) is a DataMap (802) helper class that extends SFMetaClass (2901), so the API provided by SFMetaClass (2901) is available through SFMetaObject (2903). SFMetaObject (2903) contains state used to determine if this object should be pre-fetched. Additional configurations can be added to SFMetaObject (2903) that can be used to apply conditional updates to a new or existing metaobject.

Entity (2908) is a DataMap (802) helper class, and provides an API facade to the underlying persisted record of an entity's deployment configuration parameters, where the parameters are in accordance with the deployment specification for Salesforce (see, e.g., FIG. 6). Entity parameters include the following:
 Set Name
 Deleted
 Custom Tab
 Tab Visible
 Application Tab
 Locked
 Description
 Label
 Plural Label See, e.g., FIG. 6 for a description of all these configuration parameters.

The deleted parameter causes all processes that reference Entity (2908) to ignore and/or skip over this Entity (2908).

The locked parameter is used to prevent web data audit process from changing values of certain parameters. Normally, on the first web data audit, locked is false, and the audit process will assign default values to label, plural label, description and others. Following an audit, locked is set true. A user may be allowed to change the parameter values, even while locked is true; but while locked is true, a re-audit will not over-write any changes the user has made.

An Entity's underlying record is automatically created during the web data audit process, but a record can also be created manually by a user. The set name parameter is a unique identifier. During the audit, if an underlying record is not found, a new one is created, then updated; otherwise if a record is found, it is just updated.

The Entity class extends Deployment (2900), so the API provided by Deployment (2900) is available through Entity (2908). Entity (2908) also provides a method to list all of its currently configured Property(s) (2910).

Property (2910) is a DataMap (802) helper class, and provides an API facade to the underlying persisted record of an property's deployment configuration parameters, where the parameters are in accordance with the deployment specification for Salesforce (see, e.g., FIG. 6). Property parameters include the following:
 Name
 Deleted
 Locked
 List View
 Search List
 Lookup
 Reverse Lookup
 Type Code
 Read Only
 Reference
 Description
 Help Text
 Label
 Relation Label
 Reverse Label
 Reverse Relation Label See FIG. 6 for a description of all these configuration parameters. The deleted parameter causes all processes that reference Property (2910) to ignore and/or skip over this Property (2910).

The locked parameter is used to prevent web data audit process from changing values of certain parameters. Normally, on the first web data audit, locked is false, and the audit process will assign default values to description and other parameters. Following an audit, locked is set true. A user may be allowed to change the parameter values, even while locked is true; but while locked is true, a re-audit will not over-write any changes the user has made.

A Property's (2910) underlying record is automatically created during the web data audit process, but a record can also be created manually by a user. The name parameter is a unique identifier. During the audit, if an underlying record is not found, a new one is created, then updated; otherwise if a record is found, it is just updated. The Property (2910) class extends Entity (2908), so the API provided by Entity (2908) is available through Property (2910).

ENTITY 2909, PROPERTY 2911 and SFMETAOBJECT 2904 each may have an arbitrary set of PARAMETERs (2916, 2918, 2917). The PARAMETERs (2917) are added and updated by the Deployment administrator, and are used primarily by the deployment algorithms. A PARAMETER (2916, 2918, 2917) contains a set of fields corresponding to a Parameter object (see, e.g., FIG. 22, item 3006); and a field identifying a host ComplexObject (see, e.g., FIG. 22, item 3000) within a ComplexFile (see, e.g., FIG. 22, item 3007). PARAMETER (2916, 2918, 2917) also contains fields used by the deployment algorithms to determine if a Parameter is required or optional; whether an existing (pre-fetch) value should be preserved or over-written.

XML Configuration Objects

Figure 22:
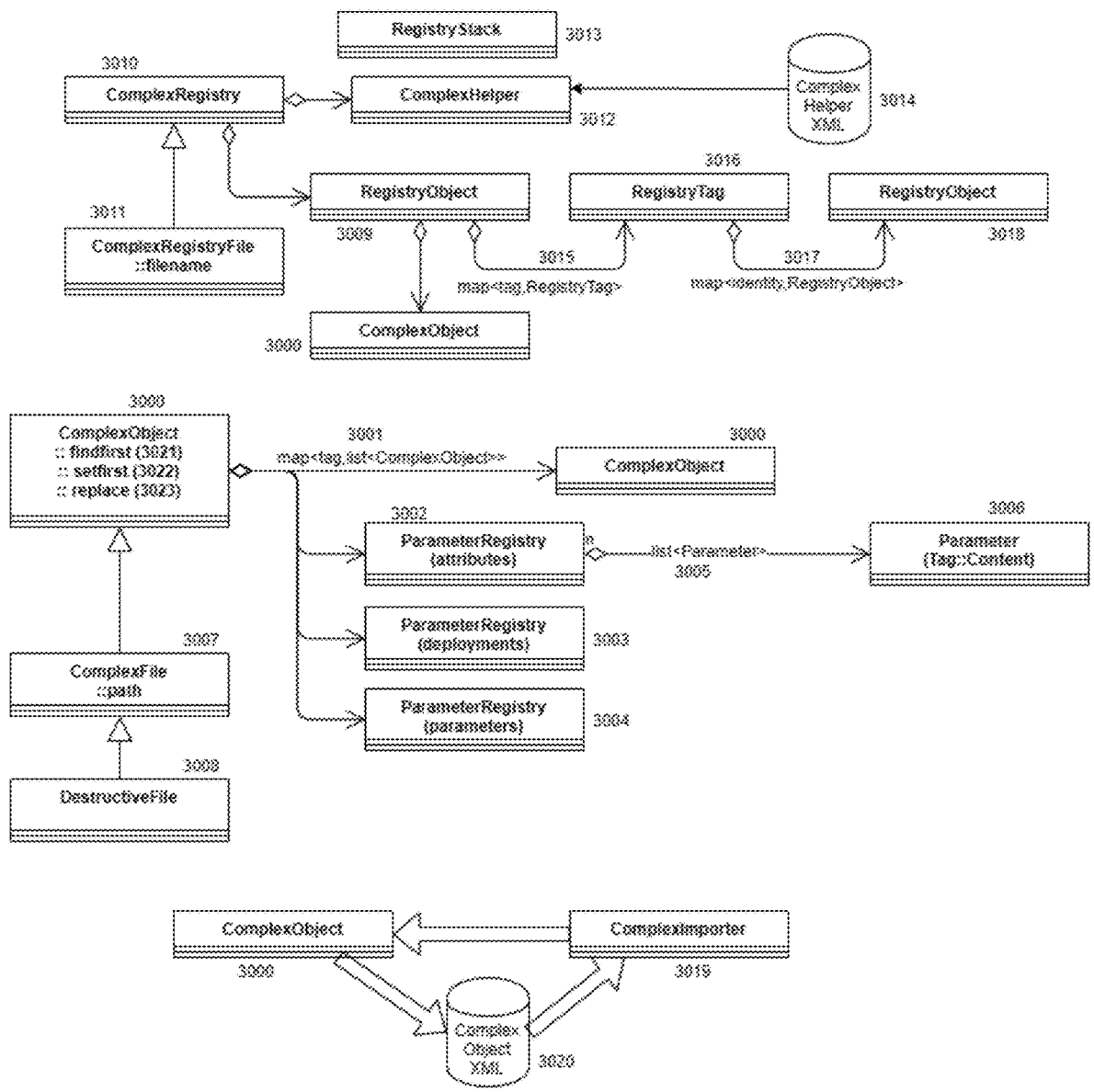
FIG. 22 illustrates XML MetaObjects in accordance with an embodiment.

FIG. 22 illustrates XML MetaObjects in accordance with an embodiment. In one embodiment, the following classes are used to as object manifestations of XML content, that are useful in modeling the XML components that Salesforce uses to marshall metadata out and in of a Salesforce client:

ComplexObject (3000)
    Parameter (3006)
    ParameterRegistry (3002)
ComplexFile (3007)
ComplexRegistry (3010)
    RegistryObject (3009)
    RegistryTag (3016)
    RegistryStack (3013)
    ComplexHelper (3012)
ComplexRegistryFile (3011)
DestructiveFile (3008)
Other Classes
    PackageManifest (3406, 3306)
    PackageManifestObject (3301)
    JarDeployer (3110)
    ZipRepositoryFile (3804, 3202)
    SFMetaHelper (4209, 3206, 3507)
    ComplexImporter (3019)
    XML Stream (3402)
    XML File (ASCII) (3401)
    ZIP File (XML) (3409)

Figure 23:
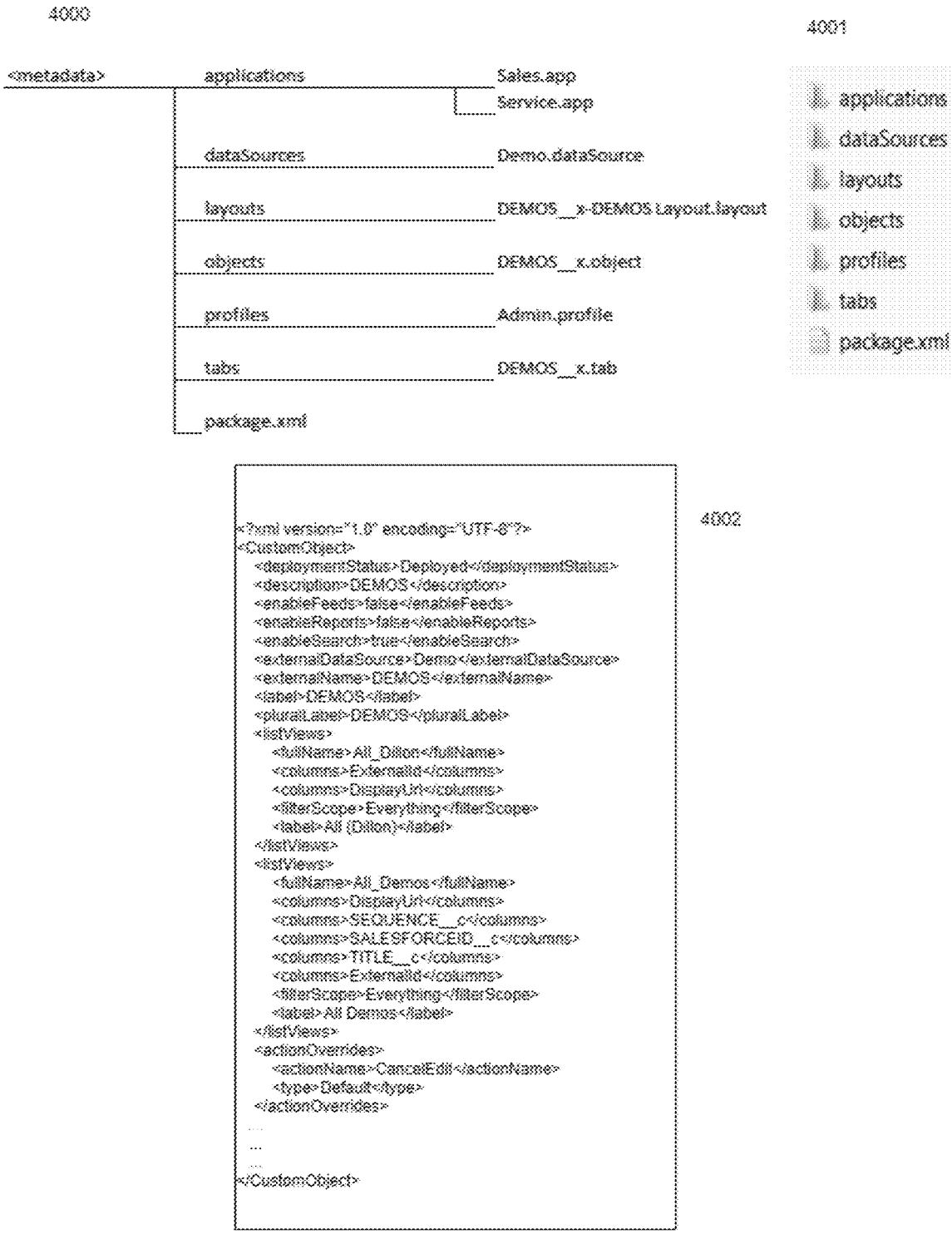
FIG. 23 illustrates Sample MetaData and Directory Structure in accordance with an embodiment.

FIG. 23 illustrates Sample MetaData and Directory Structure in accordance with an embodiment. FIG. 23 shows a directory structure (4000, 4001) of XML metadata files, and a simple example of XML content from a file (4002). Typically, XML content includes a prolog and an element that contains a hierarchy of inner elements, or inner elements with just simple content.

ComplexObjects (3000) represent XML elements that have inner elements, where the inner elements may correspond to ComplexObjects (3000) or parameters (3006). For example, <fields><label>WIDGETS</label></fields>, requires "fields" to be modeled using a ComplexObject (3000) because it contains an inner element, <label>; whereas in this example "label" is a parameter (3006) because it has no inner elements.

A ComplexObject (3000) contains type, an inner collection of ComplexObjects (3000), and a (3) distinct ParameterRegistrys (3002, 3003, 3004). The inner ComplexObjects (3000) are grouped by their type, and the type corresponds to the tag name of the ComplexObject (3000). The ComplexObject (3000) plays the role of parent to its internal collection of ComplexObject (3000), and ComplexObjects (3000) in the internal collection play the role of child to the parent.

The (3) ParameterRegistrys (3002, 3003, 3004) include:
Parameters (3004): Parameters (3006) in this registry are used to define the structure or schematic configuration of the ComplexObject (3000).
Attributes (3002): Parameters (3006) in this registry specify XML, attributes in the prolog section of XML content.
Deployment (3003): Parameters (3006) in this registry specify status of a ComplexObject (3000) that is involved in some process. For example, a process may perform some operation on a ComplexObject (3000) once; and following the first operation, a deployment parameter "Operation Complete" could be set to "true", and any subsequent operation can check this status.

A ParameterRegistry (e.g., 3002) contains a collection of Parameters (3006), where the Parameters (3006) are grouped by their name. A ParameterRegistry (e.g., 3002) contains all the simple elements of a ComplexObject (3000).

A Parameter (3006) has a name and value, and corresponds to an XML element with just simple [string] content. The name corresponds to the tag name and the value corresponds to the content between the tag. For example, <label>WIDGETS</label> as a Parameter (3006) has a name="label" and value="WIDGETS".

ComplexObject (3000) provides a method, named "findFirst" (3021), that given an ordered list of string expressions, searches into the hierarchy of children and their parameters to find a matching ComplexObject (3000) or Parameter (3006). The strings in the ordered list are used to match ComplexObject (3000) types, and the last expression in the list is used to match a parameter (3006), of a ComplexObject (3000). The first sequence of matching ComplexObjects (3000) and/or parameter (3006) qualifies as found, and the search process returns a Parameter (3006) or ComplexObject (3000) based on the "findFirst" stack directive. The stack directive causes the return process to find an object on the search stack that matches the stack directive and return that object, instead of the object associated with the qualifying found.

ComplexObject (3000) provides a method, named "setFirst" (3022), to conditionally set the first instance of a parameter (3006) in a family in a parameter registry (3002). The setFirst method searches the parameter registry (3002); if no parameters (3006) of the given family are found, then the given parameter (3006) is added to the registry (3002); otherwise, if any parameters (3006) in the given family are found, the given parameter (3006) is not added. This method may be used for situations in which a deployment algorithm preserves a pre-fetched parameter value. For example, suppose the label of a custom field on an external object was updated via Salesforce UI, and it is the policy to preserve the value. In this case, the deployment algorithm would pre-fetch the metadata for the label, and then use "setfirst" to update the label. Because there was a pre-fetched value, it is preserved. When the deployment algorithm deploys the change set, the pre-fetch value is returned for assignment in Salesforce. See, e.g., FIG. 41 for more details regarding the deployment algorithm.

ComplexObject (3000) provides a method, named "replace" (3023), replaces all instances of parameters in a family with a given parameter (3006) of the same family. The "replace" method is used when it is certain that only one instance of the parameter (3006) is allowed in the family, and the given parameter (3006) must be used.

ComplexObject (3000) has a method, named "duplicate", that is used by the deployment algorithm to make copies of pre-fetched metadata (ComplexObjects (3000)). By using clones, the deployment algorithms may preserve or over-write the configuration of a pre-fetched ComplexObject (3000) without losing potentially critical configurations of the pre-fetched ComplexObject (3000).

ComplexObject (3000) has a method that builds an XML string that reflects the composition of the ComplexObject at the time the method is invoked. The XML, string can be streamed into ComplexImporter (3019) to construct and exact duplicate of the original ComplexObject (3000).

ComplexFile (3007) may be used in connection with the creation of a ComplexObject (3000) from an XML Content. A ComplexFile (3007) is a ComplexObject (3000), and in addition to the structure of the ComplexObject (3000), the ComplexFile (3007) has a relative path, object name. Depending on the application of ComplexFile (3007), type corresponds to the name of a metaclass and the object name corresponds to the name of the metaobject, which is also part of the filename.

Because ComplexFile (3007) is a ComplexObject (3000), it inherently has the ability to build an XML string from its composition. The XML string can be streamed into ComplexImporter (3019) to construct and exact duplicate of the original ComplexFile (3007).

The ComplexRegistry (3010) is used to retain an arbitrary collection of ComplexObject (3000), including ComplexFile (3007). The usefulness of ComplexRegistry (3010) is not in the registry, rather it is a means of grouping seemingly unrelated collections of ComplexObject (3000) into a whole that represents a changeset or a fetchset. In one embodiment, ComplexRegistry (3010) is used for the following:

To hold fetched existing assets (ComplexObject (3000), ComplexFile (3007))
To hold deployment assets
To hold destructive assets ComplexObject (3000) models the XML form of Salesforce meta data; where the XML content could be source by a file or stream, or program logic that manipulates ComplexObject (3000). Therefore, ComplexRegistry (3010) is used to model arbitrary collections of XML; which can be expressed as a collection of XML files, or a single ZIP file that contains a collection of XML files.

The ComplexRegistry (3010) object model is similar to ComplexObject (3000), but differs in that all the ComplexObject (3000) retained in a ComplexRegistry (3010) are associated with a [primary] identifier. Thus, given a RegistryStack (3013), a specific ComplexObject (3000) can be found in a ComplexRegistry.

A RegistryStack (3013) provides a methods to push, pop and peek pairs of data, used to search a ComplexRegistry (3010) for a ComplexObject (3000); where the first data of a pair corresponds to a tag name of a ComplexObject (3000), and the second pair corresponds to a parameter value that uniquely identifies an instance of a ComplexObject (3000) in a collection. When searching for an instance of a ComplexObject (3000) in a ComplexRegistry (3010), the parameter (3006) names used for stack parameter values are obtained by providing RegistryStack (3013) to ComplexHelper (3012). ComplexHelper (3012) uses an empirical configuration that maps sequences of ComplexObject (3000) tag names to parameter (3006) names that may be used to uniquely identify a ComplexObject (3000) in a collection.

For Example: Suppose there is a ComplexRegistry (3010) with existing assets, and a host process desires to find an existing custom object, specifically an external object corresponding to an Entity (2908). The process prepares a registry stack (3013) with a single stack element, "CustomObject", and invokes ComplexHelper (3012) to look up the identifier for "CustomObject". In this case, the identifier is "$identity", which implies the filename of the custom object. The filename is based on the Entity (2908) name, so the process continues by pushing a filename onto the RegistryStack (3013), that is ["CustomObject", filename(Entity)], and searching the ComplexRegistry (3010). If a ComplexFile (3007) corresponding to the Entity (2908) is the existing assets, it is returned to the host process.

A ComplexRegistryFile (3011) extends ComplexRegistry (3010), and models ZIP files including:
Fetched existing assets
Changesets
Destructive changesets SFMetaHelper (4209, 3206, 3507) is a utility class that includes the following:

a) A set of encapsulation methods that represent query and/or manipulation of specific Salesforce metaobjects; and that encapsulate the query and/or manipulation of XML metadata in ComplexRegistry(s) (3010) from the processes that query and/or manipulate metadata in metaobjects.

b) An existing Salesforce asset, that is a ComplexRegistry (3010), that the host process pre-fetched, and provided to SFMetaHelper (4209, 3206, 3507) when the host process created SFMetaHelper (4209, 3206, 3507).

c) An "opcode", provided by the host process that indicates to SFMetaHelper (4209, 3206, 3507) how the host process will be using the SFMetaHelper (4209, 3206, 3507). The following opcodes are defined:
Default
Create
Update
Delete d) A collection of ComplexFile(s) (3007) that are cloned from an existing asset, or created anew, as determined by the host process.

The encapsulation methods hide the nuances of manipulating Salesforce metaobject's metadata; where the nuances were established empirically or by a Salesforce specification. For example, consider a method configureTabVisibility (ComplexFile, Entity). The given ComplexFile (3007) corresponds to a Salesforce profile metaobject, and the Entity (2908) indirectly provides reference to its corresponding Salesforce external object. This method first searches the given profile (using find first) for the pattern "tab Visibilities", "tab", [entity]; and if not found, adds a ComplexObject (3000) to the profile ComplexFile (3007); where the ComplexObject (3000) corresponds to the following XML:

<tab Visibilities>
<tab>entity</tab>
</tabVisibilities>

The host process determines tab visibility should be configured, but delegates the details to SFMetaHelper (4209, 3206, 3507).

The opcode is used with certain encapsulation methods where the intended net result is clear. For example, consider a method, processLayout(Property). Depending on the opcode this method will:

Create a new layout for a field corresponding to the Property (2910)
Update an existing layout for a field corresponding to the Property (2910)
Add metadata to a destructive file, to remove the field corresponding to the Property (2910).

Typically, the host process builds an out bound asset, such as a change set or destructive change set, from the collection of ComplexFile(s) (3007) that were retained in SFMetaHelper (4209, 3206, 3507), accumulated during the host process.

ComplexImporter (3019) is used to parse an XML stream and construct a ComplexObject (3000); where the imported ComplexObject (3000) is an exact duplicate of a ComplexObject (3000) that could have been used to create a XML file, and the basis of the XML stream.

Algorithms and Procedures

Figure 24:
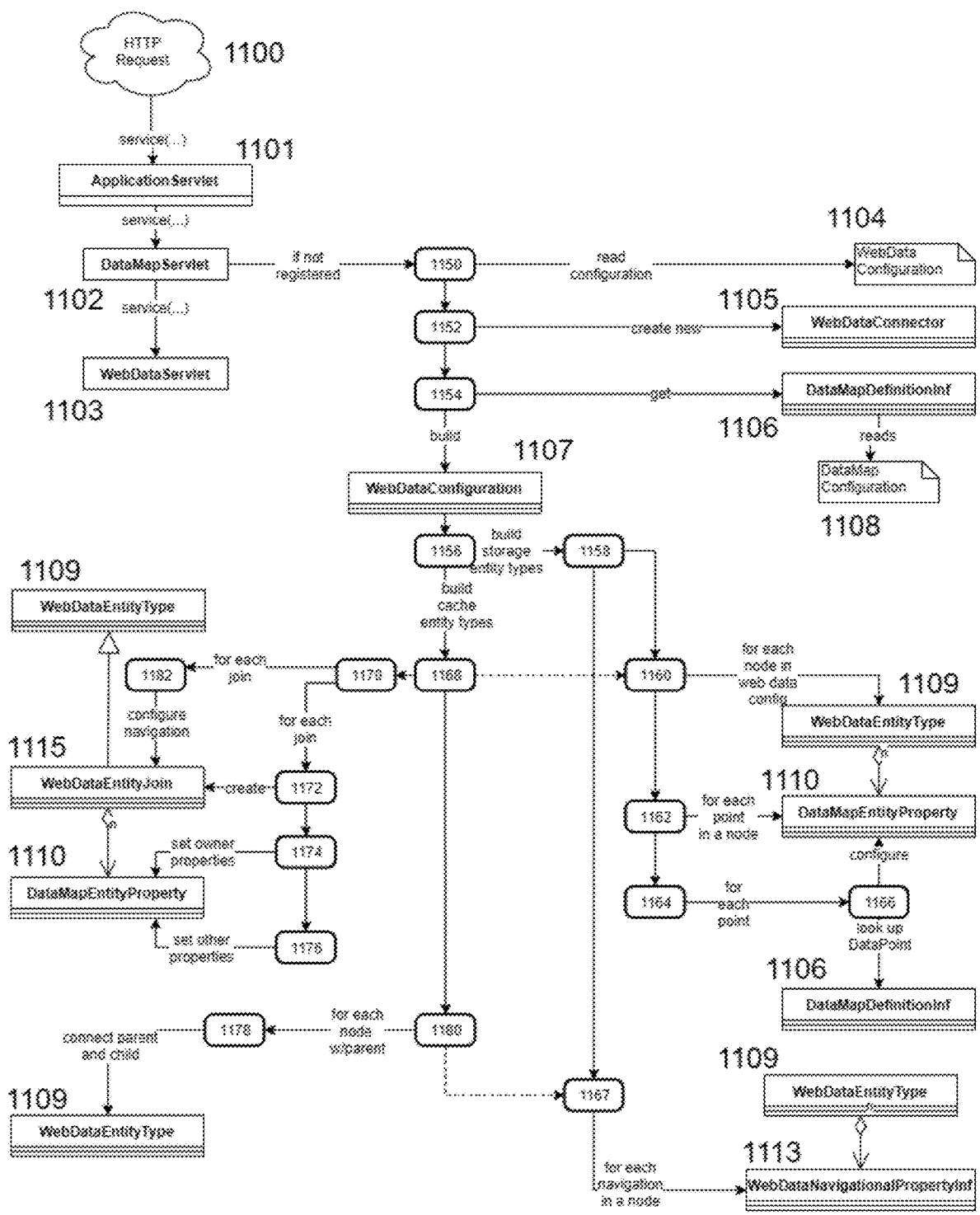
FIG. 24 illustrates WebDataConnector Initialization in accordance with an embodiment.
Figure 26:
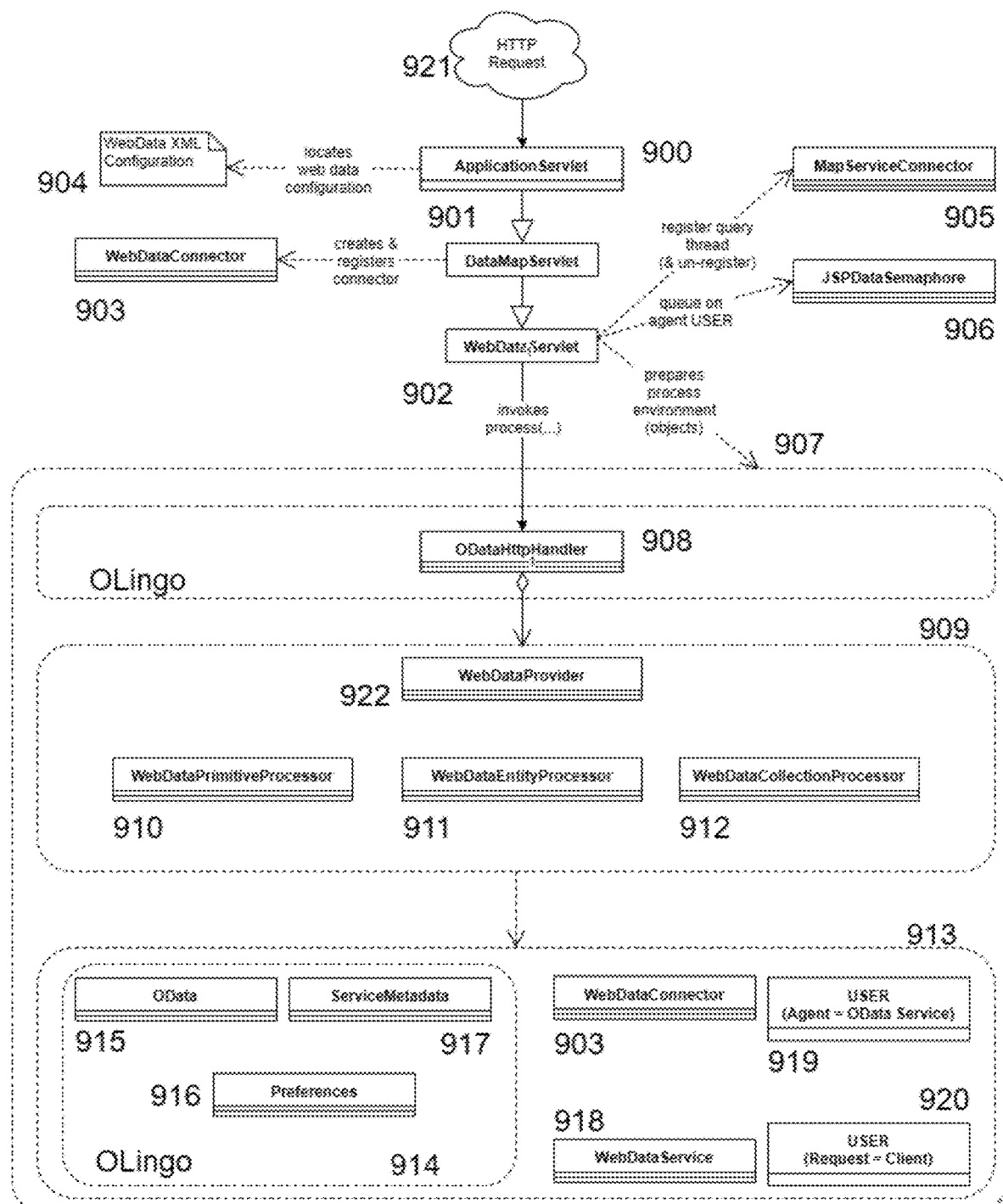
FIG. 26 illustrates processing of an OData HTTP Request within an Web Data Object Environment in accordance with an embodiment.

The descriptions of algorithms are organized into the following categories:
HTTP Request Initialization & Process Preparation
Configuration Audits
OData Requests
OData Client Deployment
Miscellaneous Algorithms HTTP Request The web data environment is initialized on the first HTTP request to the web data service, and the request processing environment is prepared on each HTTP request. FIGS. 24 and 25 show example steps for initialization, and FIG. 26 shows an example of an object environment that exists during request processing.

WebDataConnector Initialization

FIG. 24 illustrates WebDataConnector Initialization in accordance with an embodiment. WebDataConnector (1105) initialization begins on the first HTTP request (1100) received by the service. The service method is implemented in DataMapServlet (1102). On the first HTTP request, DataMapServlet (1102) begins at step (1150) and reads the web data configuration (1104).

At step (1152), and new WebDataConnector (1105) is created; and will be configured in the following steps.

At step (1150), the object form of DataMap (802) Configuration (1104) is obtained, DataMapDefinitionInf (1106), herein referred to as "data map configuration"; and then a new WebDataConfiguration (1107) is created, wherein at step (1156) the process to build the odata object form of "web data configuration" begins.

At step (1160), for each node (801) in the web data configuration a new WebDataEntityType (1109) is created.

At step (1162), for each property in the node a DataMapEntityProperty (1110) is created.

At step (1164), for each property, a corresponding DataPoint (804) is looked up in "data map configuration", and parameters of the DataPoint (804) are used to configure properties.

Returning to step 1158, and continuing at step (1167), for each navigation inside a node a WebDataNavigationPropertyInf (1113) is created and added to the WebDataEntityType (1109) corresponding to the node.

Returning to step (1156), and continuing at step (1168), a collection of WebDataEntityType (1109) are created for cached nodes, using the same process at step (1160).

Returning to step (1168), and continuing at (1170), for each join inside a node, at step 1172 a WebDataEntityJoin (1115) is created, where WebDataEntityJoin (1115) has (2) WebDataEntityType (1109) associated with it: (i) an "owner" and (ii) an "other". At step 1174, for each property on the "owner" a corresponding property is added to the WebDataEntityJoin (1115); and at step 1176, for each property on the "owner" a corresponding property is added to the WebDataEntityJoin (1115).

Returning to 1170, and continuing at 1182, for each join, configure the navigation properties.

Returning to step (1168), and continuing at (1180), at step (1178), for each node that has a parent (see, e.g., FIG. 5, item 1463), double link parent to child and vice versa. (Note: When the client requests schema information, the parent and child links generate appropriate OData navigational properties).

Returning to step (1180), using the same process at step (1167), for each navigation inside a node a WebDataNavigationPropertyInf (1113) is created and added to the WebDataEntityType (1109) corresponding to the node.

Returning to step (1150), the process continues with WebDataServlet (1103, 1200), FIG. 12, step (1250).

ODataHttpHandler Preparation

FIG. 25 illustrates ODataHttpHandler Preparation in accordance with an embodiment. All HTTP requests to this service are intended to be processed using ODataHttpHandler (1216) (e.g., FIG. 25, item 1216 or FIG. 25, item 908). Preparation of ODataHttpHandler (1216) begins in the service method of WebDataServlet (1200), FIG. 12, step 1250, where the thread of execution registers as a query thread with MapServiceConnector (1204). (Note: In the context of the present example, by registering as a query thread, MapServiceConnector (700, 602, 1204) causes the framework to retain all DataMaps (802) in memory, regardless of their expiration status. The framework will retain all data maps until the query thread is un-registered.)

Continuing at steps 1252 and 1254, the request USER (1204) and agent USER (1205) are established. The request USER (1204) is the Salesforce user that caused the OData request to be issued; the request USER (1204) will be associated as the creator or modifier of data, should those action occur. The agent USER (1205) is the servlet application USER that processes the OData request.

At step 1256, the thread of execution is placed in queue with all other requests using JSPDataSemaphore (1206), that is synchronizing on the agent USER (1205). This results in a guarantee that only one request via this service is processed at one time.

At step 1258, several types of objects, as shown inside the box (1218).

At step 1260, ODataHttpHandler (1216) is configured with the processors inside the box (1219).

At step 1262, ODataHttpHandler (1216) is invoked to process the request, where the prevailing object framework is shown in FIG. 26.

FIG. 26 illustrates processing of an OData HTTP Request 921 within an Web Data Object Environment in accordance with an embodiment. FIG. 26 shows the Web Data Object Environment just prior to invoking the "process" method on ODataHttpHandler (1216, 908). Based on the type of request (that is the content of the request URI), ODataHttpHandler (1216, 908) delegates the processing to processor handlers (see, e.g., FIG. 12).

FIG. 26 shows the processors that are described herein; which includes WebDataProvider (114), WebDataPrimitiveProcessor (112, 203), WebDataEntityProcessor (115) and WebDataCollectionProcessor (113, 202). Additional processors can be added in accordance with the needs of the particular implementation. In the context of the present example, all instances of the processors have access to the collection of objects inside the border marked 913. In addition to the objects inside border 913, the processors have access to other globally static objects that include MapServiceConnector (700, 602, 1204), MapServicePool (701).

Configuration Audits

Configuration audits are processes whereby information from one layer of a configuration stack is accessed and used to complete a configuration in an adjoining layer. There is a process associated with the web data configuration (1400) that obtains additional information from the data map configuration (1300), and there is a process associated with the deployment configuration (1500) that obtains additional information from the web data configuration (1400). According to one embodiment, the purpose of these audit processes is to avoid having a user configure information, when it is programmatically available.

Data map configuration (1300) is audited indirectly by WebDataConnector (104), when WebDataConnector (104) is first instantiated (see, e.g., FIG. 24). WebDataConnector (1105) is instantiated when the OData servlet receives a first HTTP request (1100), or when an administrator initiates an audit. When WebDataConnector 1105 is instantiated, as the web data configuration 1104 is parsed, and objects are created and cached into WebDataConnector 1105, the process uses data from the web data configuration (1400) to query for attributes of DataMap (802) nodes (801) and DataPoints (804) from the data map configuration 1108, so that the objects cached in WebDataConnector 1105 reflect attributes taken from the data map configuration 1108.

Web Data Configuration (1400) is audited when a deployment administrator initiates an audit via the deployment management user interface (DMUI). In one embodiment, the DMUI is a web browser that connects to a web server, which in turn hosts an application to manage the deployment configuration. The application has access to the WebDataConnector(s). The audit queries a WebDataConnector (104) for entity types and properties, and creates or updates the deployment configuration (1500) with default schema definition.

OData Requests

OData requests are received by the OData service as an HTTP request (FIG. 26, 921); where an HTTP request includes a URI and headers. The HTTP request must conform to OData specification. According to one embodiment, the OData service: (i) parses and/or digest the HTTP request in accordance with the OData specification, (ii) processes the request, and (iii) responds with content in accordance with the OData specification.

In an embodiment, the system utilizes an object oriented framework; where the object oriented framework is responsible for:
- Parsing the HTTP request in accordance with the OData specification
- Delegating to interfaces that process the request
- Provide an API whereby the interfaces that process the request can access elements of the HTTP request and configure a response
- Output a configured response in accordance with the OData specification.

Embodiments of the present disclosure include implementing the interfaces that are invoked by the framework, and processing the request.

In an embodiment, the Apache OLingo software library is the "object oriented framework" that is used to parse the HTTP request and delegate response processing to interfaces; and provides an API to the interfaces that provide access to elements of the HTTP request, and the ability to configure a response.

All OData requests may be received by a common entry point, where the URI is parsed to determine how to fulfill the response, and delegates to a handler & method depending on the parse. For example, OData requests may be initially received by ApplicationServlet (900) base class, WebDataServlet (902).

In one embodiment, when the first request of any kind is received, the WebDataConnector (903) for the servlet is created and cached; and on subsequent requests, the WebDataConnector (104) is referenced from the cache. When WebDataConnector (104) is created, the servlet uses WebDataConfiguration (1107) to parse the web data configuration (904, 1400), and create a collection of objects in WebDataConnector (104) that includes WebDataEntityType (1109), WebDataEntityProperty (1110) and WebDataNavigationPropertyInf (1113).

In one embodiment, authentication is performed next, and a user agent (919) is established. For example, the WebDataConnector (104) may provide the authentication scheme and other data used to establish the user agent for the request. The request is placed in a user agent queue, via JSPDataSemaphore (906), so that only one request per user is active. An OLingo handler is prepared and configured with instances of WebDataProvider 922, WebDataEntityProcessor (115, 201, 911), WebDataPrimitiveProcessor (112, 203, 911), WebDataCollectionProcessor (113, 202, 912) (See, e.g., FIG. 26, item 909).

Figure 27:
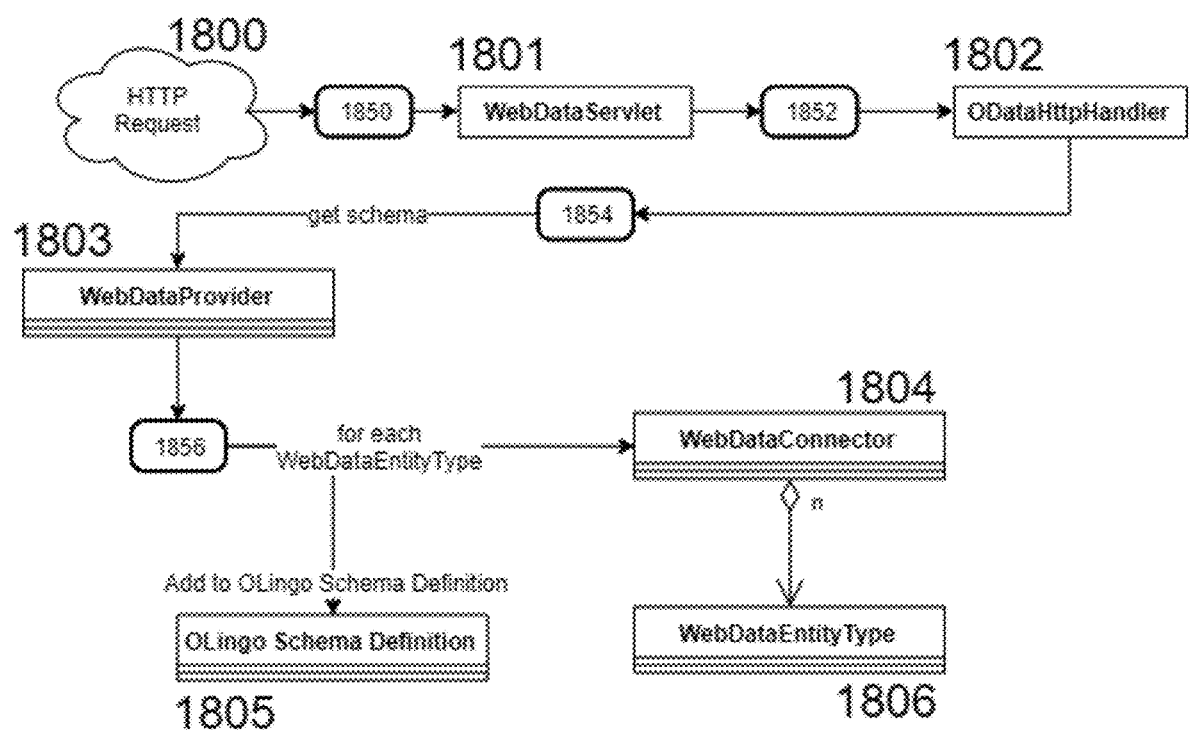
FIG. 27 illustrates Request Schema Information in accordance with an embodiment.

The OLingo handler is invoked to continue processing the request. The OLingo handler analyzes the URI and delegates further processing to one of the methods on one of the handler objects in 909 of FIG. 26. The method and handler used depends on the nature of the request. Embodiments of the present disclosure are further described in the sections corresponding to the following OData requests:
- Request schema information
- Read [single] entity
- Read entity collection (multiple entities)
- Create entity
- Update entity
- Delete entity Request Schema Information FIG. 27 illustrates Request Schema Information in accordance with an embodiment. In the context of the present example, Olingo delegates request for schema metadata to WebDataProvider (114). The methods on WebDataProvider (114) implement the Olingo interface, CsdlAbstractEdmProvider. The methods implemented buy WebDataProvider (114) return Olingo objects, which Olingo in turn uses to create a response stream to the request. WebDataProvider (114) uses WebDataConnector (104) to create Olingo objects (See WebDataConnector (104)).

At step 1850, WebDataServlet (1801) receives the HTTP request (1800).

At step 1852, WebDataServlet (1801) invokes ODataHttpHandler (1216, 908, 1802, 1902).

At step 1854, ODataHttpHandler (1216, 908, 1802, 1902) parses the URI and invokes WebDataProvider (1803) to get a OLingo schema definition (1805).

At step 1856, for each WebDataEntityType (1806) in WebDataConnector (1804), an entity type definition is added to the OLingo schema definition (1805).

Returning to step 1854, ODataHttpHandler (1216, 908, 1802, 1902) formats a response and completes the request.

Read Single Entity

FIG. 28 illustrates a Read Single Entity process in accordance with an embodiment. The read single entity process begins at step 1950 when the service receives an http request 1900. The request is initially invoked on WebDataServlet 1901; the framework of objects is prepared at step 1952; and ODataHttpHandler (1216, 908, 1802, 1902) is invoked. At step 1954, process is delegated to WebDataEntityProcessor (115, 201, 911). At step 1956, any navigational criteria in the URI are process until reaching the final entity criteria. Based on the entity type of the final entity criteria, an instance of WebDataEntityStorageInf (300) is establish (See WebData Configuration items 1418, 1438) and invoked to query for an entity. The method of query depends on the implementation of WebDataEntityStorageInf (300).

At step 1960, if the implementation of WebDataEntityStorageInf 1904 is MapServiceEntityStorage (302, 1905) 1905, at step 1962 MapServicePool (701) is queried for a qualifying entity. At step 1964, if an entity is not found and the entity type has a MapServiceEntityLoader (500, 402) configured (1412), the at step 1966 the loader is invoked to load a DataMap (802) into cache (MapServicePool (701)). At step 1960, the cache is queried again. At step 1970, if an entity was found it is returned. Returning to step 1964, if an entity was found on the first query, it is returned.

Returning to step 1960, if the implementation of WebDataEntityStorageInf (300, 1904) is StorableEntityStorage (303), then at step 1972 an IStorageFilter (3611) is initially configured with criteria based on the URI.

At step 1974, if the entity type as a class filter (1422) (e.g., StorableClassFilter (3704)) associated with it (See WebData Configuration item 1421), the class filter (1422) (e.g., StorableClassFilter (3704)) is used to further configure the IStorageFilter (3611).

At step 1978, storage is queried via IStorage (3609). At step 1980, if an entity was found it is returned.

Additional Notes:

The use of MapServiceEntityLoader (500, 402) assumes the client has some specific interest in the entity, and further assumes the client may want to manipulate the DataMap (802) associated with the entity.

All entity records are read from storage, subject to a filter that narrows the query to the specific record corresponding to the entity criteria. The underlying implementation uses the same algorithm when reading multiple entities; the difference is the request URI for this case contains criteria that inherently results in at most one record found.

The StorableEntityStorage (303) may have an optional class filter (1422) (e.g., StorableClassFilter (3704)), per the web data configuration. Any time StorableEntityStorage (303) is invoked to read records from storage, it is provided an IStorageFilter (3611, 4419) that is pre-configured according to the URI. If StorableEntityStorage (303) has a class filter (1422) (e.g., StorableClassFilter (3704)), then before the records are read from storage, IStorageFilter (3611, 4419) is further configured in accordance with the class filter (1422) (e.g., StorableClassFilter (3704)) (See StorableClassFilter).

Additional storage systems/methods can be implemented by extension of WebDataEntityStorageInf (300, 1904).

Read Entity Collection

FIG. 29 illustrates a Read Entity Collection process in accordance with an embodiment. The read entity collection process begins at step 2050 when the service receives an http request 2000. The request is initially invoked on WebDataServlet 2001; the framework of objects is prepared at step 2052; and ODataHttpHandler (1216, 908, 1802, 1902) is invoked. At step 2054, process is delegated to WebDataCollectionProcessor (113, 202, 912).

At step 2056, any navigational criteria in the URI are process until reaching the final entity collection criteria. Based on the entity type of the final entity collection criteria, an instance of WebDataEntityStorageInf (300, 1904, 2004) is establish (See WebData Configuration items 1418, 1438) and invoked to query for an entity collection. The method of query depends on the implementation of WebDataEntityStorageInf (300, 1904, 2004).

At step 2060, if the implementation of WebDataEntityStorageInf 2004 is MapServiceEntityStorage (302, 1905, 2005), at step 2062 MapServicePool (701) is queried for a qualifying entities. At step 2064, the results are returned to OLingo as an entity collection.

Returning to step 2060, if the implementation of WebDataEntityStorageInf (300, 1904, 2004) is StorableEntityStorage 2007, then at step 2066 an IStorageFilter (3611) is initially configured with criteria based on the URI.

At step 2068, if the entity type has a class filter (1422) (e.g., StorableClassFilter (3704)) associated with it (See WebData Configuration item 1421), the class filter (1422) (e.g., StorableClassFilter (3704)) is used to further configure the IStorageFilter (3611).

At step 2072, IStorage (3609) is queried.

At step 2074, the results are returned to OLingo as an entity collection.

Query Cache

Figure 30:
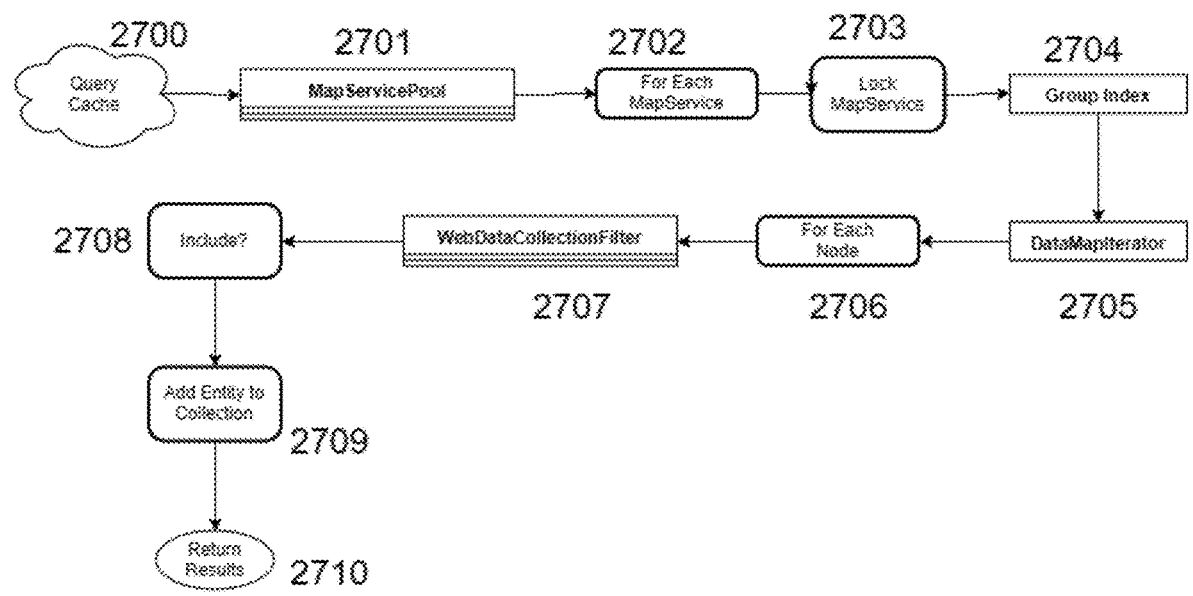
FIG. 30 illustrates a Query Cache (DataMapService) process in accordance with an embodiment.

FIG. 30 illustrates a Query Cache (DataMapService) process in accordance with an embodiment. FIG. 30 is a diagram showing a non-limiting example of greater detail of steps 2062, 1968, etc. of FIG. 29, respectively, the method of query cache. Beginning at step 2700, a host process initiates the query process, that fetches a collection of DataMapService (800) from MapServicePool (701), of all DataMapService (800) in the MapServicePool (701) with a map definition name corresponding to the web data service (ApplicationServlet (100)).

At step 2702, the process iterates over each DataMapService (800) in the collection.

At step 2703, a thread lock is obtained, giving the thread exclusive access to the DataMapService (800). The status of the DataMapService (800) with the MapServicePool (701) is touched.

At step 2704, the group index of the DataMapEntityType (407) is used to construct a DataMapIterator (816).

At step 2706, each subordinate (DataMap (802)) node (801) in the DataMapService (800) is iterated over.

At step 2708, the WebDataCollectionFilter (3700, 2707) (provided at the beginning of the query step 2700), is used to determine if the current subordinate node (801) should be included in the entity collection.

At step 2709, the node (801) is included, and a corresponding entity is added to the collection.

Within step 2709, for each property in the DataMapEntityType (407), a corresponding DataPoint (804) index is used to get a property value from the current subordinate node (801). The properties, and corresponding property values are used to create an entity.

At step 2710, all qualified nodes (801) (from all qualified DataMapService (800)) are returned to the host process as an entity collection.

Additional Notes:

At step 2702, at the end of each iteration, the lock on the DataMapService (800) (that was obtained at step 2703) is released.

At step 2708, the WebDataCollectionFilter (3700, 2707) was provided by the host process, at step 2700.

At step 2703, see MapServicePool (701) touch API.

Figure 35:
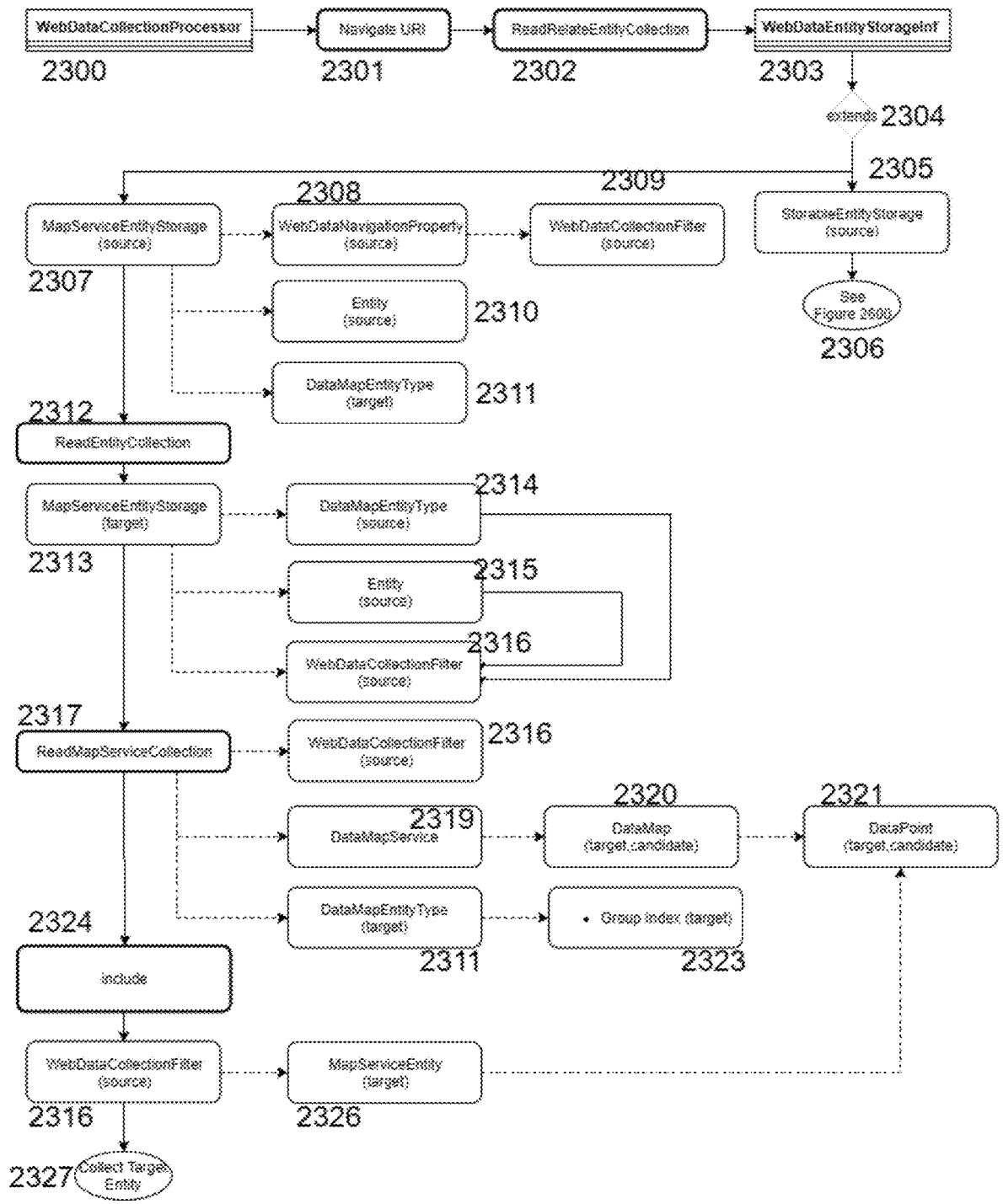
FIG. 35 illustrates a Read Entity Collection (Navigate URI, WebDataCollectionFilter) process in accordance with an embodiment.
Figure 36:
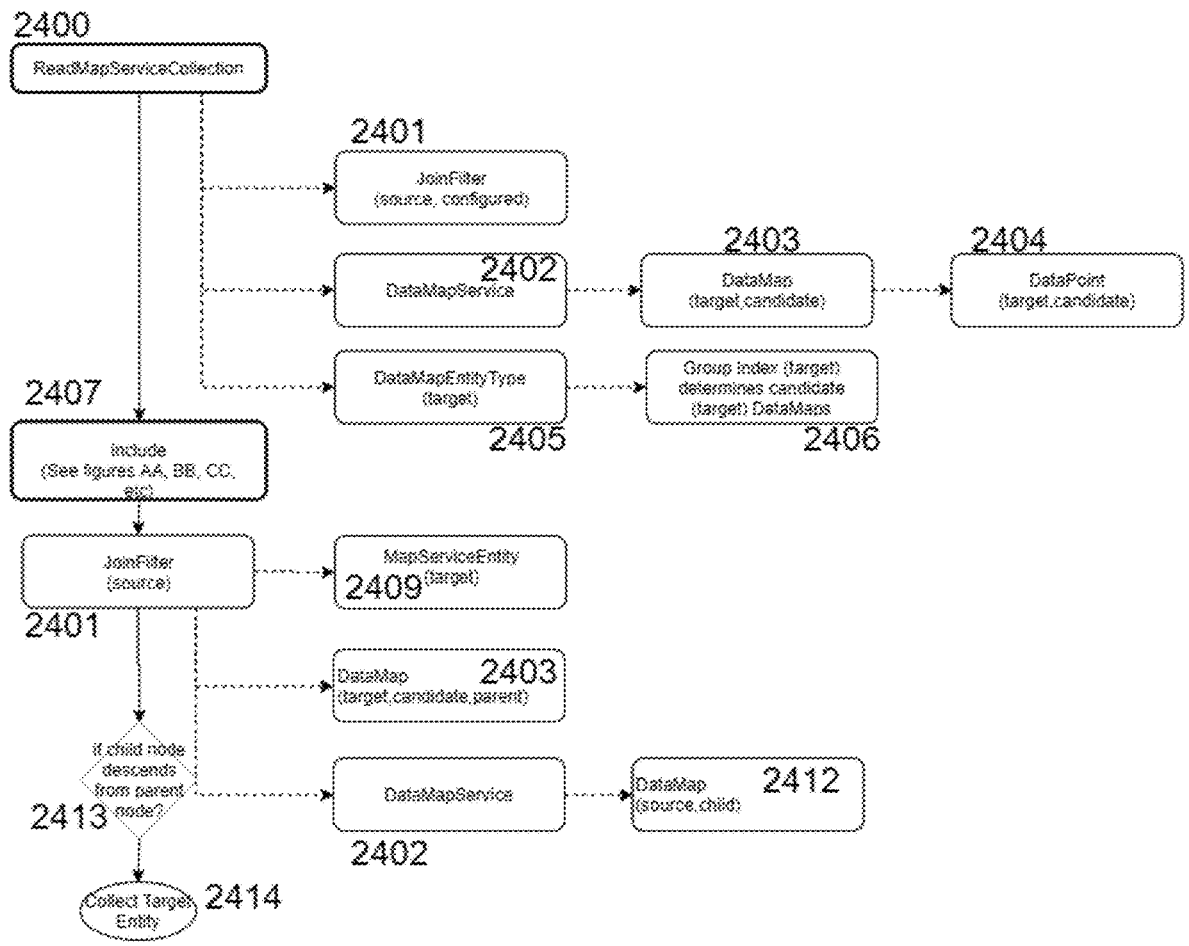
FIG. 36 illustrates a Read Entity Collection (Navigate URI, JoinFilter) process in accordance with an embodiment.

See FIGS. 35 and 36 for more examples of query cache

Create Entity

FIG. 31 illustrates a Create Entity process in accordance with an embodiment. The create entity process begins at step 2150 when the service receives an http request 2100. The request is initially invoked on WebDataServlet 2101; the framework of objects is prepared at step 2152 (See FIG. 24); and ODataHttpHandler (1216, 908, 1802, 1902, 2102) is invoked.

At step 2154, the process is delegated to WebDataEntityProcessor (115, 201, 911, 2103). At step 2156, the entity criteria is established from the URI, and based on the entity type, an instance of WebDataEntityStorageInf 2104 is establish (See WebData Configuration items 1418, 1438) and invoked to create the entity. The method of creation depends on the implementations of CreateStorableEntity (2109, 307) and InstallEntityDataCache (2105, 306) that are configured to WebDataEntityStorageInf 2104.

At step 2158 the Storable (3600) record is inserted; where the method of insertion depends on the implementations of CreateStorableEntity (2109, 307).

The decision point at step 2160 depends on the implementation of InstallEntityDataCache 2105.

If the new record is a root record then at step 2184, the DataMap (802) associated with the root record is loaded into cache (2106); where the method of loading depends on the MapServiceEntityLoader (2107) configured with the entity type.

At step 2186 the DataMap (802) associated with the root record is expected to be found in the cache (2106).

At step 2187, a thread lock is obtained for the DataMap (802).

At step 2188, the formulas are invoked.

At step 2190, the balance of property values are assigned into sub-hierarchical DataPoints (804) (for entity types based on cache, it is permissible for an entity type to have properties corresponding to sub-hierarchical DataPoints (804). The integrity of an entity, based on cache may not be whole until the associated nodes (801) are loaded, and the formulas run once after loading.

At step 2198, the formulas are invoked again (to account for possible changes at step 2190).

At step 2199, the DataMap (802) is persisted to storage; the DataMap (802) includes an unbounded, arbitrary collection of Storable (3600) objects, with property values that may have changed. All Storable (3600) objects in the DataMap (802) hierarchy that have changed are persisted.

At step 2197, the thread lock on the DataMap (802) is released.

At step 2195, control is returned to the host process.

Returning to step 2160, If the record is subordinate (a child) to the root record, then at step 2162 the cache is queried for a DataMap (802) that the new record would belong to. The child record has a reference to a persisted parent. MapServicePool (2106, 701) is searched for a DataMap (802) having a node (801) corresponding to the parent.

At step 2164, if a DataMap (802) is not found, then using the MapServiceEntityLoader (2107), a DataMap (802) is loaded into cache (2106); where at step 2168, the DataMap (802) is expected to be found; and processing continues at step 2174.

Joining at step 2174, a thread lock is obtained for the DataMap (802).

At step 2176, the new record is installed into the DataMap (802) via the hosting DataMapService (800). Installing a new record into a DataMap (802) via DataMapService (800) will cause a node (801) (corresponding to the new record) to be install in the DataMap (802), and trigger a load of any subordinate nodes (801), as per the data map configuration (1300).

The process continues with steps 2188, 2190, 2198, etc., to 2195 as described previously.

Additional Notes:

Locking the DataMap (802) at steps 2187, 2174, et al, ensures only one thread of execution can operate on the DataMap (802) at any one time.

At step 2158, only the property values specific to the Storable (3600) are persisted; the URI may contain many more property values that may only be applicable when the DataMap (802) is loaded into cache. Thus, at step 2190, all property values can be assigned because the DataMap (802) is in the cache.

At step 2199, the DataMap (802) includes an unbounded, arbitrary collection of Storable (3600) objects, with property values that may have changed as a result of invoking the formulas. All OData processes that invoke DataMap (802) formulas will include a process to persist the DataMap (802), so that any Storable (3600) objects that have changed, may have their values persisted in IStorage (3609), so that when a DataMap (802) is loaded, the fields contain their last cache value.

At step 2188, the formulas have the ability to allocate additional nodes (801) based on the logic of the formulas, and in accordance with the data map configuration. Running the formulas at step 2188 may be required to successfully assign property values at step 2190.

At steps 2184 and 2186, and others like them (2168, 2166, 2162), anytime MapServicePool (701) returns a DataMap (802) in a query, or loads a DataMap (802), MapServicePool (701) automatically "touches" the DataMap (802) status, where the cache age of the DataMap (802) is reset to 0. See MapServicePool (701), et al for the purpose and benefits of "touching" a cached DataMap (802).

During initial receipt of the HTTP request, the user is established by the WebDataServlet (See, e.g., FIG. 26, item 920), and is assigned the active DataMap (802) user when a DataMap (802) is locked. As such, any time a Storable (3600) record is inserted or updated, the record includes the user that created or updated the Storable (3600) record, and the time and date when the record was created and updated.

As those skilled in the art will appreciate, the methods of FIG. 31 are dependent on the implementations of WebDataEntityStorageInf (300, 1904, 2004, 2104), CreateStorableEntity (307, 2109) and InstallEntityDataCache (306, 2105). See FIG. 15 for WebDataEntityStorageInf (300, 1904, 2004, 2104) class hierarchy and composition; and sections on CreateStorableEntity (307, 2109) and InstallEntityDataCache (306, 2105) regarding their class hierarchy and composition.

Update Entity

FIG. 32 illustrates an Update Entity process in accordance with an embodiment. The update entity process begins at step 2250 when the service receives an http request 2200. The request is initially invoked on WebDataServlet 2201; the framework of objects is prepared at step 2252; and ODataHttpHandler (1216, 908, 1802, 1902, 2102) is invoked.

At step 2254, process is delegated to WebDataEntityProcessor (115, 201, 911, 2103, 2203).

At step 2256, the entity criteria is established from the URI, and based on the entity type, an instance of WebDataEntityStorageInf 2204 is establish (See WebData Configuration items 1418, 1438) and invoked to update the entity. The method of update depends on the implementation of WebDataEntityStorageInf 2204.

At step 2258, if the implementation of WebDataEntityStorageInf 2204 is MapServiceEntityStorage (302, 1905, 2005, 2206), then processing continues at step 2262.

At step 2264, the MapServicePool 2207 is queried for a (DataMap (802)) node (801) corresponding to the entity criteria in the URI. If a node (801) is found processing continues at step 2266; otherwise at step 2268 an error is returned.

At step 2270, the process (thread) obtains a lock (exclusive access) to the DataMap (802).

At step 2272, for each qualifying node (801) in the DataMap (802), all property values in the URI are assigned to the corresponding DataPoints (804).

At step 2274, for each qualifying node (801) in the DataMap (802), the subordinate DataMaps (802) are loaded.

At step 2278, and no subordinate DataMaps (802) were loaded, then at step 2276 the formulas are invoked.

At step 2280, the DataMap (802) is persisted to IStorage (3609).

At step 2282, the DataMap (802) is unlocked.

Returning to step 2258, otherwise, if the implementation of WebDataEntityStorageInf 2204 is StorableEntityStorage 2205, processing continues at step 2260.

At step 2170, if the entity type is configured to use the cache, the processing continues at step 2286.

At step 2286, the MapServicePool is queried for qualifying nodes (801).

At step 2288, if any nodes (801) are found, then processing continues at steps 2270, 2272, 2274, etc., as previously described; otherwise, returning to step 2288, if no nodes (801) are found, then at step 2290, an attempt to load a DataMap (802) from IStorage (3609) is made; if a DataMap (802) is found, it is loaded into MapServicePool (701).

At step 2294, the MapServicePool (701) is queried for qualifying nodes (801); if no nodes (801) are found, then at step 2296, an error is returned; otherwise, processing continues at steps 2270, 2272, 2274, etc., as previously described.

Returning to step 2170, otherwise, if the entity type is not configured to use the cache, then processing continues at step 2298.

At step 2298, the existing Storable (3600) record is retrieved from IStorage (3609).

At step 2299, all property values are assigned into the corresponding fields of the Storable (3600) record.

At step 2297, the Storable (3600) modified date and modified by user is updated with the current date & time, and request user (See, e.g., FIG. 26, item 920 and FIG. 26, item 1204).

At step 2295, the Storable (3600) is persisted into IStorage (3609).

Additional Notes:
- At steps 2299, 2272, et al, assign all properties, if a property is configured as read-only in the web data configuration, even though the client submitted a property value, the actual assignment will be skipped over and ignored.
- Querying MapServicePool (701) for qualifying (DataMap (802)) nodes (801), using criteria from the URI, can return 0, 1 or many qualifying nodes (801). For entity updates, an embodiment is designed to update 1 or many qualifying nodes (801), and return an error if no qualifying nodes (801) are found.
- When DataMap (802) is persisted to IStorage (3609): The DataMap (802) includes an unbounded, arbitrary collection of Storable (3600) objects, with property values that may have changed. All Storable (3600) objects in the DataMap (802) hierarchy that have changed are persisted.
- While the descriptions of FIGS. 21 and 22 focuses on manipulating an odata entity, by invoking the formulas, by virtue of the formula abstraction, an unlimited number of side effects can occur. This is true for any point in this document where formulas are is invoked (also termed "auto-calculation cycle").

Delete Entity

FIG. 33 illustrates a Delete Entity process in accordance with an embodiment. The delete entity process begins at step 3950 when the service receives an http request 3900. The request is initially invoked on WebDataServlet 3901; the framework of objects is prepared at step 3952; and ODataHttpHandler (1216, 908, 1802, 1902, 2102) is invoked. At step 3954, process is delegated to WebDataEntityProcessor (115, 201, 911, 2103, 2203, 3903). At step 3956, the entity criteria is established from the URI, and based on the entity type, an instance of WebDataEntityStorageInf 3904 is establish (See WebData Configuration items 1418, 1438) and invoked to delete the entity. The method of delete depends on the implementation of WebDataEntityStorageInf 3904.

At step 3958, if the implementation of WebDataEntityStorageInf 3904 is MapServiceEntityStorage (302, 1905, 2005, 2206 3906), then processing continues at step 3962.

At step 3964, the MapServicePool 3907 is queried for a (DataMap (802)) node (801) corresponding to the entity criteria in the URI; the node (801) is expected to be found.

At step 3970, the process (thread) obtains a lock (exclusive access) to the DataMap (802).

At step 3972, for each qualifying node (801) in the DataMap (802), the corresponding Storable (3600) associated with the node (801) is deleted from (RDBS) storage.

At step 3974, the node (801) is removed from the DataMap (802).

At step 3978, the formulas are invoked.

At step 3980, the DataMap (802) is persisted to IStorage (3609).

At step 3982, the DataMap (802) is unlocked.

Returning to step 3958, otherwise, if the implementation of WebDataEntityStorageInf 3904 is StorableEntityStorage 3905, processing continues at step 3960.

At step 3970, if the entity type is configured to use the cache, the processing continues at step 3986.

At step 3986, the MapServicePool (701) is queried for qualifying nodes (801).

At step 3988, if any nodes (801) are found, then processing continues at steps 3970, 3972, 3974, etc., as previously described; otherwise, returning to step 3988, if no nodes (801) are found, then at step 3990, an attempt to load a DataMap (802) from IStorage (3609) is made; in this case at step 3992 a DataMap (802) is expected to be found.

Processing continues at steps 3970, 3972, 3974, etc., as previously described.

Returning to step 3970, otherwise, if the entity type is not configured to use the cache, then processing continues at step 3998.

At step 3998, the existing Storable (3600) record is retrieved from IStorage (3609).

At step 3995, the Storable (3600) is deleted from IStorage (3609).

Additional Notes:
- At steps 3995 and 3972, in one embodiment, the Storable (3600) is deleted using a StorableScrubber (4391). StorableScrubber (4391) optimizes the actual process of executing delete in a database storage system. If the Storable (3600) being deleted is an instance of DATANODE (4300), then the DATANODE (4300) record is updated to a new parent; where the parent is a temporary SCRUBNODE; and StorableScrubber (4391) performs the record deletion when the database is not being used. If the Storable (3600) being deleted is not a DATANODE (4300), then StorableScrubber (4391) performs the record deletion immediately.
- A recommended embodiment of the underlying database data structure is to use DATANODE (4300), or extensions thereof so that by deleting one record (3995, 3972), Lentiles (FIG. 7) will automatically delete any subordinate records, StorableScrubber (4391) will initiate the record deletions during optimal conditions. While this is recommended, it is not required.

Miscellaneous Algorithms

Navigating URI References—The OData specification defines syntax that specifies how to construct a URI that contains information that can be used to navigate from one entity criteria to another, to another, and so on.

Before OLingo delegates the request, it parses the URI for entity and navigation criteria and constructs a UriInfo object, that it passes to the delegate handler as parameter.

WebDataEntityProcessor (115) and WebDataCollectionProcessor (113, 202, 912) are delegates that utilize a technique for traversing the navigational references in the URI using the UriInfo provided by OLingo.

The navigational references is in the form of an ordered list and begins with a reference to an initial entity criteria. For the purposes of navigation, a previous entity criteria and next entity criteria is assigned the initial entity criteria. On subsequent iterations through the list, next entity criteria is obtained; so that on any iteration there is a previous and next entity criteria.

The WebDataEntityStorage (301) for the previous entity, and an entity is read from storage using the previous entity criteria. WebDataEntityStorage (301) is responsible for implementing the read of a collection of related entities; where the relationship is set by a navigational property. Therefore, given the previous entity just read and the next entity criteria, WebDataEntityStorage (301) is invoked to read a next collection of entities.

WebDataCollectionProcessor URI Navigation

Figure 34:
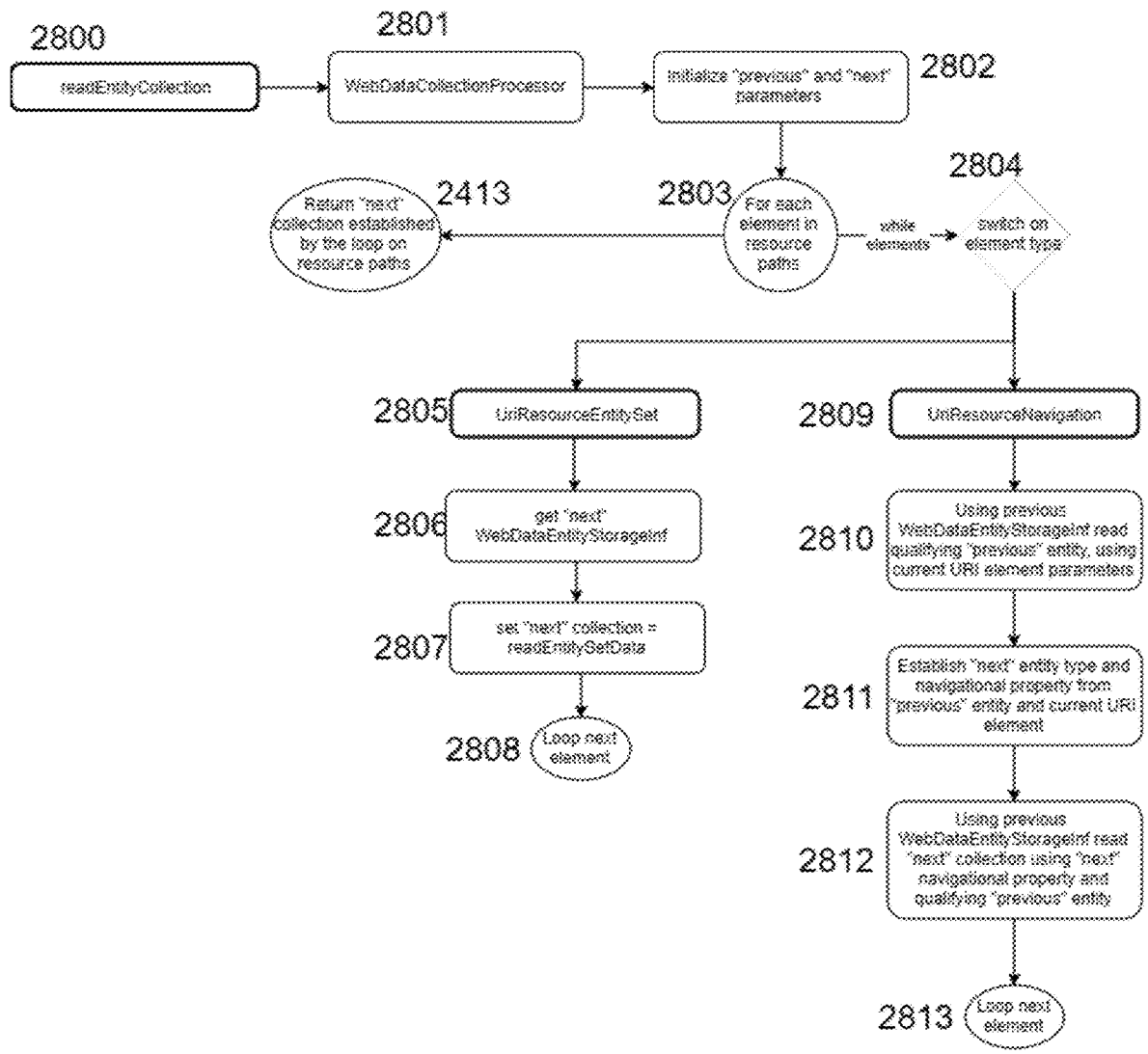
FIG. 34 illustrates a WebDataCollectionProcessor URI Navigation process in accordance with an embodiment.

FIG. 34 illustrates a WebDataCollectionProcessor URI Navigation process in accordance with an embodiment. FIG. 34 is a diagram of a process where WebDataCollectionProcessor (113, 202, 912, 2801) may navigate a URI as part of a request to read an entity collection. The notion of navigation is best described by step 2803, where each element in the OLingo resource paths is processed. But before entering the loop (2803), at step 2802, the method initializes various parameters associated with the "previous" entity type, and the "next" entity type.

For each element in the loop, at step 2804 the method branches depending on the type of OLingo element. If the element is a UriResourceEntitySet, then steps 2805, 2806, 2807 and 2808 are followed. If the element is a UriResourceNavigation, then steps 2809, 2810, 2811, 2812 and 2813 are followed. The loop continues from steps 2808 or 2813, until all elements of the resource paths have been processed. At step 2813, the final (next) entity collection established by the last action of steps 2808 or 2813, is returned to the host process.

Additional Notes:
In an embodiment, the entity types (e.g., previous and next) are configured with a WebDataEntityStorageInf (300, 1904, 2004, 2104, 2204, 3904) that the method of FIG. 34 uses. The API of WebDataEntityStorageInf (300, 1904, 2004, 2104, 2204, 3904) supports the requirements of the method of FIG. 34, but the API of WebDataEntityStorageInf (300, 1904, 2004, 2104, 2204, 3904) is not specifically aware of any methods that utilize its API.

In the context of a particular embodiment, the method of FIG. 34 is described in terms of an interface, WebDataEntityStorageInf (300, 1904, 2004, 2104, 2204, 3904). This implies that any implementation of WebDataEntityStorageInf (300, 1904, 2004, 2104, 2204, 3904) can be used. The current example includes StorableEntityStorage (303, 2007, 2205, 3905) (e.g., RDBS) and MapServiceEntityStorage (302, 1905, 2005, 2206 3906) (cached). Others may be added as desired.

Class Algorithms

FIG. 35 illustrates a Read Entity Collection (Navigate URI, WebDataCollectionFilter) process in accordance with an embodiment. FIG. 35 diagrams an example process that read entity collection from cache where the host process is navigating a URI.

Steps 2300 through 2307 are all specific to read related entity collection, but within step 2307 the filter (2309, 2316) that is used is based on the navigational property, and at step 2312 the process is common, regardless of the filter (2316), with the exception at step 2324, the logic to determine if an entity should be included varies, depending on the implementation of the filter (2316).

FIG. 36 illustrates a Read Entity Collection (Navigate URI, JoinFilter) process in accordance with an embodiment. FIG. 36 shows an application of FIG. 35 where the instance of WebDataCollectionFilter (3700, 2707) is a JoinFilter (2401). In this example, at step 2400, the JoinFilter (2401) is provided, and pre-configured (see, e.g., FIG. 35).

At step 2407, include is invoked, and at step 2413 if the child node (2412) descends from the candidate parent node (2403) then JoinFilter (2401) returns true, and an entity corresponding to 2403 is retained in the collection.

Figure 37:
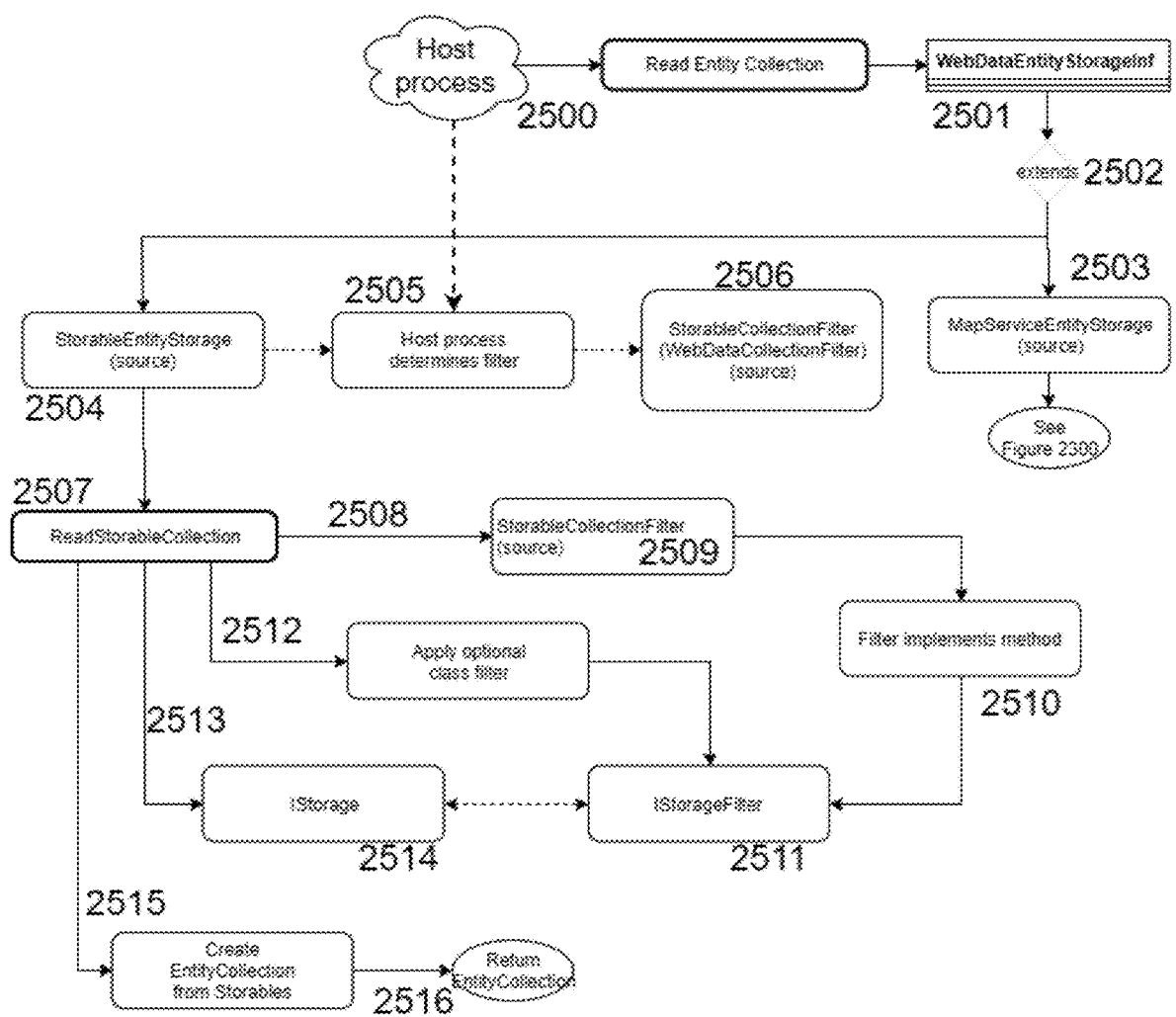
FIG. 37 illustrates a Read Entity Collection (StorableCollectionFilter) process in accordance with an embodiment.

FIG. 37 illustrates a Read Entity Collection (StorableCollectionFilter) process in accordance with an embodiment. FIG. 37 diagrams various example steps and references for reading entity collection using StorableEntityStorage (303, 2007, 2205, 3905).

The process begins at step 2500 where some host process invokes WebDataEntityStorageInf (300, 1904, 2004, 2104, 2204, 3904) to read an entity collection. In this example, StorableEntity Storage (303, 2007, 2205, 3905) implements WebDataEntityStorageInf (300, 1904, 2004, 2104, 2204, 3904), and so at step 2505, a StorableCollectionFilter (3703, 2506) is prepared. The type of StorableCollectionFilter (3703, 2506) depends on the purpose of the host process. Other objects may be provided by the host process, if desired to support the requirements of the filter.

At step 2507, (4) steps, 2508, 2512, 2513 and 2515 are completed in order. At step 2508, the StorableCollectionFilter (3703, 2506) is invoked to configure IStorageFilter (3611, 4419). In one embodiment, StorableCollectionFilter (3703, 2506) may configure IStorageFilter (3611, 4419) directly, or delegate the process of configuration to other implementations; so long as on completion of step 2508, IStorageFilter (3611, 4419) is configured per the requirement of the host process.

Returning to step 2507, at step 2512, if the web data configuration (1400) has an optional class filter (1422) (i.e., StorableClassFilter (3704)) configured, and instance of that class is invoked to apply additional filter requirements, narrowing the set of records that could be returned.

Returning to step 2507, at step 2513, IStorage (3609) is used to query the storage system; where the query takes into account the configuration of the IStorageFilter (3611, 4419) previously done; the IStorageFilter (3611, 4419) which when use with IStorage (3609) read, generates a SQL where clause; the read results in the retrieval of a set of records; the records having field values that conform to the intended purpose of the StorableCollectionFilter (3703, 2506).

Returning to step 2507, at step 2515, the query returns a collection of 0 or more Storable (3600) objects, and are used to create an EntityCollection.

At step 2516, the EntityCollection is returned to the host process.

Non-limiting examples of some of the host processes include:
- WebDataCollectionProcessor (113, 202, 912, 2801) is parsing URI navigation expressions and reads a set of related entities.
- WebDataCollectionProcessor (113, 202, 912, 2801) is reading a specific set of entities.
- WebDataEntityProcessor (115, 201, 911, 2103, 2203, 3903) is parsing URI navigation expressions and reads a related entity.
- WebDataEntityProcessor (115, 201, 911, 2103, 2203, 3903) is reading a specific entity.

Figure 38:
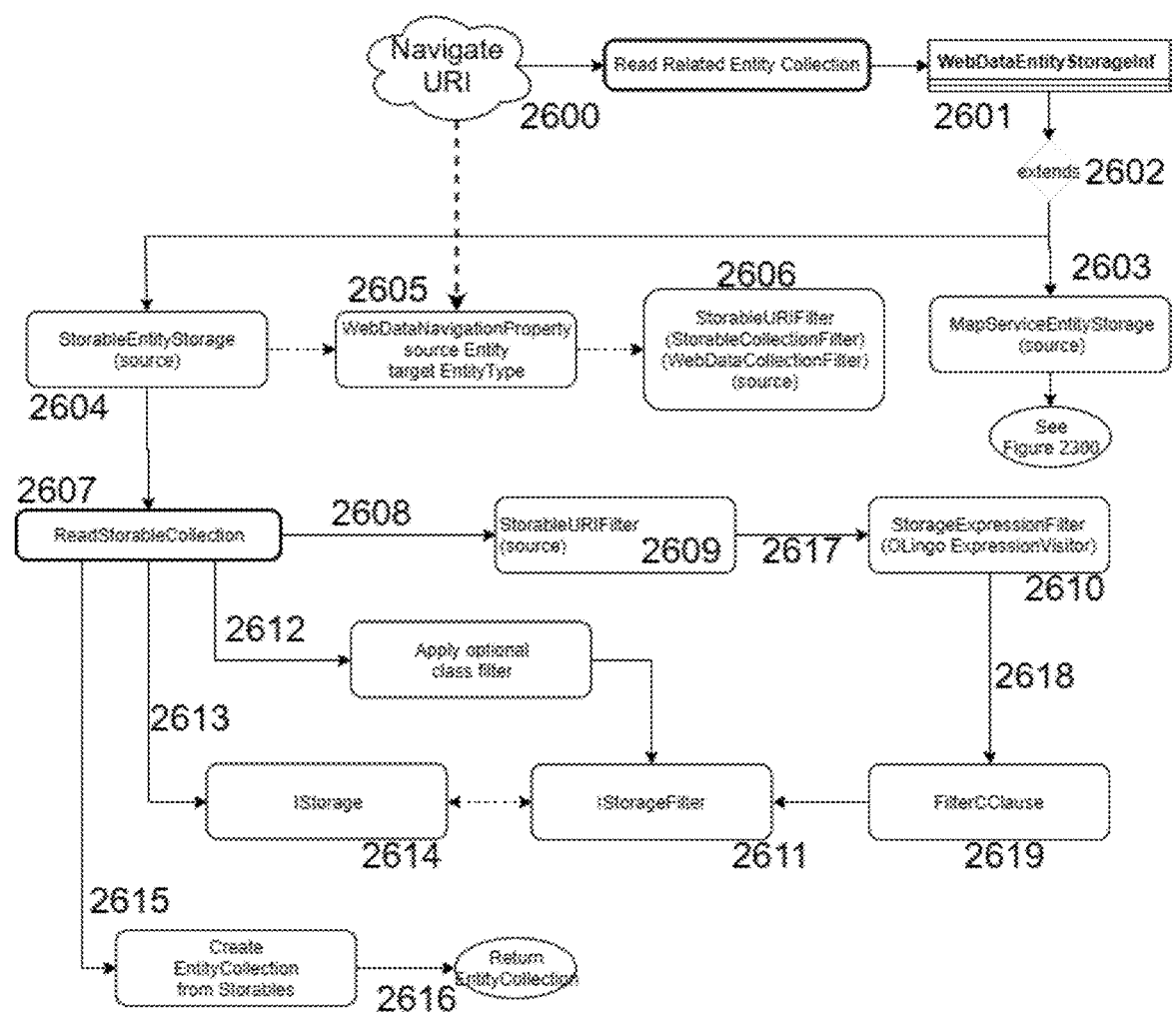
FIG. 38 illustrates a Read Storable Entity Collection (StorableURIFilter) process in accordance with an embodiment.

Read Related Entity Collection StorableURIFilter:

FIG. 38 illustrates a Read Storable Entity Collection (StorableURIFilter) process in accordance with an embodiment. FIG. 38 diagrams example steps and references, of an extension of FIG. 37 for reading entity collection using StorableEntityStorage (303, 2007, 2205, 3905); where the host process is navigating between entities based on the URI.

The process begins at step 2600 where the host process invokes WebDataEntityStorageInf (300, 1904, 2004, 2104, 2204, 3904) to read a related entity collection.

At step 2605, a StorableURIFilter (3706, 4401, 2606) is prepared via the source entity's WebDataNavigationPropertyInf (3800). The filter (2606) is also associated with the source Entity and target entity type (for later reference at step 2617).

At step 2607, (4) steps, 2608, 2612, 2613 and 2615 are completed in order. At step 2608, the StorableURIFilter (3706, 4401, 2606) is invoked to configure IStorageFilter (2611, 3611, 4419).

At step 2617, StorableURIFilter (3706, 4401, 2606) delegates to StorableExpressionFilter (4512, 4404). StorableExpressionFilter (4512, 4404) implements OLingo ExpressionVisitor (4405), and receives visitor notifications from Olingo in response to auditing the URI navigation properties. As a result of the visitor notifications, StorableExpressionFilter (4512, 4404) builds a FilterClause (3612, 4403).

On completion of the Olingo audit, at step 2618, FilterClause (3612, 4403) is used to configure IStorageFilter (2611, 3611, 4419).

At step 2608, StorableURIFilter (2609) may configure IStorageFilter (2611, 3611, 4419) directly, or delegate the process of configuration to other implementations. The key requirement is that at on completion of step 2608, IStorageFilter (2611, 3611, 4419) is configured per the requirement of the host process.

Returning to step 2607, at step 2612, if the web data configuration (1400) has an optional class filter (1422) (e.g., StorableClassFilter (3704)) configured, and instance of that class is invoked to apply additional filter requirements, narrowing the set of records that could be returned.

Returning to step 2607, at step 2613, IStorage (3609) is used to query the storage system; where the query takes into account the configuration of the IStorageFilter (2611, 3611, 4419) previously done.

Returning to step 2607, at step 2615, the query returns a collection of 0 or more Storable (3600) objects, and are used to create an EntityCollection.

At step 2616, the EntityCollection is returned to the host process.

Salesforce OData Destructive Changeset

Figure 39:
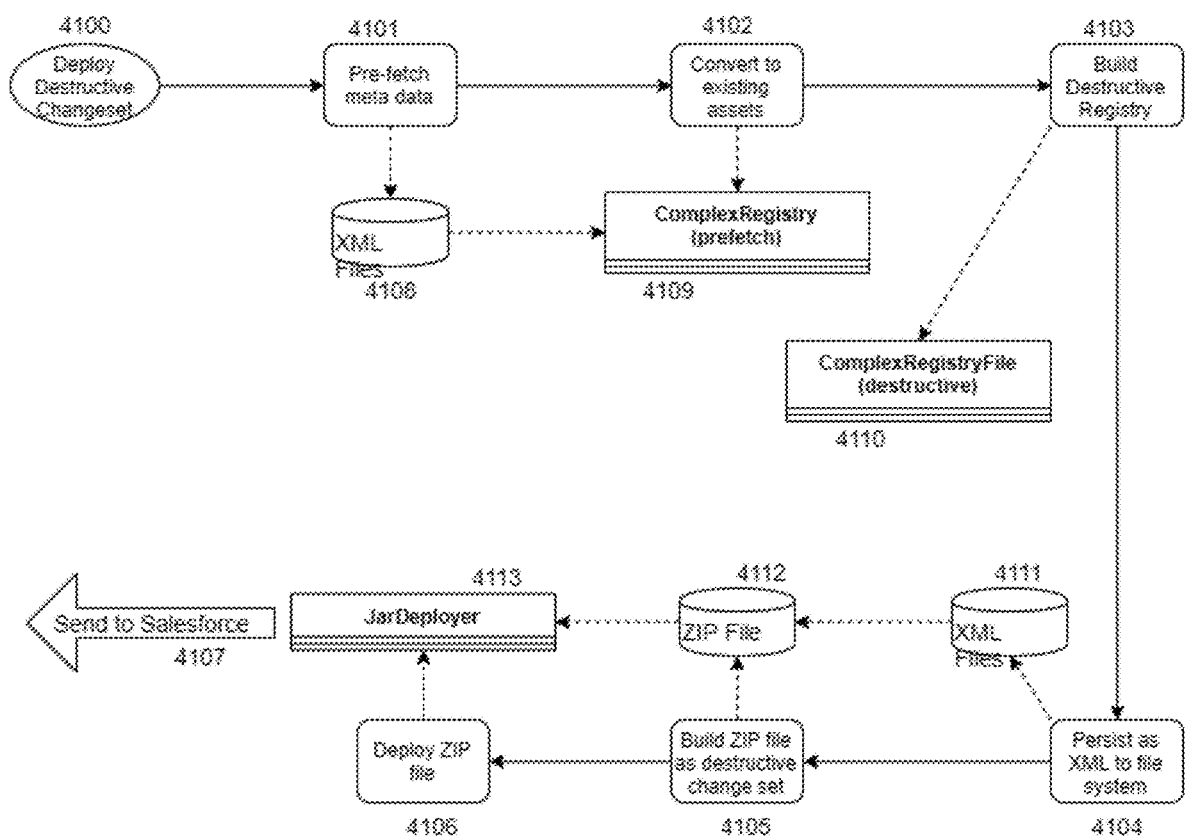
FIG. 39 illustrates a Destructive Change Set process in accordance with an embodiment.

FIG. 39 illustrates a Destructive Change Set process in accordance with an embodiment. Submitting a destructive changeset to Salesforce should be used with caution. The process described in this section is a method of convenience used during development, as a means to remove a previous deployment, so that a new version may be deployed and tested.

The algorithm begins at step 4100, where immediately at step 4101 existing meta data is pre-fetched by collecting existing assets. The deployment configuration is audited, and any element that should be included in the destructive changeset is converted. The data is received in the form of a ZIP file, and extracted to constituent XML, files (4108).

At step 4102, the pre-fetched meta data is converted to an object form (4109) suitable for destructive audit.

At step 4103, the destructive auditor inspects existing assets and configures an object (4110) based destructive changeset.

In general, an asset was pre-fetched because if it exists, it may be included in the destructive changeset, or it may require some dependent object to be included in the destructive changeset.

At steps 4104 and 4105 the object based destructive change set (4110) is converted to a ZIP file (4112).

The destructive ZIP file is submitted to Salesforce for processing (4107).

If the request to process a destructive changeset fails, the cause must be resolved; and in some cases, the existing assets must be removed manually.

Figure 40:
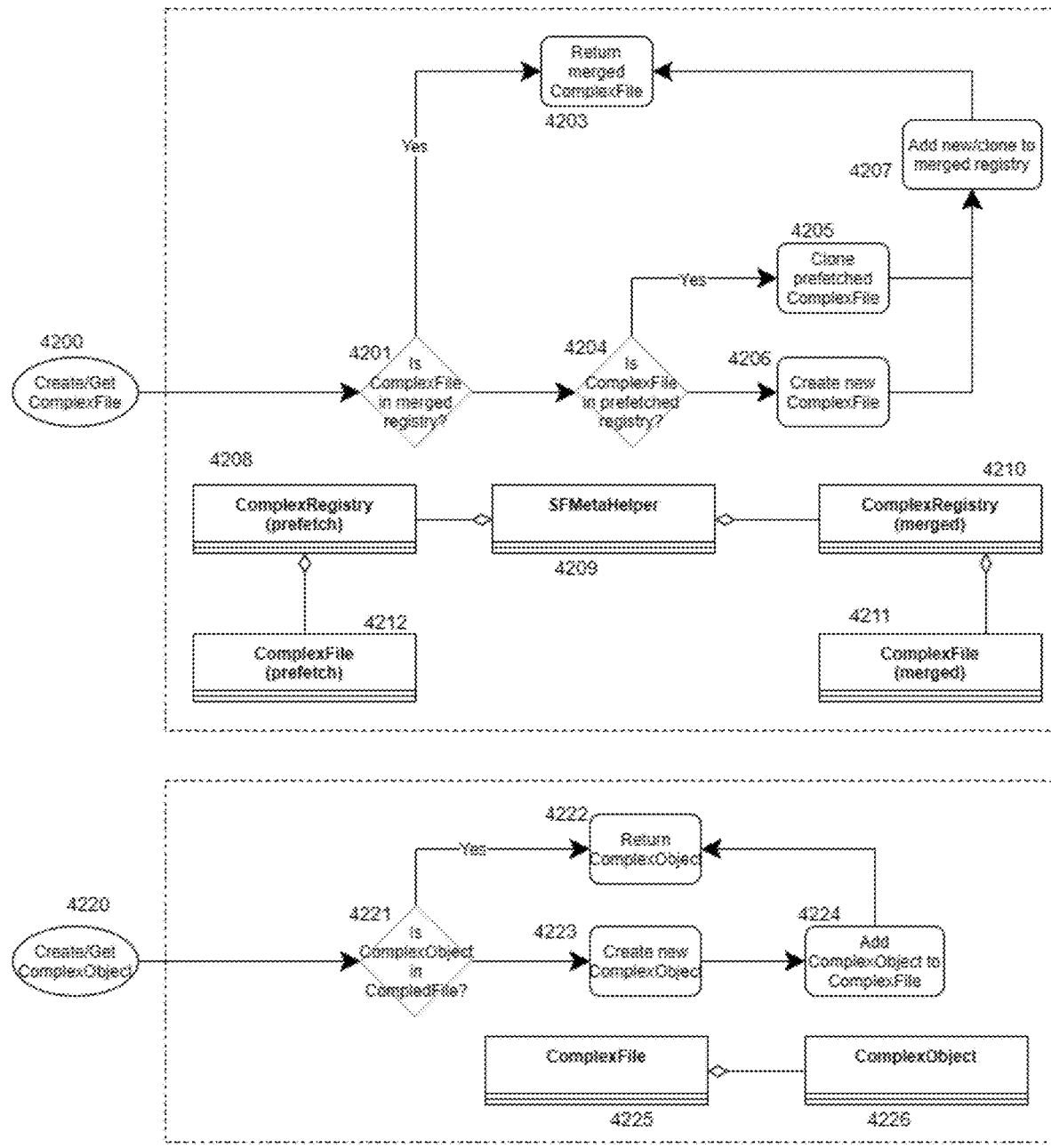
FIG. 40 illustrates a process for Creating Complex Objects From Existing in accordance with an embodiment.

Creating a ComplexFile from a Conditional Asset (e.g., FIG. 40, Item 4200)

FIG. 40 illustrates a process for Creating Complex Objects From Existing in accordance with an embodiment. In the context of the present example, the deployment process uses a technique to create a ComplexFile (4211) using a conditional asset; where the conditional asset is a ComplexFile 4212 that was constructed by some prior event, such as a pre-fetch.

In one embodiment, a SFMetaHelper 4209 is used. SFMetaHelper 4209 contains a ComplexRegistry 4208 as assets; where the assets were pre-fetched in a previous step. ComplexRegistry (3010) is a hierarchical collection of ComplexFiles (3007), grouped by metaclass name, then by metaobject name; where a ComplexFile (3007) contains the configuration state of a metaobject and has a metaclass and metaobject name.

SFMetaHelper 4209 also contains a ComplexRegistry 4210 as mergedassets; where the objects in mergedassets are added in accordance with the process utilizing SFMetaHelper (4209).

The process for creating a ComplexFile 4211 from a conditional asset may involve the following:

1. Using a SFMetaHelper (4209), metaclass and metaobject name: Get a ComplexFile (3007):
   a. If 4201 SFMetaHelper has ComplexFile 4211 in mergedassets: Return 4203 ComplexFile from mergedassets.
   b. Else if 4204 SFMetaHelper has ComplexFile 4212 in assets: Clone 4205 ComplexFile 4212 from assets into mergedassets; return ComplexFile 4211 from mergedassets.
   c. Else: Create 4206 a new ComplexFile 4211 into mergedassets; return ComplexFile 4211 from mergedassets.
2. The ComplexFile (4211) returned by step 4207 has the following state:
   a. An origin status of "new" or "existing", or an appropriate value according to how it was added to mergedassets in step 4207.
   b. A configuration status of true or false, indicating the ComplexFile (4211) has been configured.

3. The ComplexFile returned by step 4203 may be subject to configuration. In some embodiments, the process that gets a ComplexFile (4211) by this algorithm may apply standard configuration setting, if the ComplexFile (4211) has not been configured.

Making CustomObject as Child to CustomFile (e.g., FIG. 40, Item 4220)

The deployment process uses a technique to create a ComplexObject (4226) as child, of ComplexFile (4225) as parent; where the parent was made by some prior event; in some scenarios by way of FIG. 40, item 4200.

A ComplexObject (3000) has a type, and contains an internal collection of ComplexObjects (3000) and a ParameterRegistry (3002); where the internal collection of ComplexObjects (3000) are grouped by their type, and the ParameterRegister (3002) contains a list of Parameters (3005); and a Parameter (3006) has a tag (e.g., key) and content (e.g., value).

A ComplexFile (3007) extends ComplexObject (3000); and the ComplexFile (3007) metaclass name is used as the ComplexObject (3000) type.

Making ComplexObject (4226) as child to ComplexFile (4225):
1. Given a ComplexFile 4225 as parent, ComplexObject (3000) type (child), search pattern: Using given search pattern, search (See "find first" on ComplexObject (4225)) the parent for an existing child ComplexObject (4226)
   a. If 4221 ComplexObject 4226 found: return ComplexObject 4226 as child
   b. Else: Create 4223 new ComplexObject 4226 using given type; add to parent; return ComplexObject 4226 as child.

Deployment Algorithms

OData client deployment are any algorithms and procedures invoked by computers and human resources on a client system so that the client system may access an OData service in a useful and efficient way.

The (3) configurations, data map (802), web data (1400) and deployment (1500) provide data to configure the client; and should be prepared before deployment.

While the data map (802) and web data configurations (1400) are insulated from client implementation, the deployment configuration (1500) and processes are assumed to be dependent on the client, as is the case when deploying to Salesforce.

Before describing Salesforce OData Deployment, the relationship between Entities and External Objects should be understood. Salesforce uses External Objects to process OData Entities. An instance of an External Object corresponds to an instance of an entity; and field values of an instance of an External Object correspond to property values of an entity.

Salesforce uses metadata as a means of describing the structure of all types of Objects used by Salesforce, including External Objects; whereas in OLingo, entity types are used as a means of describing entities. The deployment algorithm contains logic that translates and/or correlates metadata elements with OLingo entity types, properties, and extended deployment configurations.

The reader should be aware of the context where External Object is mentioned; in some cases it refers to a structural definition, and in other cases it refers to an instance of a data object.

Also, with respect to the sections discussing Salesforce deployment, the deployment configuration (1500) will include attributes that are associated directly with an Entity to enable some feature in Salesforce, but the attributes are not part of the OData specification, or OLingo entity type data. For example, an Entity may have a property that can be used as a lookup to a standard object in Salesforce. In the deployment configuration, the property will be configured as a lookup that includes the name of the standard object. The lookup attribute is not part of OData, rather it is part of the deployment configuration that enables the external object corresponding to the Entity to have a field that is a lookup to the (other) standard object in Salesforce.

In one embodiment of client deployment, algorithms and procedures are developed in accordance with a minimum set of requirements for Salesforce access to an OData service, and the capabilities of Salesforce including the use of the Salesforce Partner and Metadata API.

In the context of this section, algorithms are actions a computer system takes, and procedures are actions human resources take.

An example of the minimum set of requirements includes the following:
  A deployment application on behalf of an OData service must have credentials to connect to Salesforce, and have permission to use Partner and Metadata API
  The application hosting the implementation of WebDataServlet (102) must be accessible by Salesforce. For example, the application might be accessible via a public domain (https://application).

In the context of this section, the "client" refers to an instance of a Salesforce service that will be configured to connect to an OData service. The procedure to deploy a configuration to a client is to access a user interface of the OData service, and invoke a deployment algorithm. An example Salesforce deployment algorithm is described with respect to FIG. 41.

Deploy Full Configuration

Figure 41:
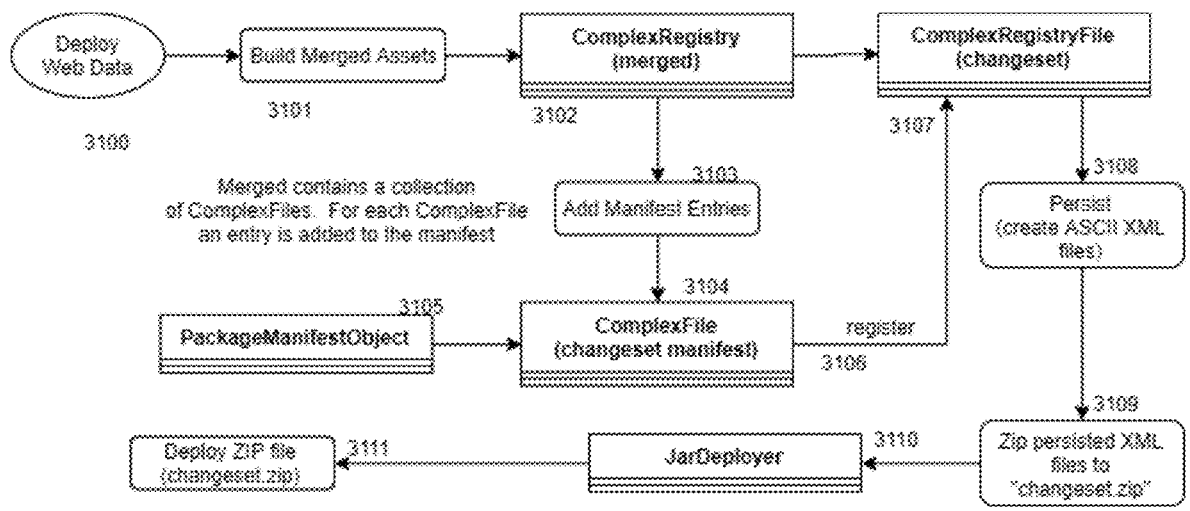
FIG. 41 illustrates a Deploy Full Configuration process in accordance with an embodiment.

FIG. 41 illustrates a Deploy Full Configuration process in accordance with an embodiment. FIG. 41 is a diagram of an example algorithm for deploying the full configuration.

The process begins at step 3100, where immediately at step 3101, the build merged assets process (see, e.g., FIG. 42) may be used to create a merged ComplexRegistry (3102).

The merged ComplexRegistry (3102) contains a collection of ComplexFiles (3007) that contain the data corresponding to the desired configuration of Salesforce meta objects; and the collection of ComplexFiles (3007) are organized to the structure of Salesforce meta classes.

At step 3103, a packing manifest (3105), in the form of a ComplexFile is created (3104); and for each ComplexFile in the merged ComplexRegistry (3102), an entry is add to the manifest (3104).

At step 3107, a ComplexRegistryFile (3011) is created from the merged ComplexRegistry (3102), and named "changeset.zip".

At step 3106, and the ComplexFile packing manifest (3104) is registered (added) (3106) to the ComplexRegistryFile (3107).

At step 3108, the entire collection of ComplexFiles in the ComplexRegistryFile (3107) are persisted to the file system as ASCII XML files, where the files are organized in accordance with Salesforce meta classes. See, e.g., FIG. 23.

At step 3109, the files created in step 3108 are added to a new zip file, named "changeset.zip".

At step 3101, JarDeployer (3110) is invoked to deploy "changeset.zip" (3111).

The process of deployment at step 3111 follows a method recommended by Salesforce.

Additional Notes:
Steps 3108 and 3109 is just one technique for generating a ZIP file. Other techniques may be used. The only requirement in the context of the present example is that a ZIP file be provided to the method of 3111.

Build Merged Assets

Figure 42:
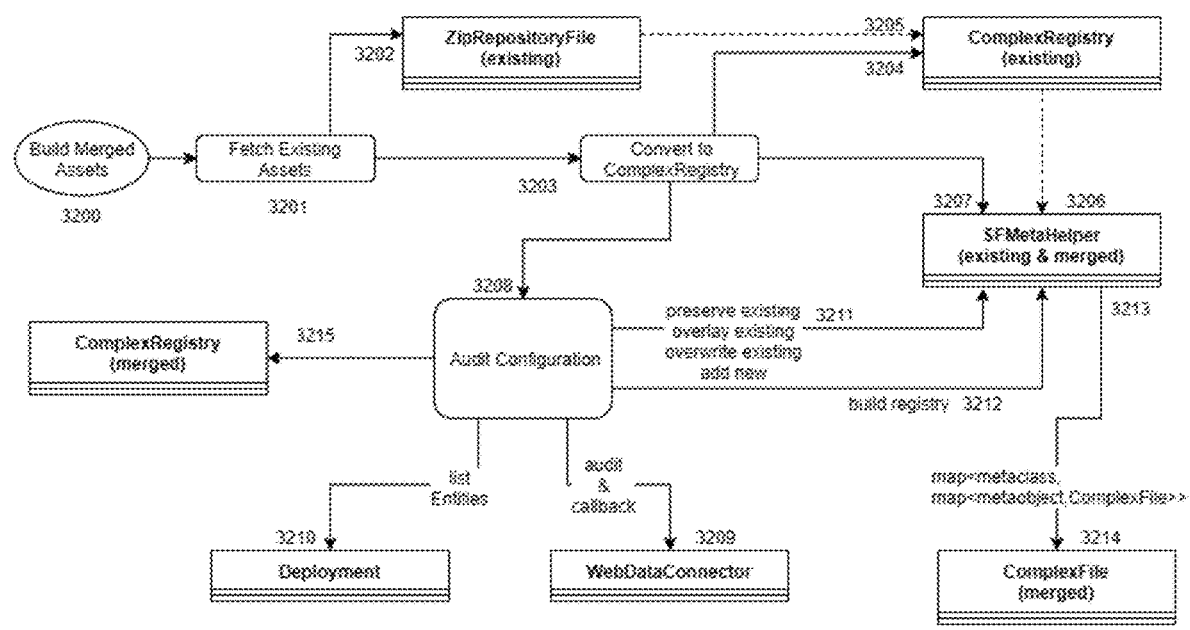
FIG. 42 illustrates a Build Merged Assets process in accordance with an embodiment.

FIG. 42 illustrates a Build Merged Assets process in accordance with an embodiment. In the context of the present example, a build merge assets process returns a merged ComplexRegistry (3215) to the host process; where the ComplexFiles (3007) in the ComplexRegistry (3215) contain data/configurations (meta data) that reflect (i) the meta data pre-fetched (3205) from equivalent objects that exist in the instance of Salesforce the host process is connected to, and (ii) meta data from web data (1400) and deployment configurations (1500) that overwrite pre-fetched meta data, or is new meta data.

The process begins at step 3200, where immediately at step 3201 existing meta data is pre-fetched from Salesforce. The pre-fetch returns the results in the form of a ZipRepositoryFile (3202).

At step 3203, the ZipRepositoryFile (3202) is used to create a ComplexRegistry (3205) containing a collection of ComplexFiles (3007) corresponding to existing Salesforce meta data.

At step 3207, a SFMetaHelper (3206) class is created with the existing ComplexRegistry (3205), in preparation for auditing configuration for deployment.

At step 3208, the process of auditing configuration is invoked (See, e.g., FIG. 44), where as a result, a merged ComplexRegistry (3215) is returned to the host process.

During the audit of 3208, WebDataConnector (104) and Deployment (2900) present entity types for processing by the audit process. Elements of the audit process may optionally search SFMetaHelper (3206) for existing meta objects, and clone existing meta objects for use as the object to write meta data into, or avoid writing meta data to preserve an existing configuration from Salesforce. Other elements of the audit process may ignore existing meta objects and create new meta objects that in effect will replace any existing meta objects. In any case, as elements of the audit process clone or create meta objects, the form of the meta objects in SFMetaHelper (3206) are ComplexFiles (3214), and the collection of ComplexFiles are organized by groups of metaclass, then by the name of the meta object (3213).

When the audit of 3208 is complete, the SFMetaHelper (3206) provides a method (3212) to present the collection of ComplexFile (3213) in the form of a ComplexRegistry (3215). This is the ComplexRegistry (3215) that is returned to the host process.

Fetch Existing Assets

Figure 43:
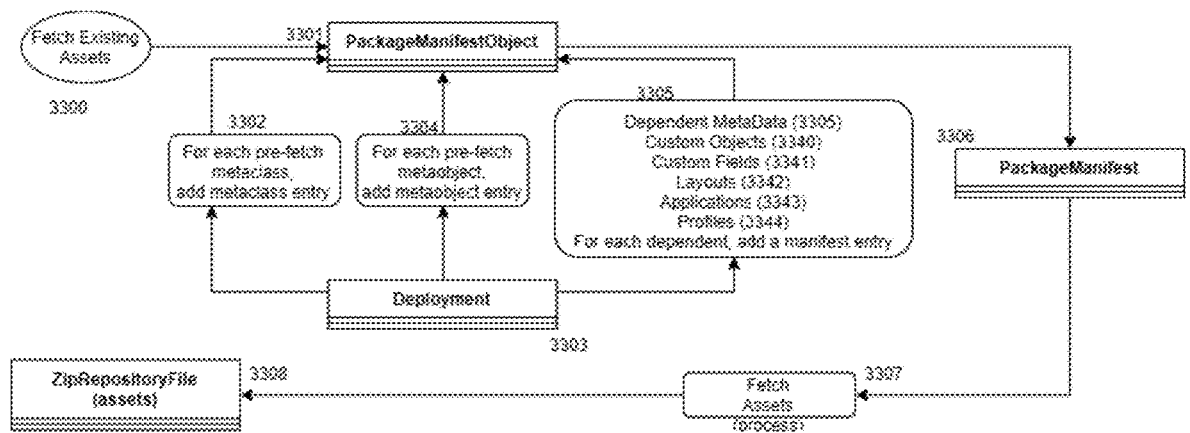
FIG. 43 illustrates a Pre-Fetch Existing Assets process in accordance with an embodiment.

FIG. 43 illustrates a Pre-Fetch Existing Assets process in accordance with an embodiment. In the context of the present example, the host process initiates the fetch existing assets at step 3300, a PackageManifestObject is created (3301).

At step 3302, for each SFMetaClass (2901) in Deployment (3303) that has the pre-fetch set true (checkbox checked), a manifest entry is added to the PackageManifestObject (3301).

At step 3304, for each SFMetaObject (2903) in Deployment (3303) that has the pre-fetch set true (checkbox checked), a manifest entry is added to the PackageManifestObject (3301).

At step 3305, for each dependent meta data in Deployment (3303) a manifest entry is added to the PackageManifestObject (3301).

PackageManifestObject (3301) extends PackageManifest (3306) and at step 3307 the PackageManifest (3306) is provided to the fetch assets process. The fetch assets process is implemented per the guidelines of Salesforce and the use of the Salesforce metadata API.

At step 3308, the fetch assets process returns the results to the host process in the form of a ZipRepositoryFile.

Additional Notes:
1. In the context of the present example, all CustomObjects 3340 are fetched because this collection is where the [entity type] meta objects that are created by this algorithm are found where this type of meta object corresponds to an external object.
2. All Layouts 3342 are fetched because this collection is where the minimal layouts for the external objects are found, and other layouts that may need to be updated with reverse lookup fields. The algorithm may create a minimal layout for each external object. An external object's minimal layout may contain custom fields, and related lists for each related external and standard object.
3. The selected CustomApplications 3343 are fetched because the algorithm may configure custom tabs on them, to make access to one or more of the external objects convenient (See External Objects & Entities).
4. The selected Profiles 3344 are fetched because the algorithm may configure view, and manipulation access to external objects and custom fields; in one embodiment, full permissions are given to the system admin profile.
5. For every property with a reverse lookup, the corresponding custom field 3341 is fetched, from the host custom object. It is common for an external object to be directly associated with an internal (standard or custom) Salesforce object; and as a matter of convenience a custom (lookup) field is added to the Salesforce object. This is done by configuring a Property as having a reverse lookup.

Fetching Custom Fields

Any Entity (2908) that has a reverse lookup configured will cause the fetch existing assets algorithm to request custom fields on the external object that contains the lookup field to the Entity (2908).

An Entity (2908) may have a lookup that references a standard object in Salesforce. If the relationship between the Entity and the standard object is one-to-one, then a reverse lookup may be configured. That is, a custom field may be added to the standard object that is a lookup to the Entity (2908).

The deployment algorithm is capable of configuring the custom field, but may need to preserve existing Salesforce configurations. To accommodate both requirements, the custom fields are pre-fetched at the beginning of the deployment algorithm, and thus are available.

Audit WebData/Deployment Configuration

Figure 44:
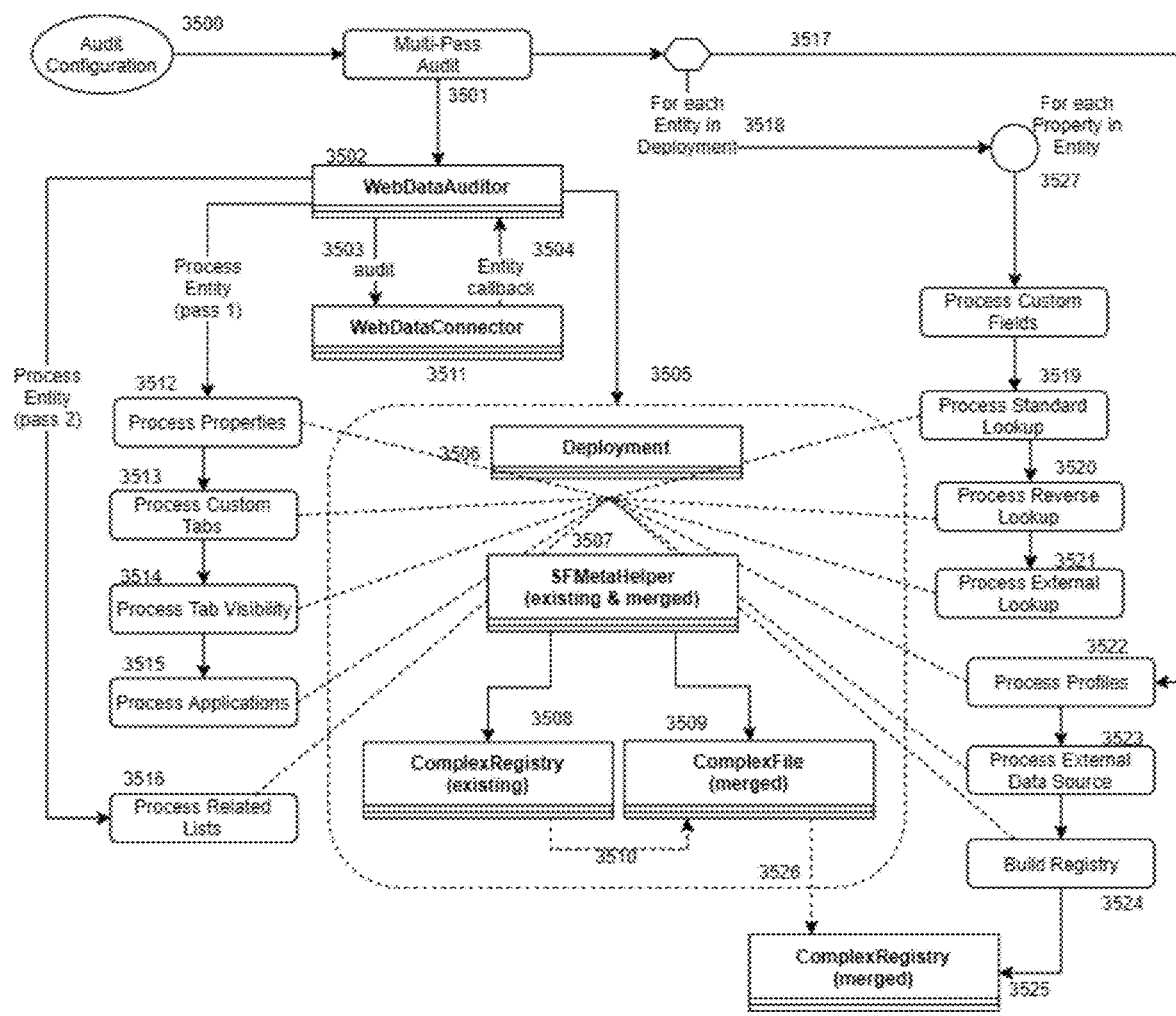
FIG. 44 illustrates an Audit WebData/Deployment Configuration process in accordance with an embodiment.

FIG. 44 illustrates an Audit WebData/Deployment Configuration process in accordance with an embodiment. In the context of the present example, the audit process is seeded with a WebDataAuditor 3502; where WebDataAuditor 3502 has a reference to WebDataConnector 3511, Deployment 3506 and SFMetaHelper 3507.

The audit process begins at step 3500, where in one embodiment at step 3501 a multi-pass audit process 3503 is used; wherein at step 3504 WebDataConnector presents entity types to WebDataAuditor 3502 for processing.

For each entity type presented at step 3504, a ComplexFile 3509 representing a Salesforce external object is established (See, e.g., FIG. 40, item 4200) within the SFMeta-Helper 3507; where the external object corresponds to the entity type.

During pass 1, for each entity type presented, the following processes occur:

At step 3512, all properties associated with the entity type are processed as custom fields in entity external object.

At step 3513, any custom tabs associated with the entity external object are processed.

At step 3514, the visibility of the custom tabs are processed.

At step 3515, the inclusion of the custom tabs on Salesforce applications are processed.

During pass 2, for each entity type presented 3504, the following processes occur:

At step 3516, related lists resulting from navigation properties are processed.

At the completion of the multi-pass audit of step 3501, the process continues at step 3517.

At step 3517, at step 3518, for each Entity in Deployment processing continues to step 3527, where at for each Property in the Entity, the custom lookup fields are processed.

At step 3519, if a Property has a standard lookup, it is processed.

At step 3520, if a Property has a reverse lookup, it is processed.

At step 3521, if a Property has an external lookup, it is processed.

Returning to step 3517 and proceeding to step 3522, all profiles that were pre-fetched are updated with permissions to view and manipulate external objects and custom fields in accordance with the Deployment configuration.

At step 3523, the configuration of the external data source is updated.

When the configuration of the collection of ComplexFiles is complete, at step 3524 the audit process builds a merged ComplexRegistry 3525 and returns it to the host process.

Additional Notes:
1. The various process steps (3512-3516, 3519-3523) involving the configuration of ComplexFiles and ComplexObjects are included in accordance with one embodiment based on the requirements of a minimum useful client interface, the Salesforce objects that enable those requirements, and Salesforce documentation describing the XML, necessary to configure the Salesforce objects so that the requirements are met. The algorithm of FIG. 44 can and will change if any of the basis elements change.
2. A feature of the Deployment 2900 configuration provides ENTITY 2909, PROPERTY 2911 and SFMETAOBJECT 2904 each with an arbitrary set of PARAMETERs (2916, 2918, 2917). The PARAMETERs are added and updated by the Deployment administrator, and are used in the processing steps of FIG. 44. A PARAMETER contains a set of fields corresponding to a Parameter object (see, e.g., FIG. 22, item 3006); and a field identifying the host ComplexObject (see, e.g., FIG. 22, item 3000) within a ComplexFile (see, e.g., FIG. 22, item 3007). PARAMETER also contains fields used by the processes of FIG. 44 to determine if a Parameter is required or optional; whether an existing (pre-fetch) value should be preserved or over-written. Given a PARAMETER, the processes of FIG. 44 can determine whether to use the algorithms/methods of FIG. 40, item 4220; FIG. 22 (items 3021,3022,3023).

Fetch Assets Per XML File Manifest

Figure 45:
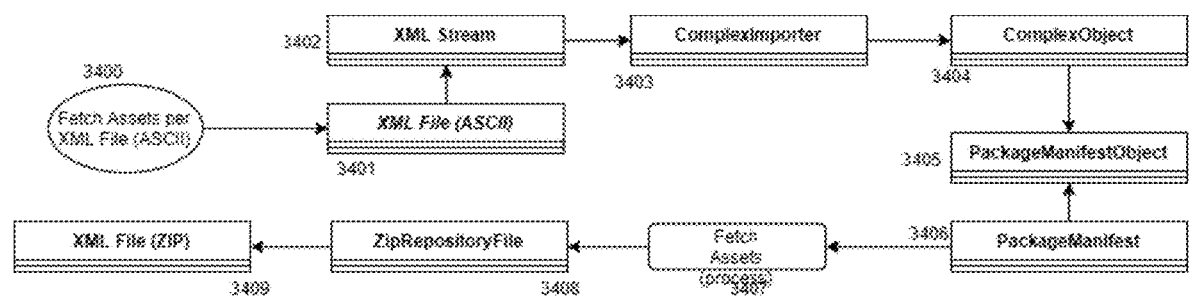
FIG. 45 illustrates a Fetch Assets Per ASCII Manifest process accordance with an embodiment.

FIG. 45 illustrates a Fetch Assets Per ASCII Manifest process accordance with an embodiment. In the context of the present example, fetch assets per ASCII manifest is a process that is generally invoked by a deployment administrator via deployment management user interface. The ASCII manifest may be in the form of an ASCII XML file, or XML string or any form that can be presented as an XML stream input to a parser, ComplexImporter (3403).

The process begins at step 3400 where an ASCII XML File (3401) is presented to ComplexImporter (3403) as an XML stream (3402). The ComplexImporter (3403) parses the XML stream and creates a ComplexObject (3404). The ComplexObject (3404) is used to create a PackageManifestObject (3405). PackageManifestObject (3405) extends PackageManifest (3406) and at step 3407 the PackageManifest (3406) is provided to the fetch assets process (3407). The fetch assets process (3407) is implemented per the guidelines of Salesforce and the use of the Salesforce metadata API.

At step 3408, the fetch assets process (3407) returns the results to the host process in the form of a ZipRepositoryFile (3408); wherein the ZipRepositoryFile (3408) is persisted to the file system as a ZIP file (3409).

Web Data Development Lifecycle

Figure 46:
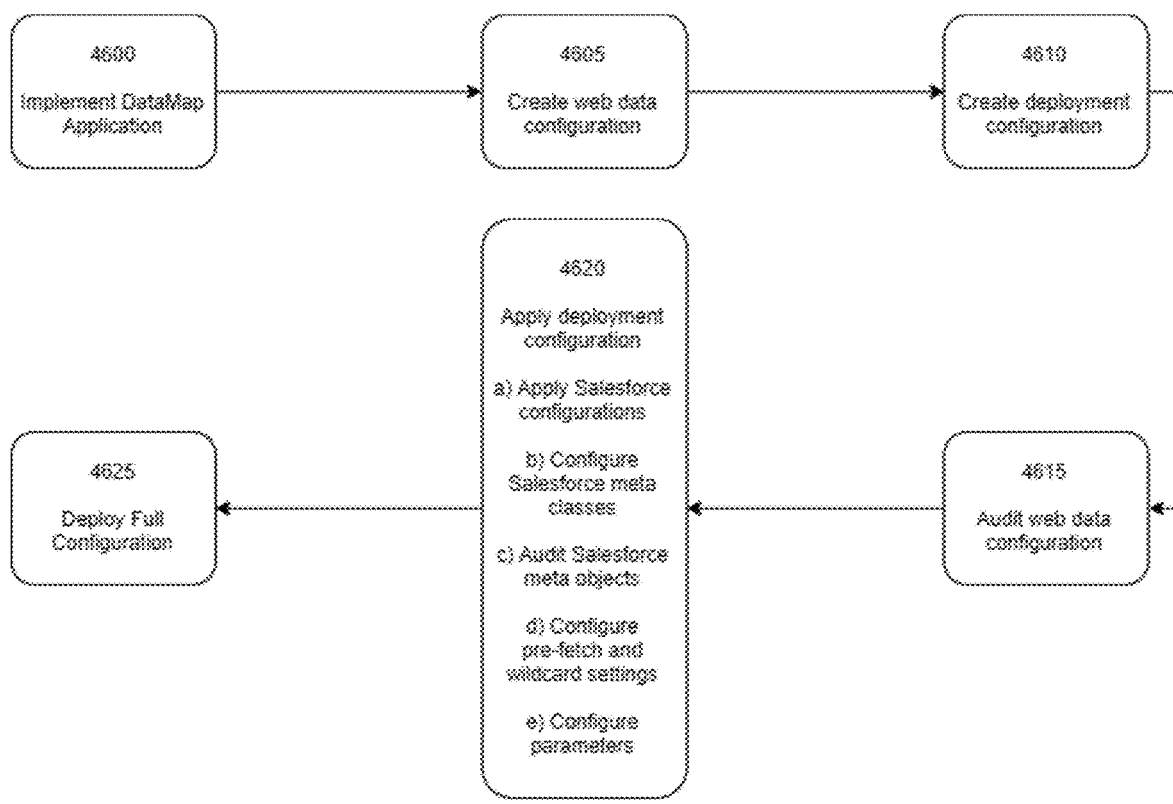
FIG. 46 illustrates a Web Data Development Lifecycle in accordance with an embodiment.

FIG. 46 illustrates a Web Data Development Lifecycle in accordance with an embodiment. At step 4600, a DataMap Application is implemented. A detailed description of the procedure is beyond the scope of this disclosure, but embodiments described herein assume a DataMap (802) application has been implemented and deployed, and an OData service will be configured (1400) based on the DataMap (802) definition.

At step 4605, create a web data configuration. A WebData configuration (1400) is created based on the DataMap (802) application. Data from the datastore and the DataMap (802) cache can be exposed to the OData service. Decide what data should be made available to the OData client and create a configuration accordingly. Client requirements involving many records, such as reports, should be exposed from the datastore. Client requirements involving interactive, real-time manipulation should be exposed from the DataMap (802) cache. The ApplicationServlet (100) should be created at this time; by default, the ApplicationServlet (100) determines the name and location of the web data configuration.

At step 4610, create a deployment configuration (1500). The procedure for creating a deployment configuration (1500) at this step is tailored to the capability of the OData client.

In a current embodiment, the following procedure is used to create a Salesforce deployment configuration.

Step 4615 has been separated out from steps 4610 and 4620. The technique of auditing web data configuration is common regardless of the client, but processing the information provided by the audit mechanism will most likely be tailored to the capability of the OData client; In this case, create ENTITY (2909) and PROPERTY (2911) records as placeholders for Salesforce attributes. As part of step 4615, WebDataConnector (See, e.g., FIG. 44) audit occurs when an administrator initiates an audit from a user interface. This audit is used to create and optionally update a deployment configuration (ENTITY (2909) and PROPERTY (2911) records).

At step 4620 (a), Entity (2908) records are configured for Application and Custom tabs and tab visibility. Property (2910) records are configured for list views, search lists, lookups and reverse look ups. At step 4620 (b), configure the Salesforce MetaClasses. This includes all MetaClasses involved in the deployment, not just pre-fetch. This step will create SFMETACLASS (2902) records, as necessary, located under the DEPLOYMENT (2907) record. In the context of the present example, this includes:
CustomApplication
CustomField
CustomObject
Layout
Profile At step 4620 (*c*), audit Salesforce MetaObjects. This step fetches all objects for the MetaClasses configured in the previous step. The fetch process uses Salesforce utilities to retrieve a ZIP file. The files in the ZIP are parsed into a ComplexRegistry, and for each ComplexObject in the registry a SFMETAOBJECT (2904) record is created or updated under its appropriate SFMETACLASS (2902) record At step 4620 (*d*), configure pre-fetch and wildcard. The SFMetaClasses (2901) and SFMetaObjects (2903) set for pre-fetch, and the SFMetaClasses (2901) set for wildcard have been established by Salesforce documentation or empirically through testing. Pre-fetching a SFMetaClass (2901) fetches all ComplexObjects for that class. Pre-fetching a SFMetaObject (2903) fetches a single ComplexObject. Pre-fetched ComplexObjects are used by the algorithms to determine if an object or parameter already exists, and whether to re-use or override objects and parameters.

At step 4620 (*e*), add and configure PARAMETERS as necessary to achieve the desired meta object configuration in Salesforce.

Step 4625 is the final step and ultimate goal. Successful deployment implies the client may begin utilizing the OData service.

Example Computer System

Figure 48:
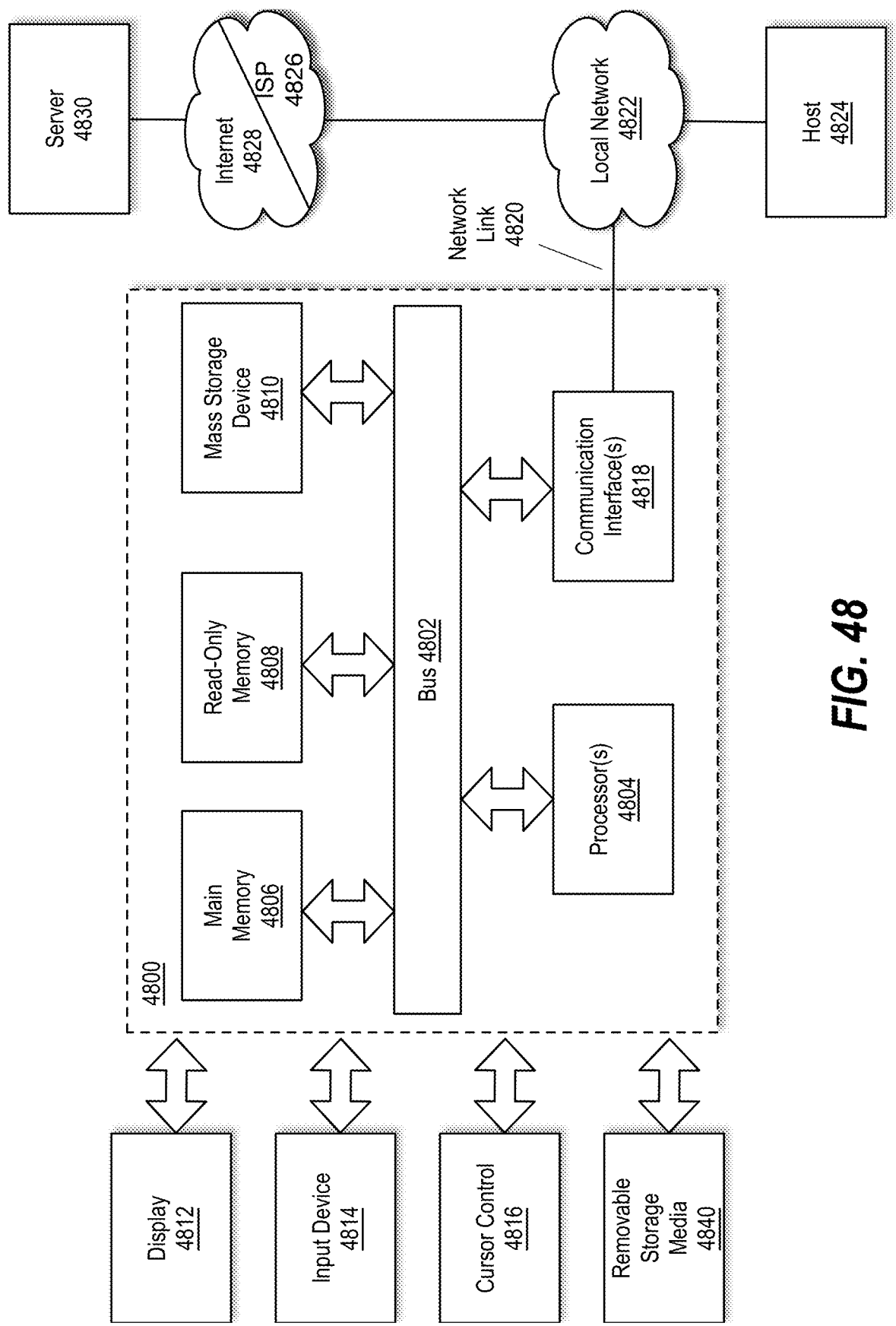
FIG. 48 is an example of a computer system in which or with which embodiments of the present disclosure may be utilized.

FIG. 48 is an example of a computer system in which or with which embodiments of the present disclosure may be utilized. Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

FIG. 48 is a block diagram that illustrates a computer system 4800 in which or with which an embodiment of the present disclosure may be implemented. Notably, components of computer system 4800 described herein are meant only to exemplify various possibilities. In no way should example computer system 4800 limit the scope of the present disclosure. In the context of the present example, computer system 4800 includes a bus 4802 or other communication mechanism for communicating information, and a processing resource (e.g., a hardware processor 4804) coupled with bus 4802 for processing information. Hardware processor 4804 may be, for example, a general purpose microprocessor.

Computer system 4800 also includes a main memory 4806, such as a random access memory (RAM) or other dynamic storage device, coupled to bus 4802 for storing information and instructions to be executed by processor 4804. Main memory 4806 also may be used for storing temporary variables or other intermediate information during execution of instructions to be executed by processor 4804. Such instructions, when stored in non-transitory storage media accessible to processor 4804, render computer system 4800 into a special-purpose machine that is customized to perform the operations specified in the instructions.

Computer system 4800 further includes a read only memory (ROM) 4808 or other static storage device coupled to bus 4802 for storing static information and instructions for processor 4804. A storage device 4810, e.g., a magnetic disk, optical disk or flash disk (made of flash memory chips), is provided and coupled to bus 4802 for storing information and instructions.

Computer system 4800 may be coupled via bus 4802 to a display 4812, e.g., a cathode ray tube (CRT), Liquid Crystal Display (LCD), Organic Light-Emitting Diode Display (OLED), Digital Light Processing Display (DLP) or the like, for displaying information to a computer user. An input device 4814, including alphanumeric and other keys, is coupled to bus 4802 for communicating information and command selections to processor 4804. Another type of user input device is cursor control 4816, such as a mouse, a trackball, a trackpad, or cursor direction keys for communicating direction information and command selections to processor 4804 and for controlling cursor movement on display 4812. This input device typically has two degrees of freedom in two axes, a first axis (e.g., x) and a second axis (e.g., y), that allows the device to specify positions in a plane.

Removable storage media 4840 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 4800 may implement the techniques described herein using customized hard-wired logic, one or more ASICs or FPGAs, firmware or program logic which in combination with the computer system causes or programs computer system 4800 to be a special-purpose machine. According to one embodiment, the techniques herein are performed by computer system 4800 in response to processor 4804 executing one or more sequences of one or more instructions contained in main memory 4806. Such instructions may be read into main memory 4806 from another storage medium, such as storage device 4810. Execution of the sequences of instructions contained in main memory 4806 causes processor 4804 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 4810. Volatile media includes dynamic memory, such as main memory 4806. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 4802. Transmission media can also take the form of acoustic or light waves, such as those generated during radio-wave and infra-red data communications.

Various forms of media may be involved in carrying one or more sequences of one or more instructions to processor 4804 for execution. For example, the instructions may initially be carried on a magnetic disk or solid state drive of a remote computer. The remote computer can load the instructions into its dynamic memory and send the instructions over a telephone line using a modem. A modem local to computer system 4800 can receive the data on the telephone line and use an infra-red transmitter to convert the data to an infra-red signal. An infra-red detector can receive the data carried in the infra-red signal and appropriate circuitry can place the data on bus 4802. Bus 4802 carries the data to main memory 4806, from which processor 4804 retrieves and executes the instructions. The instructions received by main memory 4806 may optionally be stored on storage device 4810 either before or after execution by processor 4804.

Computer system 4800 also includes a communication interface 4818 coupled to bus 4802. Communication interface 4818 provides a two-way data communication coupling to a network link 4820 that is connected to a local network 4822. For example, communication interface 4818 may be an integrated services digital network (ISDN) card, cable modem, satellite modem, or a modem to provide a data communication connection to a corresponding type of telephone line. As another example, communication interface 4818 may be a local area network (LAN) card to provide a data communication connection to a compatible LAN. Wireless links may also be implemented. In any such implementation, communication interface 4818 sends and receives electrical, electromagnetic or optical signals that carry digital data streams representing various types of information.

Network link 4820 typically provides data communication through one or more networks to other data devices. For example, network link 4820 may provide a connection through local network 4822 to a host computer 4824 or to data equipment operated by an Internet Service Provider (ISP) 4826. ISP 4826 in turn provides data communication services through the world wide packet data communication network now commonly referred to as the "Internet" 4828. Local network 4822 and Internet 4828 both use electrical, electromagnetic or optical signals that carry digital data streams. The signals through the various networks and the signals on network link 4820 and through communication interface 4818, which carry the digital data to and from computer system 4800, are example forms of transmission media.

Computer system 4800 can send messages and receive data, including program code, through the network(s), network link 4820 and communication interface 4818. In the Internet example, a server 4830 might transmit a requested code for an application program through Internet 4828, ISP 4826, local network 4822 and communication interface 4818. The received code may be executed by processor 4804 as it is received, or stored in storage device 4810, or other non-volatile storage for later execution.

While embodiments of the present disclosure have been illustrated and described with reference to particular examples and concrete examples, it will be clear that the disclosure is not limited to these embodiments. Numerous modifications, changes, variations, substitutions, and equivalents will be apparent to those skilled in the art, without departing from the spirit and scope of the disclosure. For example, while in the context of various examples described herein OData is used as an example of a protocol that can be used for querying tabular data, those skilled in the art will appreciate the methodologies described herein are equally applicable to other technologies that expose data through REST.

The processing described above with reference to the various flow diagrams, for example, may be implemented in the form of executable instructions stored on a machine readable medium and executed by a processing resource (e.g., a general-purpose or special-purpose processor, a microcontroller, a microprocessor, central processing unit core(s), an application-specific integrated circuit (ASIC), a field programmable gate array (FPGA), and the like) and/or in the form of other types of electronic circuitry. For example, processing may be performed by one or more virtual or physical computer systems of various forms with on-premise, data center or cloud resources.

In the foregoing description, numerous details are set forth to provide an understanding of the subject matter disclosed herein. However, implementation may be practiced without some or all of these details. Other implementations may include modifications and variations from the details discussed above.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

What is claimed is:

1. A method performed by a processing resource of a computer system, the method comprising:
    maintaining, by an Open Data Protocol (OData) service that is operable to serve data from a database to which the data has been persisted or from an in-memory cache, a mapping between each OData entity of a plurality of OData entities and one or both of a hierarchical data map and a table of the database; and
    responsive to receipt by the OData service of a request from an OData client relating to a particular OData entity of the plurality of OData entities, conditionally loading a plurality of data points of the hierarchical data map into the in-memory cache with data from the table of the database based at least in part on the mapping and the OData entity.

2. The method of claim 1, wherein the request involves data manipulation, wherein each of the plurality of data points includes a field name and a calculated value, and wherein the method further comprises:
    fulfilling the manipulation via the in-memory cache, including updating the calculated value of at least one of the plurality of data points by transferring one or more input values specified by the request to one or more target data points of the plurality of data points and invoking a formula corresponding to the calculated value; and
    persisting changed contents within the hierarchical data map to the database.

3. The method of claim 1, wherein said conditionally loading includes evaluating one or more performance tradeoffs of fulfilling the request from the in-memory cache versus fulfilling the request from the database.

4. The method of claim 3, wherein said evaluating comprises determining whether data associated with the OData entity exists within a number of tables within the database that satisfies a threshold.

5. The method of claim 3, wherein said evaluating comprises determining whether data associated with the OData entity exists within a level of the hierarchical data map that satisfies a threshold.

6. A system comprising:
    a processing resource; and
    instructions that when executed by the processing resource cause the processing resource to perform a method comprising:
        maintaining, by an Open Data Protocol (OData) service that is operable to serve data from a database to which the data has been persisted or from an in-memory cache, a mapping between each OData entity of a plurality of OData entities and one or both of a hierarchical data map and a table of the database; and
        responsive to receipt by the OData service of a request from an OData client relating to a particular OData entity of the plurality of OData entities, conditionally loading a plurality of data points of the hierarchical data map into the in-memory cache with data from the table of the database based at least in part on the mapping and the OData entity.

7. The system of claim 6, wherein the request involves data manipulation, wherein each of the plurality of data points includes a field name and a calculated value, and wherein the method further comprises:
    fulfilling the manipulation via the in-memory cache, including updating the calculated value of at least one of the plurality of data points by transferring one or more input values specified by the request to one or more target data points of the plurality of data points and invoking a formula corresponding to the calculated value; and
    persisting changed contents within the hierarchical data map to the database.

8. The system of claim 6, wherein said conditionally loading includes evaluating one or more performance tradeoffs of fulfilling the request from the in-memory cache versus fulfilling the request from the database.

9. The system of claim 8, wherein said evaluating comprises determining whether data associated with the OData entity exists within a number of tables within the database that satisfies a threshold.

10. The system of claim 8, wherein said evaluating comprises determining whether data associated with the OData entity exists within a level of the hierarchical data map that satisfies a threshold.

11. A non-transitory computer-readable storage medium embodying a set of instructions, which when executed by a processing resource cause the processing resource to perform a method comprising:
    maintaining, by an Open Data Protocol (OData) service that is operable to serve data from a database to which the data has been persisted or from an in-memory cache, a mapping between each OData entity of a plurality of OData entities and one or both of a hierarchical data map and a table of the database; and
    responsive to receipt by the OData service of a request from an OData client relating to a particular OData entity of the plurality of OData entities, conditionally loading a plurality of data points of the hierarchical data map into the in-memory cache with data from the table of the database based at least in part on the mapping and the OData entity.

12. The non-transitory computer-readable storage medium of claim 11, wherein the request involves data manipulation, wherein each of the plurality of data points includes a field name and a calculated value, and wherein the method further comprises:
    fulfilling the manipulation via the in-memory cache, including updating the calculated value of at least one of the plurality of data points by transferring one or more input values specified by the request to one or more target data points of the plurality of data points and invoking a formula corresponding to the calculated value; and
    persisting changed contents within the hierarchical data map to the database.

13. The non-transitory computer-readable storage medium of claim 11, wherein said conditionally loading includes evaluating one or more performance tradeoffs of fulfilling the request from the in-memory cache versus fulfilling the request from the database.

14. The non-transitory computer-readable storage medium of claim 13, wherein said evaluating comprises determining whether data associated with the OData entity exists within a number of tables within the database that satisfies a threshold.

15. The non-transitory computer-readable storage medium of claim 13, wherein said evaluating comprises determining whether data associated with the OData entity exists within a level of the hierarchical data map that satisfies a threshold.

* * * * *